United States Patent
Kramer et al.

(10) Patent No.: US 9,933,852 B2
(45) Date of Patent: *Apr. 3, 2018

(54) MULTI-PROCESS INTERACTIVE SYSTEMS AND METHODS

(71) Applicant: Oblong Industries, Inc., Los Angeles, CA (US)

(72) Inventors: Kwindla Hultman Kramer, Los Angeles, CA (US); John S. Underkoffler, Los Angeles, CA (US)

(73) Assignee: Oblong Industries, Inc., Los Angeles, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 14/701,844

(22) Filed: May 1, 2015

(65) Prior Publication Data

US 2016/0018896 A1 Jan. 21, 2016

Related U.S. Application Data

(63) Continuation of application No. 12/579,372, filed on Oct. 14, 2009, now Pat. No. 9,052,970.

(51) Int. Cl.
*G06F 3/01* (2006.01)
*G06F 9/54* (2006.01)
(Continued)

(52) U.S. Cl.
CPC .............. *G06F 3/017* (2013.01); *G06F 3/011* (2013.01); *G06F 3/0304* (2013.01); *G06F 9/542* (2013.01);
(Continued)

(58) Field of Classification Search
None
See application file for complete search history.

(56) References Cited

U.S. PATENT DOCUMENTS 4,843,568 A 6/1989 Krueger et al.
5,454,043 A 9/1995 Freeman
(Continued)

FOREIGN PATENT DOCUMENTS

EP 1883238 B1 4/2014
WO 8909972 A1 10/1989
(Continued)

OTHER PUBLICATIONS

Bretzner, Lars et al. "A Prototype System for Computer Vision Based Human Computer Interaction", Technical report CVA251, ISRN KTH NA/P--01/09-SE. Department of Numerical Analysis and Computer Science, KTH (Royal Institute of Technology), S-100 44 Stockholm, Sweden, Apr. 23-25, 2001.,Apr. 23, 2001, XP055286839, Retrieved from the Internet: URL:ftp.nada.kth.se/CVAP/reports/cva p251.pdf.
(Continued)

*Primary Examiner* — Amare Mengistu
*Assistant Examiner* — Shawna Stepp Jones
(74) *Attorney, Agent, or Firm* — Jeffrey Schox

(57) ABSTRACT

A multi-process interactive system is described. The system includes numerous processes running on a processing device. The processes include separable program execution contexts of application programs, such that each application program comprises at least one process. The system translates events of each process into data capsules. A data capsule includes an application-independent representation of event data of an event and state information of the process originating the content of the data capsule. The system transfers the data messages into pools or repositories. Each process operates as a recognizing process, where the recognizing process recognizes in the pools data capsules comprising content that corresponds to an interactive function of the recognizing process and/or an identification of the rec-
(Continued)

ognizing process. The recognizing process retrieves recognized data capsules from the pools and executes processing appropriate to contents of the recognized data capsules.

10 Claims, 28 Drawing Sheets

(51) Int. Cl.
*G06F 3/03* (2006.01)
*G06K 9/00* (2006.01)
(52) U.S. Cl.
CPC ......... *G06F 9/544* (2013.01); *G06K 9/00355* (2013.01); *G06F 2209/547* (2013.01)

(56) References Cited

U.S. PATENT DOCUMENTS

| | | |
|---|---|---|
| 5,581,276 A | 12/1996 | Cipolla et al. |
| 5,594,469 A | 1/1997 | Freeman et al. |
| 5,651,107 A | 7/1997 | Frank et al. |
| 5,982,352 A | 11/1999 | Pryor |
| 6,002,808 A | 12/1999 | Freeman |
| 6,043,805 A | 3/2000 | Hsieh |
| 6,049,798 A | 4/2000 | Bishop et al. |
| 6,072,494 A | 6/2000 | Nguyen |
| 6,075,895 A | 6/2000 | Qiao et al. |
| 6,191,773 B1 | 2/2001 | Maruno et al. |
| 6,198,485 B1 | 3/2001 | Mack et al. |
| 6,215,890 B1 | 4/2001 | Matsuo et al. |
| 6,222,465 B1 | 4/2001 | Kumar et al. |
| 6,256,033 B1 | 7/2001 | Nguyen |
| 6,351,744 B1 | 2/2002 | Landresse |
| 6,385,331 B2 | 5/2002 | Harakawa et al. |
| 6,456,728 B1 | 9/2002 | Doi et al. |
| 6,501,515 B1 | 12/2002 | Iwamura |
| 6,515,669 B1 | 2/2003 | Mohri |
| 6,703,999 B1 | 3/2004 | Iwanami et al. |
| 6,819,782 B1 | 11/2004 | Imagawa et al. |
| 7,034,807 B2 | 4/2006 | Maggioni |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,109,970 B1 | 9/2006 | Miller |
| 7,129,927 B2 | 10/2006 | Hans |
| 7,145,551 B1 | 12/2006 | Bathiche et al. |
| 7,170,492 B2 | 1/2007 | Bell |
| 7,227,526 B2 | 6/2007 | Hildreth et al. |
| 7,229,017 B2 | 6/2007 | Richley et al. |
| 7,259,747 B2 | 8/2007 | Bell |
| 7,340,077 B2 | 3/2008 | Gokturk et al. |
| 7,348,963 B2 | 3/2008 | Bell |
| 7,366,368 B2 | 4/2008 | Morrow et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,421,093 B2 | 9/2008 | Hildreth et al. |
| 7,428,542 B1 | 9/2008 | Fink et al. |
| 7,430,312 B2 | 9/2008 | Gu |
| 7,466,308 B2 | 12/2008 | Dehlin |
| 7,559,053 B2 | 7/2009 | Krassovsky et al. |
| 7,598,942 B2 | 10/2009 | Underkoffler et al. |
| 7,665,041 B2 | 2/2010 | Wilson et al. |
| 7,834,846 B1 | 11/2010 | Bell |
| 7,850,526 B2 | 12/2010 | Zalewski et al. |
| 7,979,850 B2 | 7/2011 | Ivanov et al. |
| 8,059,089 B2 | 11/2011 | Daniel |
| 8,212,550 B2 | 7/2012 | Katsurahira et al. |
| 8,363,098 B2 | 1/2013 | Rosener et al. |
| 8,370,383 B2 * | 2/2013 | Kramer ............ G06F 3/0325 707/769 |
| 8,407,725 B2 | 3/2013 | Kramer et al. |
| 8,531,396 B2 | 9/2013 | Underkoffler et al. |
| 8,537,111 B2 | 9/2013 | Underkoffler et al. |
| 8,537,112 B2 | 9/2013 | Underkoffler et al. |
| 8,625,849 B2 | 1/2014 | Hildreth et al. |
| 8,669,939 B2 | 3/2014 | Underkoffler et al. |
| 8,681,098 B2 | 3/2014 | Underkoffler et al. |
| 8,723,795 B2 | 5/2014 | Underkoffler et al. |
| 8,745,541 B2 | 6/2014 | Wilson et al. |
| 8,866,740 B2 | 10/2014 | Underkoffler et al. |
| 2002/0041327 A1 | 4/2002 | Hildreth et al. |
| 2002/0065950 A1 | 5/2002 | Katz et al. |
| 2002/0085030 A1 | 7/2002 | Ghani |
| 2002/0126876 A1 | 9/2002 | Paul et al. |
| 2002/0184401 A1 | 12/2002 | Kadel et al. |
| 2002/0186200 A1 | 12/2002 | Green |
| 2002/0186221 A1 | 12/2002 | Bell |
| 2002/0194393 A1 | 12/2002 | Hrischuk et al. |
| 2003/0048280 A1 | 3/2003 | Russell |
| 2003/0076293 A1 | 4/2003 | Hans |
| 2003/0103091 A1 | 6/2003 | Wong et al. |
| 2003/0169944 A1 | 9/2003 | Dowski |
| 2004/0125076 A1 | 7/2004 | Green |
| 2004/0145808 A1 | 7/2004 | Cathey et al. |
| 2004/0161132 A1 | 8/2004 | Cohen et al. |
| 2004/0183775 A1 | 9/2004 | Bell |
| 2004/0193413 A1 | 9/2004 | Wilson et al. |
| 2005/0006154 A1 | 1/2005 | Back et al. |
| 2005/0031166 A1 | 2/2005 | Fujimura et al. |
| 2005/0212753 A1 | 9/2005 | Marvit et al. |
| 2005/0257013 A1 | 11/2005 | Ma |
| 2006/0010400 A1 | 1/2006 | Dehlin et al. |
| 2006/0055684 A1 | 3/2006 | Rimas-Ribikauskas et al. |
| 2006/0098873 A1 | 5/2006 | Hildreth et al. |
| 2006/0138225 A1 | 6/2006 | Richley et al. |
| 2006/0173929 A1 | 8/2006 | Wilson |
| 2006/0177103 A1 | 8/2006 | Hildreth |
| 2006/0187196 A1 | 8/2006 | Underkoffler et al. |
| 2006/0208169 A1 | 9/2006 | Breed et al. |
| 2006/0269145 A1 | 11/2006 | Roberts |
| 2006/0281453 A1 | 12/2006 | Jaiswal et al. |
| 2007/0021208 A1 | 1/2007 | Mao et al. |
| 2007/0112714 A1 | 5/2007 | Fairweather |
| 2007/0121125 A1 | 5/2007 | Dodge et al. |
| 2007/0139541 A1 | 6/2007 | Fein et al. |
| 2007/0266310 A1 | 11/2007 | Sasaki et al. |
| 2007/0282951 A1 | 12/2007 | Selimis et al. |
| 2007/0288467 A1 | 12/2007 | Strassner et al. |
| 2008/0018595 A1 | 1/2008 | Hildreth et al. |
| 2008/0030460 A1 | 2/2008 | Hildreth et al. |
| 2008/0056536 A1 | 3/2008 | Hildreth et al. |
| 2008/0059578 A1 | 3/2008 | Albertson et al. |
| 2008/0062123 A1 | 3/2008 | Bell |
| 2008/0112592 A1 | 5/2008 | Wu et al. |
| 2008/0114873 A1 | 5/2008 | Chakravarty et al. |
| 2008/0137913 A1 | 6/2008 | Hildreth |
| 2008/0166022 A1 | 7/2008 | Hildreth |
| 2008/0187178 A1 | 8/2008 | Shamaie |
| 2008/0199071 A1 | 8/2008 | Gu |
| 2008/0205701 A1 | 8/2008 | Shamaie et al. |
| 2008/0208517 A1 | 8/2008 | Shamaie |
| 2008/0219502 A1 | 9/2008 | Shamaie |
| 2008/0222660 A1 | 9/2008 | Tavi et al. |
| 2008/0235965 A1 | 10/2008 | Jaiswal et al. |
| 2008/0267447 A1 | 10/2008 | Kelusky et al. |
| 2008/0273755 A1 | 11/2008 | Hildreth |
| 2009/0003686 A1 | 1/2009 | Gu |
| 2009/0027337 A1 | 1/2009 | Hildreth |
| 2009/0031240 A1 | 1/2009 | Hildreth |
| 2009/0040215 A1 | 2/2009 | Afzulpurkar et al. |
| 2009/0051648 A1 | 2/2009 | Shamaie et al. |
| 2009/0052785 A1 | 2/2009 | Shamaie |
| 2009/0079813 A1 | 3/2009 | Hildreth |
| 2010/0013905 A1 | 1/2010 | Kumar et al. |
| 2010/0060568 A1 | 3/2010 | Fisher et al. |
| 2010/0063813 A1 | 3/2010 | Richter et al. |
| 2010/0066821 A1 | 3/2010 | Rosener et al. |
| 2010/0090946 A1 | 4/2010 | Underkoffler et al. |
| 2010/0128062 A1 | 5/2010 | Kramer et al. |
| 2010/0131549 A1 | 5/2010 | Kramer et al. |
| 2010/0188328 A1 | 7/2010 | Dodge et al. |
| 2010/0207607 A1 | 8/2010 | Katsurahira et al. |
| 2010/0306713 A1 | 12/2010 | Geisner et al. |

(56) References Cited

U.S. PATENT DOCUMENTS

| | | |
|---|---|---|
| 2010/0315439 A1 | 12/2010 | Huang et al. |
| 2011/0025598 A1 | 2/2011 | Underkoffler et al. |
| 2011/0173632 A1 | 7/2011 | Arimilli et al. |
| 2012/0054671 A1 | 3/2012 | Thompson et al. |
| 2012/0069168 A1 | 3/2012 | Huang et al. |
| 2012/0200494 A1 | 8/2012 | Perski et al. |
| 2012/0206337 A1 | 8/2012 | Hildreth et al. |
| 2012/0229383 A1 | 9/2012 | Hamilton et al. |
| 2012/0239396 A1 | 9/2012 | Johnston et al. |
| 2014/0325373 A1 | 10/2014 | Kramer et al. |
| 2015/0077326 A1 | 3/2015 | Kramer et al. |

FOREIGN PATENT DOCUMENTS

| | | |
|---|---|---|
| WO | 9935633 A3 | 9/1999 |
| WO | 2008134452 A2 | 11/2008 |
| WO | 2010030822 A1 | 3/2010 |

OTHER PUBLICATIONS

Addison-Wesley: "Inside Macintosh—vol. I", vol. I Chapter 1-8, Jan. 1, 1985 (Jan. 1, 1985), pp. 1-58.
Bacon J., et al., "Using Events to Build Distributed Applications", Second International Workshop on Services in Distributed and Networked Environments, 1995, pp. 148-155.
European Search Report for Application No. EP09014670, dated Jan. 4, 2013, 20 pages.
Form PCT/ISA/210, PCT/US06/04497, "PCT International Search Report," 1 page.
Form PCT/ISA/210, PCT/US08/61457, "PCT International Search Report," 2 pages.
Form PCT/ISA/210, PCT/US09/39285, "PCT International Search Report," 2 pages.
Form PCT/ISA/220, PCT/US06/04497, "PCT Notification of Transmittal of the International Search Report and the Written Opinion of the International Searching Authority, or the Declaration," 1 page.
Form PCT/ISA/220, PCT/US08/61457, "PCT Notification of Transmittal of the International Search Report and the Written Opinion of the International Searching Authority, or the Declaration," 1 page.
Form PCT/ISA/220, PCT/US09/39285, "PCT Notification of Transmittal of the International Search Report and the Written Opinion of the International Searching Authority, or the Declaration," 1 page.
Form PCT/ISA/237, PCT/US06/04497, "PCT Written Opinion of the International Searching Authority," 3 pages.
Form PCT/ISA/237, PCT/US08/61457, "PCT Written Opinion of the International Searching Authority," 6 pages.
Form PCT/ISA/237, PCT/US09/39285, "PCT Written Opinion of the International Searching Authority," 6 pages.
Form/IB/373, PCT/US06/04497, "International Report on Patentability," 1 page.
International Search Report and Written Opinion for Application No. PCT/US2013/067129, dated Mar. 27, 2014, 5 pages.
International Search Report and Written Opinion for Application No. PCT/US2013/069725, dated Mar. 27, 2014, 5 pages.
Jiang H., et al., "Demis: A Dynamic Event Model for Interactive Systems", Proceedings of the Acm Symposium on Virtual Reality Software and Technology, 2002, pp. 97-104.
Johanson B., et al., "The Event Heap: A Coordination Infrastructure for Interactive Workspaces", Proceedings Fourth IEEE Workshop on Mobile Computing Systems and Applications, 2002, pp. 83-93.
Johanson B., et al., "The Interactive Workspaces Project: Experiences with Ubiquitous Computing Rooms", IEEE Pervasive Computing, 2002, vol. 1 (2), pp. 67-74.
Mansouri-Samani M., et al., "A Configurable Event Service for Distributed Systems", Third International Conference on Annapolis Configurable Distributed Systems, 1996, pp. 210-217.
Michael J Carey., et al., "The Architecture of the Exodus Extensible Dbms", Proceeding OODS, 1986, pp. 52-65.
Partial European Search Report for Application No. EP09014670, dated Aug. 3, 2012, 7 pages.
Partial European Search Report for Application No. EP10781229, dated Dec. 3, 2014, 6 pages.
Rubine D., "Specifying Gestures by Example", Computer Graphics, 1991, vol. 25 (4), pp. 329-337.
Supplementary European Search Report for Application No. EP06720525, dated Jul. 22, 2010, 6 pages.
Supplementary European Search Report for Application No. EP09728557, dated Sep. 29, 2014, 11 pages.
Supplementary European Search Report for Application No. EP09767774, dated Feb. 27, 2013, 11 pages.
Supplementary European Search Report for Application No. EP09812234, dated Sep. 6, 2011, 6 pages.
Supplementary European Search Report for Application No. EP09821219, dated Oct. 2, 2014, 8 pages.
Supplementary European Search Report for Application No. EP10772727, dated Nov. 26, 2012, 5 pages.
Supplementary European Search Report for Application No. EP10781229, dated Mar. 23, 2015, 11 pages.
Supplementary European Search Report for Application No. EP12802574, dated May 19, 2015, 6 pages.
Velipasalar S., et al., "Specifying, Interpreting and Detecting High-level, Spatio-Temporal Composite Events in Single and Multi-Camera Systems", Conference on Computer Vision and Pattern Recognition Workshop, 2006, pp. 110-110.
William A McCuskey., "On Automatic Design of Data Organization", American Federation of Information Processing Societies, 1970, pp. 187-199.

* cited by examiner

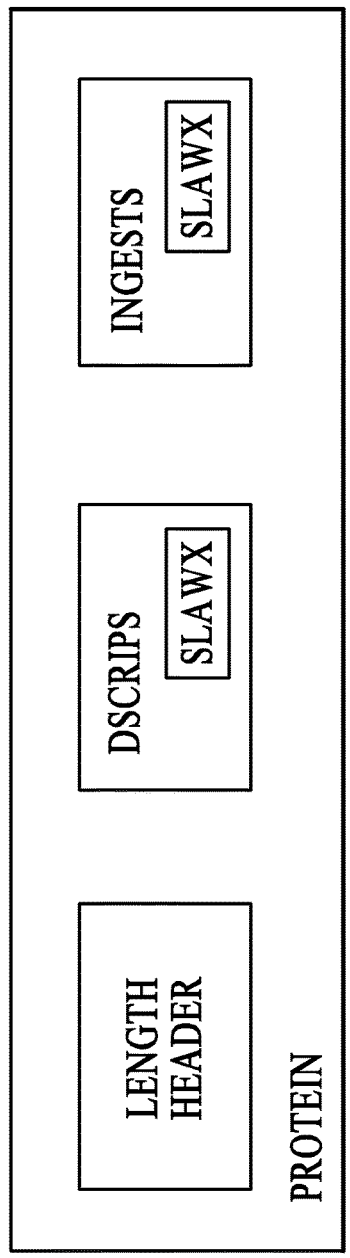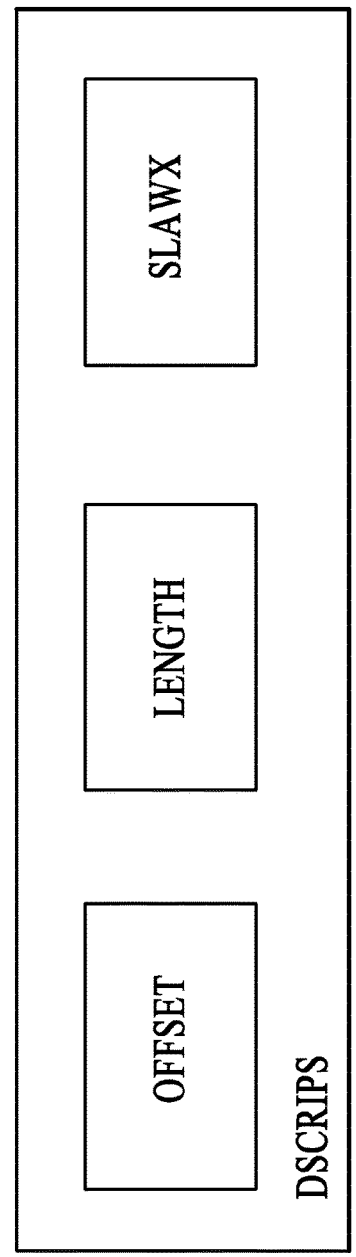
FIG.4
FIG.5 first quadword of every slaw

```
                       76543210  76543210  76543210  76543210
length-follows:        1xxxxxxx  xxxxxxxx  xxxxxxxx  xxxxxxxx
eight-byte length:     11xxxxxx  xxxxxxxx  xxxxxxxx  xxxxxxxx wee cons:              01xxxxxx  xxxxxxxx  xxxxxxxx  xxxxxxxx
wee cons quadlen:      rrqqqqqq  qqqqqqqq  qqqqqqqq  qqqqqqqq
wee string:            001xxxxx  xxxxxxxx  xxxxxxxx  xxxxxxxx
wee string quadlen:    rrrqqqqq  qqqqqqqq  qqqqqqqq  qqqqqqqq
wee list:              0001xxxx  xxxxxxxx  xxxxxxxx  xxxxxxxx
wee list quadlen:      rrrrqqqq  qqqqqqqq  qqqqqqqq  qqqqqqqq full string:           1*100000  00000000  00000000  00000001
full cons:             1*100000  00000000  00000000  00000010 full list:             1*100000  00000000  00000000  00000011
```
(the penulti-MSB above is zero or one as the length is contained in the next one or two quadwords, i.e. if it's a four or eight byte length, per the 'eight-byte length' bit description second from top)

```
numeric:               00001xxx  xxxxxxxx  xxxxxxxx  xxxxxxxx numeric float:         xxxxx1xx  xxxxxxxx  xxxxxxxx  xxxxxxxx
numeric complex:       xxxxxx1x  xxxxxxxx  xxxxxxxx  xxxxxxxx
numeric unsigned:      xxxxxxx1  xxxxxxxx  xxxxxxxx  xxxxxxxx
numeric wide:          xxxxxxxx  1xxxxxxx  xxxxxxxx  xxxxxxxx
numeric stumpy:        xxxxxxxx  x1xxxxxx  xxxxxxxx  xxxxxxxx
numeric reserved:      xxxxxxxx  xx1xxxxx  xxxxxxxx  xxxxxxxx
```

FIG.8B1

(wide and stumpy conspire to express whether the number in question is 8, 16, 32,
or 64 bits long; neither-wide-nor-stumpy, i.e. both zero, is sort of canonical and thus
means 32 bits; stumpy alone is 8; stumpy and wide is 16; and just wide is 64)

```
numeric 2-vector:     xxxxxxxx  xxx01xxx  xxxxxxxx  xxxxxxxx
numeric 3-vector:     xxxxxxxx  xxx10xxx  xxxxxxxx  xxxxxxxx
numeric 4-vector:     xxxxxxxx  xxx11xxx  xxxxxxxx  xxxxxxxx
``` for any numeric entity, array or not, a size-in-bytes-minus-one is stored in
the last eight bits -- if a singleton, this describes the size of the data part;
if an array, it's the size of a single element -- so:

```
num'c unit bsize mask:   00001xxx  xxxxxxxx  xxxxxxxx  mmmmmmmm
``` and for arrays, there're these:

```
num'c breadth follows:    xxxxxxxx  xxxxx1xx  xxxxxxxx  xxxxxxxx
num'c 8-byte breadth:     xxxxxxxx  xxxxx11x  xxxxxxxx  xxxxxxxx
num'c wee breadth mask:   xxxxxxxx  xxxxx0mm  mmmmmmmm  xxxxxxxx
```

FIG.8B2

1. Depict pose with left hand as viewed from back

| | |
|---|---|
| p = | pinkie finger |
| r = | ring finger |
| m = | middle finger |
| i = | index finger |
| t = | thumb |

| | |
|---|---|
| ^ | = curled non-thumb |
| > | = curled thumb |
| \| | = straight finger or thumb pointed straight up |
| \ or / | = straight finger or thumb pointed at angle |
| - | = thumb pointing straight sideways |
| x | = finger or thumb pointing into plane |

| Pose name | p | r | m | i | t |
|---:|:-:|:-:|:-:|:-:|:-:|
| flat | \| | \| | \| | \| | \| |
| fist | ^ | ^ | ^ | ^ | > |
| mime gun | ^ | ^ | ^ | \| | - |
| 2 or peace | ^ | ^ | \ | / | > |
| one-finger point | ^ | ^ | ^ | \| | > |
| two-finger point | ^ | ^ | \| | \| | > |
| x·y·z | ^ | ^ | x | \| | - |
| ok | \| | \| | \| | ^ | > |
| pinkie point | \| | ^ | ^ | ^ | > |
| bracket | x | x | x | x | x |
| 4 | \ | \ | \| | / | > |
| 3 | ^ | \ | \| | / | > |
| 5 | \ | \ | \| | / | / |

FIG.18

2. Add hand orientation to complete pose must specify two variables:
    1. palm direction (if hand were flat)
    2. finger direction (if hand were flat)

| | |
|---|---|
| - | medial |
| + | lateral |
| x | anterior |
| * | posterior |
| ^ | cranial |
| v | caudal | orientation variables come after colon, e.g.:

^ ^ x | - : - x      =      x-y-z start position

^ ^ \ / > : * v      =      upside-down v

FIG.19

3. Two-hand combos

| Hand 1 | Hand 2 | Pose |
|---|---|---|
| ^ ^ ^ ^ > : x ^ | ^ ^ ^ ^ > : x ^ | full stop |
| ^ ^ ^ \| - : x - | ^ ^ ^ \| - : x ^ | snapshot |
| \| \| \| \| \| : v x | \| \| \| \| \| : - x | rudder and throttle start position |

FIG.20

| Gest I.D. | Description | Hand 1 Pose | Hand 1 Motion | Hand 2 Pose | Hand 2 Motion |
|---|---|---|---|---|---|
| 1 | point at object (invoke and move cursor) | ^^^\|-:-x | point mime gun | | |
| 2 | select object | ^^\|\|:-x | drop thumb to select | | |
| 3 | move spatially / zoom in/out | ^^x\|-:-x | rotate/translate | | |
| 4 | snapshot | ^^^\|-:x- | make square with 2 hands | ^^^\|-:x^ | make square with 2 hands |
| 5 | demarcate rectangular region | ^^^\|-:x- | make square then adjust size | ^^^\|-:x^ | make square then adjust size |
| 6 | clear the decks | \|\|\|\|:+x | sweep hand laterally | \|\|\|\|:-x | sweep hand medially |
| 7 | organize objects into a circle | ^^^\|-:-^ | look through circle of O.K. sign | | |
| 8 | two-finger point at objects | ^^\|-:-x | point | | |
| 9 | two-finger select object | ^^^\|:-x | drop thumb to select | | |
| 10 | mark start time | xxxxx:-^ | strike pose | | |
| 11 | mode change I | \|\|\|\|:-^ | strike pose - make "T" with two hands | \|\|\|\|:v- | strike pose - make "T" with two hands |
| 12 | mode change II | \|\|\|\|:-^ | strike pose - parallel hands | \|\|\|\|:-^ | strike pose - parallel hands |
| 13 | push back and slide workspace | \|\|\|\|-:x^ | push palm toward screen -- move sideways to find new regions | | |

FIG.23A

| | | | | |
|---|---|---|---|---|
| 14 | enter sub-application | ‖‖‖‖ : x ^ | strike pose | ‖‖‖‖ : x ^ | strike pose |
| 15 | return from sub-application | ‖‖‖‖ : . ^ | strike pose | ‖‖‖‖ : . ^ | strike pose |
| 16 | select option | ^^^ \| - : - x | medial roll | | |
| 17 | roll time forward/back | ‖‖‖‖ : v x | Yaw hand at elbow while keeping hand parallel to floor | | |
| 18 | stop time | ‖‖‖‖ : x ^ | strike pose | | |
| 19 | loop time | ^^^ \| - : x ^ | circular motion with "L" | | |
| 20 | demarcate irregular region | ^^^ \| - : v x | start with 2 finger tips together. 1 hand holds start position. | ^^^ \| - : - x | other hand traces out shape select "click" for vertices |
| 21 | tag object | \| ^^^ > : - x | pinky-point at object then roll hand medially | | |
| 22 | group data streams | ^^^ \| - : v x | bring finger tips of two hands together | ^^^ \| - : v x | bring finger tips of two hands together |
| 23 | restore encapsulated workspace | ‖‖‖‖ : + x | sweep hand medially | ‖‖‖‖ : - x | sweep hand laterally |

FIG. 23B

MULTI-PROCESS INTERACTIVE SYSTEMS AND METHODS

RELATED APPLICATIONS

This application is a continuation of U.S. patent application Ser. No. 12/579,372, filed Oct. 14, 2009.

TECHNICAL FIELD

Embodiments are described relating to the representation, manipulation, and exchange of data within and between computing processes.

BACKGROUND

Conventional programming environments do not fully support multi-computer processing unit (CPU) and cross-network execution, or flexible sharing of data between large numbers of computing processes. User-facing computer programs have traditionally been constructed so that the majority of processing and all graphical output is produced by a single computational process. This mechanism, though standard and well-supported by tool-chains, development environments and operating systems, scales poorly and is a significant contributor to the bloat and brittleness of widely-used contemporary applications.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE DRAWINGS

FIG. 4 is a block diagram of a protein, under an embodiment.

FIG. 5 is a block diagram of a descrip, under an embodiment.

FIGS. 8B1 and 8B2 show a slaw header format, under an embodiment.

FIG. 18 is a diagram of poses in a gesture vocabulary, under an embodiment.

FIG. 19 is a diagram of orientation in a gesture vocabulary, under an embodiment.

FIG. 20 is a diagram of two hand combinations in a gesture vocabulary, under an embodiment.

FIGS. 23A and 23B are an example of commands, under an embodiment.

DETAILED DESCRIPTION

Figure 1A:
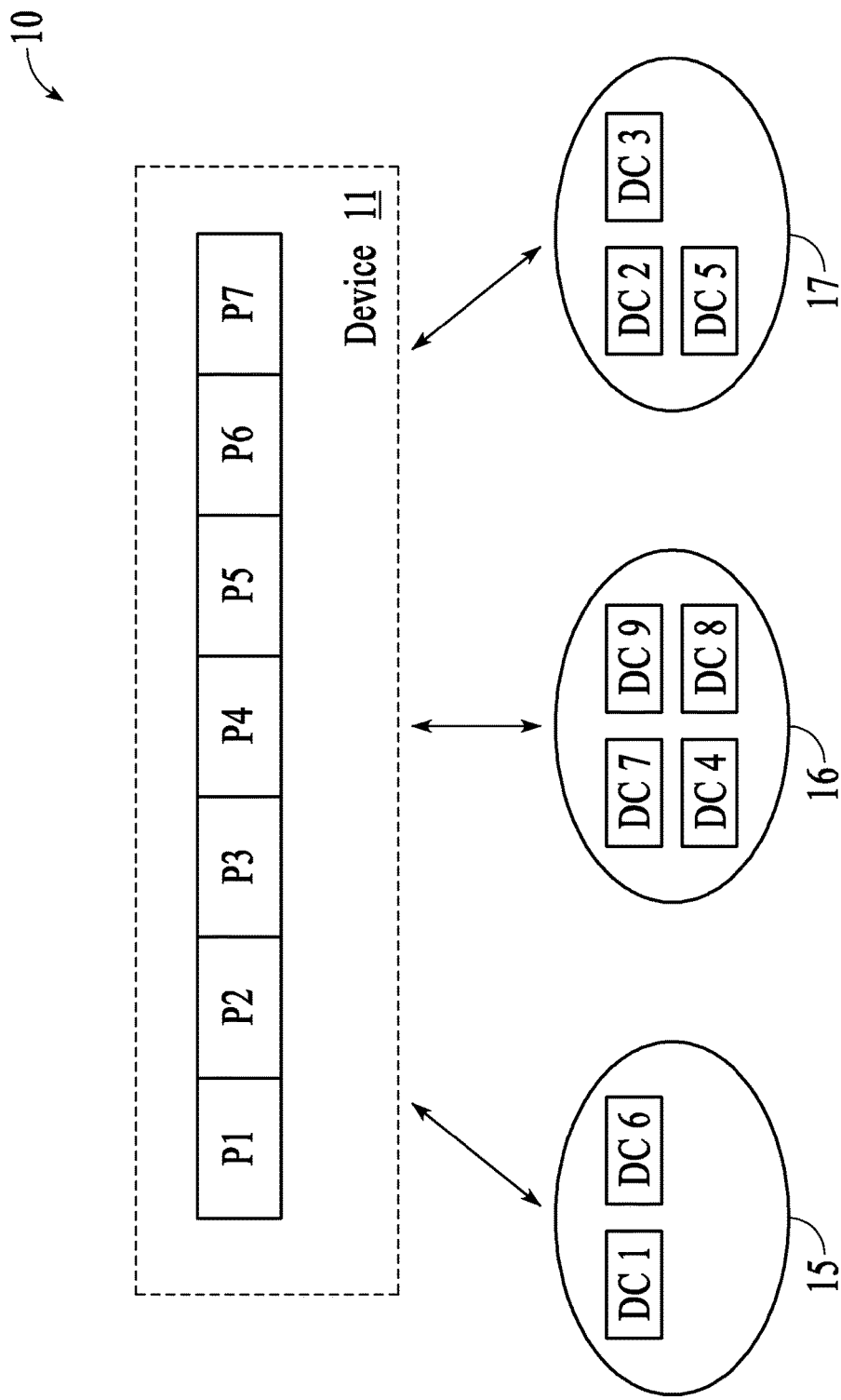
FIG. 1A is a block diagram of a multi-process interactive system, under an embodiment.

Embodiments are described herein that include systems and methods for coordinating the behaviors and outputs of multiple computer processes so as to give rise to an interactive application. The embodiments described herein, generally referred to as a multi-process interactive system, program or application, include an application program divided into a number of distinct computer processes capable of executing in parallel. A set of these processes is able to produce portions of the overall system output with which the user interacts. A set of these processes has access to a structured and well-defined data exchange mechanism that is used to coordinate activity. A set of these processes is operable to make use of user input (e.g., raw user input, heavily transformed user input, raw and heavily transformed user input, etc.) via the structured data exchange mechanism.

The embodiments described herein provide modularity for application components across the boundary of computational processes. As a result of the modularity provided, the embodiments described herein provide component reuse, greater opportunities for interoperability, easier testing and verification, increased robustness, and fault tolerance during execution.

Furthermore, contemporary computers often contain multiple processor elements (CPU cores, for example). The embodiments herein scale much better on multiple processor architectures than traditional application construction techniques. This "multi-core" scaling is becoming more and more important as trends in computer design and manufacturing increasingly favor increased core counts rather than increased clock speeds.

The embodiments described herein enable dynamic construction, destruction and recombination of process components. The embodiments described herein enable extension of the structured data exchange mechanism across multiple computers using networking (or other interconnection) protocols. The embodiments described herein enable dynamic transfer of process components between computers. The embodiments described herein enable dynamic optimization of the structured data exchange mechanism according to the number, composition and execution contexts of the participating processes. The embodiments described herein enable graphical output created on multiple computers to be combined together on a single display. The embodiments described herein enable shared, coordinated graphical contexts encompassing multiple displays. The embodiments described herein enable shared, coordinated, multi-display graphical contexts encompassing multiple displays driven by multiple computers. The embodiments described herein introduce automatic history buffer built into the structured data exchange mechanism, so that some amount of past data is always available to application components.

The following terms are intended to have the following general meaning as they are used herein. The term "processes" as used herein means separable program execution contexts. Computer architectures and operating systems differ in the technical details of process implementation. The mechanism described here is configured to operate across a broad range of process implementations and to facilitate hybrid application designs or configurations that take advantage of as many available computing resources as possible.

The term "device" as used herein means any processor-based device running one or more programs or algorithms, any processor-based device running under one or more programs or algorithms and/or any device coupled or connected to a processor-based device running one or more programs or algorithms and/or running under one or more programs or algorithms. The term "event" as used herein means any event associated with a running or executing program or algorithm, a processor-based device and/or a device coupled or connected to a processor-based device (e.g., an event can include, but is not limited to, an input, an output, a control, a state, a state change, an action, data (regardless of format of the data or stage in the processing from with which the data is associated), etc.).

In the following description, numerous specific details are introduced to provide a thorough understanding of, and enabling description for, embodiments described herein. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

The embodiments herein include systems and methods that execute numerous processes on at least one processing device. The systems and methods of an embodiment translate events of each process into data capsules. The systems and methods of an embodiment transfer the data capsules into a number of pools or repositories. Each process operates as a recognizing process, where the recognizing process recognizes in the pools data capsules comprising content that corresponds to an interactive function of the recognizing process and/or an identification of the recognizing process. The recognizing process retrieves recognized data capsules from the pools and executes processing appropriate to contents of the recognized data capsules.

For example, FIG. 1A is a block diagram of a multi-process interactive system 10, under an embodiment. This system 10 includes a processing device 11 hosting or executing any number of processes P1-P7. The multi-process interactive system 10 of this example includes or runs across one computer 11 but is not limited to one computer and could run across any number and/or combination of processing devices or systems. The processes P1-P7 of an embodiment include separable program execution contexts of one or more application programs, wherein each application program comprises at least one process, but the embodiment is not so limited. The events generated or produced during execution of each process are translated into some number of data capsules DC1-DC9, and the data capsules are transferred into a number of pools 15-17 or repositories. The oval elements of system 10 represent the pools 15-17, where the pools or repositories are a mechanism for structured data exchange as described in detail below and in the Related Applications. The data capsules DC1-DC9, also referred to as data messages, that pass through the pools 15-17 are generically described as "proteins," as described below.

Each process P1-P7 operates as a recognizing process, where the recognizing process recognizes in the pools 15-17 data capsules comprising content that corresponds to an interactive function of the recognizing process P1-P7 and/or an identification of the recognizing process P1-P7. The recognizing process P1-P7 retrieves recognized data capsules DC1-DC9 from the pools and executes processing appropriate to contents of the recognized data capsules. The multi-process interactive system 10 in described in more detail below with reference to FIGS. 3-15.

Figure 1B:
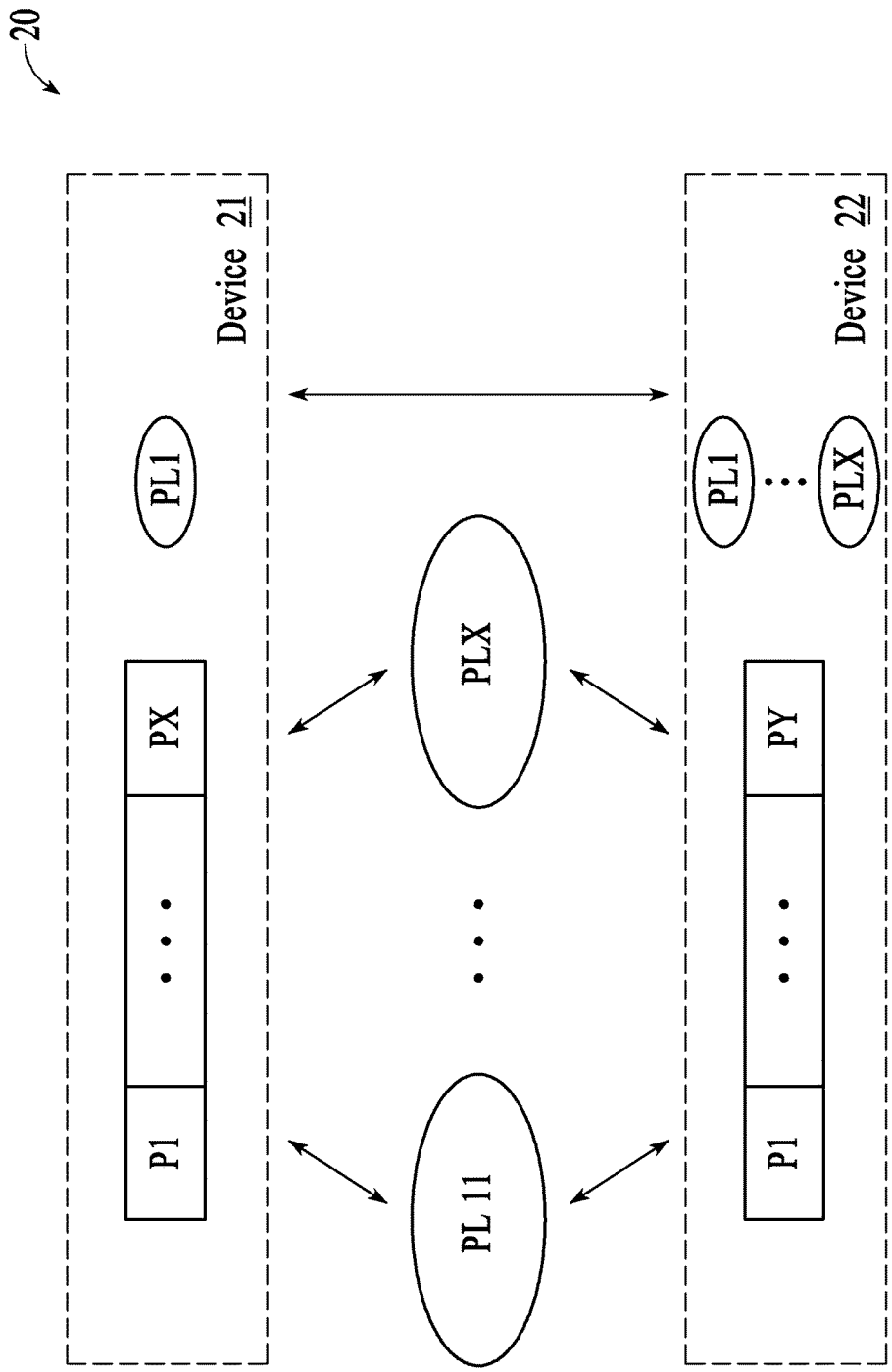
FIG. 1B is a block diagram of a multi-process interactive system, under an alternative embodiment.

FIG. 1B is a block diagram of a multi-process interactive system 20, under an alternative embodiment. This system 20 includes a processing device 21 hosting or executing any number of processes P1-PX, where X represents any number as appropriate to a configuration of processing device 21 and/or system 20. The system 20 also includes a processing device 22 hosting or executing any number of processes P1-PY, where Y represents any number as appropriate to a configuration of processing device 22 and/or system 20. The multi-process interactive system 20 of this example includes or runs across two processing devices 21/22 but is not limited to two devices and could run across any number and/or combination of processing devices or systems. The processes P1-PX and P1-PY of an embodiment include separable program execution contexts of one or more application programs, wherein each application program comprises at least one process, but the embodiment is not so limited.

The events generated or produced during execution of each process are translated into data capsules (not shown), and the data capsules are transferred into one or more pools. The oval elements of system 20 represent the pools, where the pools or repositories are a mechanism for structured data exchange as described in detail below and in the Related Applications. In this example, a pool PL1 is hosted on processing device 21, but any number of pools can be hosted on processing device 21. Pools PL1-PLY are hosted on processing device 22, where Y represents any number as appropriate to a configuration of processing device 22 and/or system 20; any number of pools can be hosted on processing device 22. The system 20 also includes pools PL11-PLX, where X represents any number as appropriate to a configuration of processing device 22 and/or system 20; any number of pools can be hosted in system 20. Any process and/or device generating data capsules can transfer the data capsules into any pool in the system.

Each process P1-PX/P1-PY operates as a recognizing process, where the recognizing process recognizes in the pools data capsules comprising content that corresponds to an interactive function of the recognizing process P1-PX/P1-PY and/or an identification of the recognizing process P1-PX/P1-PY. The recognizing process P1-PX/P1-PY retrieves recognized data capsules from the pools and executes processing appropriate to contents of the recognized data capsules. The multi-process interactive system 20 in described in more detail below with reference to FIGS. 3-15.

The embodiments herein include systems and methods that execute numerous processes on at least one processing device. The processes of an embodiment include separable program execution contexts of a plurality of application programs, wherein each application program comprises at least one process. The systems and methods of an embodiment translate events of each process of the plurality of processes into data capsules. A data capsule includes an application-independent representation of event data of an event and state information of the process originating the data capsule. The systems and methods of an embodiment transfer the data capsules into a number of pools or repositories. Each process of an embodiment operates as a recognizing process. The recognizing process recognizes in the pools data capsules comprising content that corresponds to an interactive function of the recognizing process and/or an identification of the recognizing process. The recognizing process retrieves recognized data capsules from the pools and executes processing appropriate to contents of the recognized data capsules.

Examples of embodiments described herein include systems and methods for coordinating the behaviors and graphical outputs of multiple computer processes to enable an interactive application. While this example is directed to graphical processing and graphical outputs, embodiments of the multi-process interactive system are not limited to graphical processes and can apply to any processes running under any number of processing devices. The multi-process interactive system includes an application program divided into a number of distinct computer processes capable of executing in parallel, and a set of these processes is able to produce portions of the overall graphical output with which a user interacts. A set of these processes has access to a structured and well-defined data exchange mechanism that is used to coordinate activity such that the set of these processes is operable to make use of user input via the structured data exchange mechanism.

As a more specific example, the description that follows teaches a multi-process graphical program, referred to herein as Squares, as an example instantiation of embodiments that coordinate the behaviors and graphical outputs of multiple computer processes so as to give rise to an interactive application. The description of this example instantiation is intended show how the mechanism disclosed herein operates at a level of detail sufficient to implement it for any interactive program. The mechanism (and indeed the component parts of it) is fully general and may, in practice, be implemented in a variety of different ways. As is typically the case in such programs, the mechanism disclosed herein provides major services including, but not limited to, access to user input, fine-grained coordination of program state across processes, and coordination of graphical output.

The Squares program presented herein serves to demonstrate several kinds of basic coordination that are useful in real-world programs. The Squares program provides for a flexible number of colored, translucent squares to be rendered on one or more computer displays. Each of these squares is embodied in a single computational process. The states and graphical particulars of each square depend on a variety of factors, including user input actions, the states of other squares, and globally delivered external messages. The squares may be moved around on the display using an input device (e.g., mouse, touch-screen, etc.). A gestural/spatial input system as described in the Related Applications may also be used to move the squares, in which case the squares can be positioned on any of the displays available to computers that are participating in the gestural/spatial network.

Figure 1C:
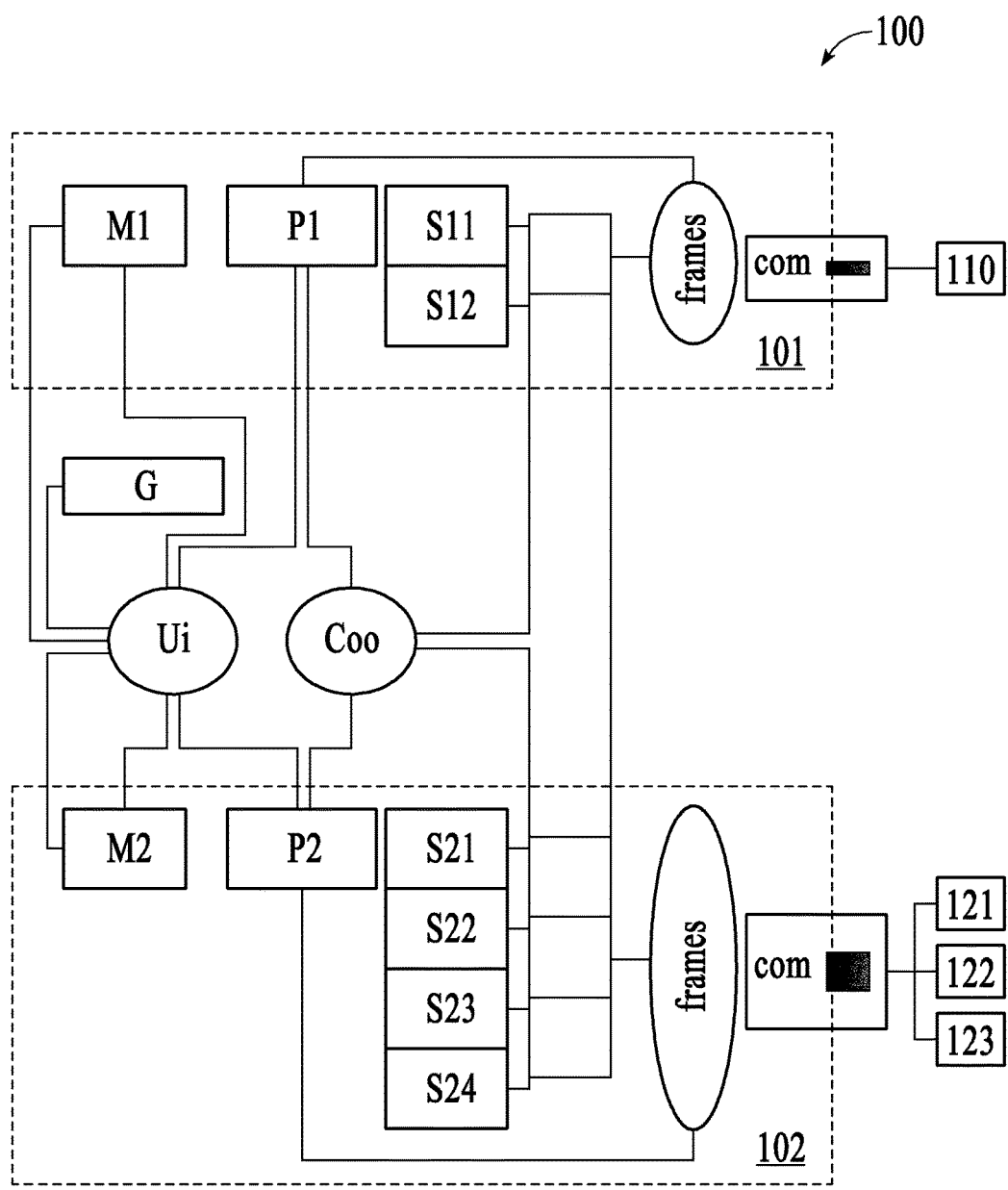
FIG. 1C is a block diagram of a multi-process interactive system, under another alternative embodiment.

FIG. 1C is a block diagram of a multi-process interactive system 100, under another alternative embodiment. This system 100 includes the processes and interconnections that combine to form an example run of the program. The solid rectangle elements (e.g., elements M, P, S, G, generally) represent processes in the system 100. The oval elements (e.g., elements Ui, Coo, frames) represent pools, a mechanism for structured data exchange as described in detail below and in the Related Applications. The data messages that pass through the pools are generically described as "proteins," as described below.

The multi-process interactive system 100 of this example includes or runs across two computers 101 and 102 but is not limited to two computers and could run across any number and/or combination of processing systems. In this example, a first computer 101 hosts processes embodying two squares S (e.g., S21, S22), and a second computer 102 hosts processes embodying four squares S (e.g., S11, S12, S13, S14). Alternative embodiments can include any number of squares processes S running on any number of computers. The first computer 101 is coupled to a single display 110, and the second computer 102 is coupled to three displays 121, 122, 123. Alternative embodiments can include any number of displays coupled to any number of computers.

Each of the two computers 101 and 102 hosts at least one 'mouse' process M (e.g., M1, M2). The mouse process M includes a high-level driver that transforms computer mouse input events into a suitable stream of user input proteins and delivers those proteins into at least one 'user input' pool Ui. A gestural/spatial system (as described in detail below), encapsulated as a gestural/spatial process G, also delivers user input proteins into the user input pool Ui.

Each of the two computers 101 and 102 also hosts at least one 'pointers' process P (e.g., P1, P2). The pointers process P takes or receives data from the Ui pool and is responsible for determining where the user is directing pointer "attention", and for drawing or rendering appropriate pointer graphics. The pointers process P places data relating to or representing pointer locations and modes into a 'coordination' pool Coo. The pointers process P delivers graphical output into the 'frames' pool, which is a specialized abstraction described in detail below.

Further, each of the two computers 101 and 102 hosts several 'square' processes S, as described above. Each square process S consults the coordination pool Coo for pointer data and for the states of peer square processes S. Each square process S also places data back into the coordination pool Coo describing their own spatial and modal states. The square process S delivers graphical output into the 'frames' pool. The frames pool is a specialized abstraction, described in detail below.

The gestural/spatial process G along with the user input pool Ui and coordination pool Coo can be hosted on either of the two computers 101 and 102. Alternatively, hosting of the gestural/spatial process G along with the user input pool Ui and coordination pool Coo can be shared between the two computers 101 and 102. As yet another alternative configuration, the gestural/spatial process G along with the user input pool Ui and coordination pool Coo can be hosted on other computers (not shown).

For proteins deposited into the local frames pool, the system 100 includes a dedicated compositing process com that combines frame layers into a single frame of output for each display, many times each second. The overall display frame-rate is generally set by a system-level configuration choice, but each of the individual processes that make up the squares application is enabled to use a different frame-rate. The compositing process com takes care of matching up the frame layers appropriately.

Figure 2:
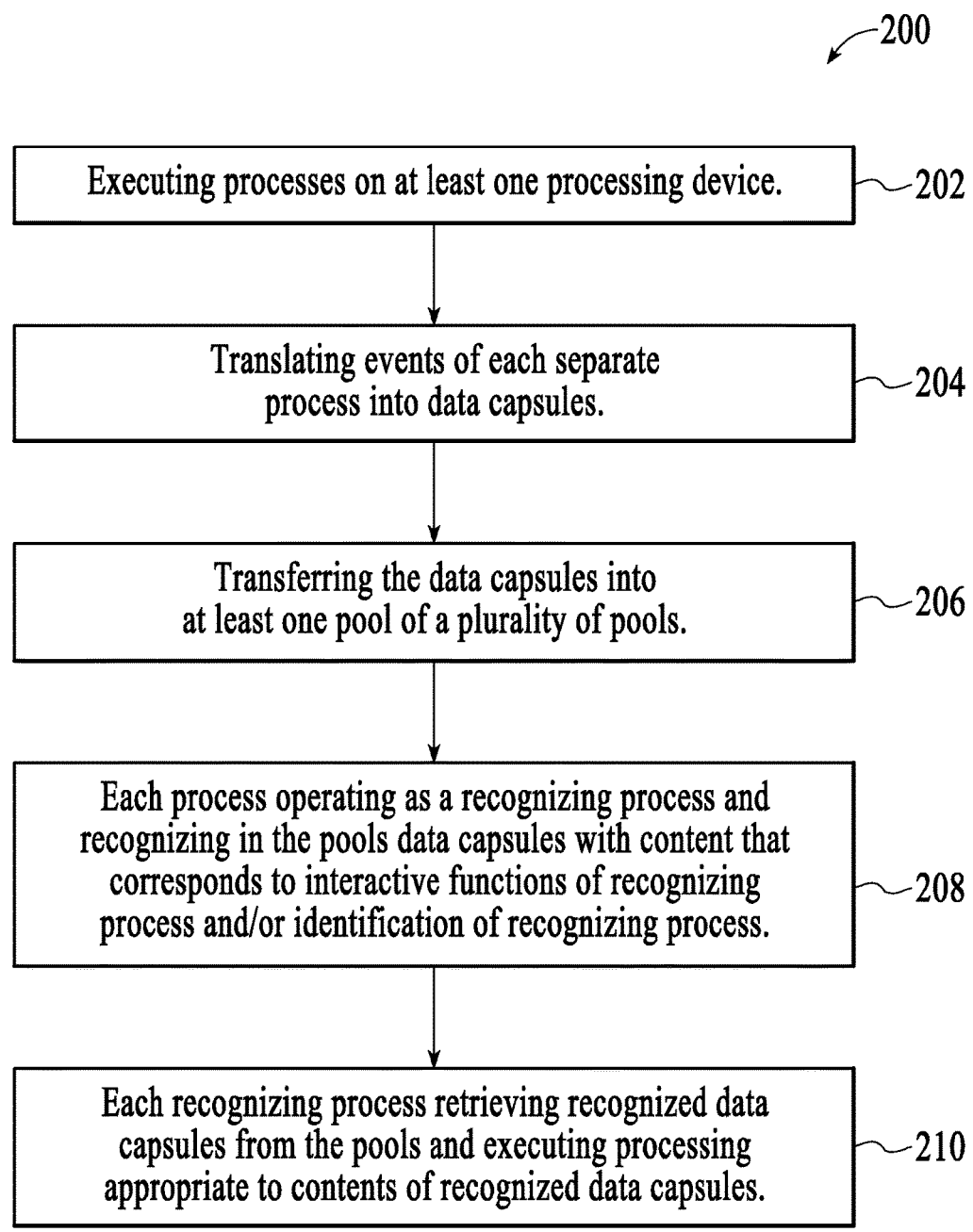
FIG. 2 is a flow diagram for operations of the multi-process interactive system, under an embodiment.

FIG. 2 is a flow diagram 200 for operations of the multi-process interactive system, under an embodiment. The operations include executing a plurality of processes on at least one processing device 202. The plurality of processes include separable program execution contexts of a plurality of application programs, such that each application program comprises at least one process. The operations include translating events of each process of the plurality of processes into data capsules 204. A data message includes an application-independent representation of event data of an event and state information of the process originating the data message. The operations include transferring the data messages into at least one pool of a plurality of pools 206. Each process operates as a recognizing process such that the recognizing process recognizes in the plurality of pools data capsules comprising at least one of content that corresponds to an interactive function of the recognizing process and an identification of the recognizing process 208. The recognizing process retrieves recognized data capsules from the plurality of pools and executes processing appropriate to contents of the recognized data capsules 210. The operations of the multi-process interactive system enable coordination among the processes, where the coordinating includes each process of the plurality of processes coordinating with peer processes of the plurality of processes by retrieving from the plurality of pools state information of the peer processes. The operations also enable generation of an output of the plurality of processes by interactively combining content of a set of data capsules of at least one pool of the plurality of pools.

In handling mouse and gestural/spatial inputs, the mouse process M monitors the low-level mouse hardware and translates traditional mouse driver events into proteins that are screen independent. A mouse process M protein of an embodiment delivered to the user input pool Ui, in accordance with the description below, is as follows:

descrips:
input driver
mango.local
mouse
ingests:
id: 0x012345
pos: [1280,800]
buttons: [1]

A gestural/spatial process G protein would look similar, as follows:

descrips:
input driver
mango.local
hand
ingests:
id: 0x017845
gripe: ..|||
pos: [127.4, 10.5, 12.2]
point: [[−0.099833, 0.000000, −0.995004], [0.099335 0.995004 −0.009967]]

The pointers processes P interpret these messages as implying the position in three-dimensional space of the various pointers that they are responsible for drawing. A static set of pointers may have been defined in the application code, or earlier proteins may have defined and initialized the pointers.

For the instantiation of the Squares program running within a spatial operating environment, each of the pointers processes P knows the exact real-world positions of the display screens attached to the computers they are hosted by. Again, these display screens may have been initialized at start-up or dynamically by data messages.

As proteins arrive in the user input pool Ui, the pointers processes P react by constructing new proteins and delivering them to the coordination pool Coo, as follows:

descrips:
pointer
click
mouse
ingests:
mid: 0x2345
origin: [0.0, 0.0, 0.0]
passes-through: [0.0, 1625.6, −2349.3]
descrips:
pointer
click
hand
one-finger
ingests:
mid: 0x2372
origin: [127.4, 10.5, 12.2]
passes-through: [0.0, 1625.6, −2349.3]

These proteins or messages define the position of pointer objects with respect to the available displays. Each pointer process P is configured so as to manage the mathematical transformations for the displays attached only to the computer on which it is hosted.

Periodically, each pointer process P also draws a frame of graphical output. This graphical data is delivered to the frames pool. Each frame produced by the pointer process P renders all of the pointer graphics that will appear on the displays attached to the computer hosting that process.

Turning to the application model and graphics of an embodiment, the square processes S are responsible for tracking and drawing the translucent squares that are the focal point of the Squares application. Each square has a position, orientation, size and color. The square processes S put proteins into the coordination pool Coo any time the state of a square changes:
  descrips:
  tsquare
  position
  ingests:
  tid: 0x45878912
  pos: [0.0, 0.0, 0.0]
  up: [0.0, 1.0, 0.0]
  over: [1.0, 0.0, 0.0]
  size: 25.0
  color: [1.0, 1.0, 1.0, 1.0]

The square processes S also deliver graphical output to the frames pool, much as the pointer processes do. Each square process S, however, renders its own square whether or not that square will appear on a display attached to the computer hosting the process. Frame handling is described in detail below.

The placing or transfer of proteins describing the state of the pointers and squares into a multi-subscriber pool allows the separate processes that make up this application to coordinate, thus providing coordination between dissimilar processes. The square processes S of an embodiment monitor for proteins that indicate a pointer passing into the area of the square's boundary. When this happens, the square process S puts a protein into the pool indicating the overlap and references to the square and the pointer involved, as follows:
  descrips:
  tsquare
  pointer-overlap
  entrance
  ingests:
  tid: 0x45878912
  mid: 0x2372

The pointers processes P monitor for proteins of this form. When a pointer process P identifies or sees an overlap protein referencing it's own mid, it changes the graphical representation it uses when drawing the pointer frame. The overlap-indicative graphic will be used until the process sees an appropriate overlap-exit protein, for example:
  descrips:
  tsquare
  pointer-overlap
  exit
  ingests:
  tid: 0x45878912
  mid: 0x2372

Many variations to the above coordination strategy are possible. The pointers processes P could handle the duty of checking for geometric overlap (rather than the squares processes S doing so as described above). The processes could all be frame-synchronized and an overlap protein could be generated for every frame, which would eliminate the need for separate entrance and exit proteins.

There is nearly always a diversity of solutions available for any given coordination problem faced when working within the mechanism described herein. This flexibility is, in fact, one of the strengths of the embodiments herein. The description herein documents at least one of the solutions implemented for several of the interlocking problems faced in attempting to construct a typical multi-process graphical application. A number of references collect useful messaging patterns, many of which are applicable, for example, "Enterprise Integration Patterns: Designing, Building and Deploying Messaging Solutions" by G. Hohpe and B. Woolf, ISBN 0321146530.

In connecting user input to manipulatory actions under an embodiment, interactively moving a square includes the squares processes S making use of the data that the pointers processes P put into the coordination pools Coo. A squares process S initializes a move in response to the combination of a recognized pointer overlap condition and a protein with "pointer" and "click" descrips. The graphical representation of the square changes while a move is in progress, and the position of the square in space follows the pointer. The move continues until a corresponding "pointer"/"unclick" protein occurs.

The squares of an embodiment also change their colors when they overlap one another. Whenever an S process sees a "tsquare"/"position" protein, it calculates whether there is any overlap between itself and the depositor of that protein. If so, it uses an overlap-indicative color when it renders its next frame, otherwise, it uses its normal color.

Note that the flexibility of the loosely-coupled architecture of an embodiment provides for other or alternative ways of implementing this behavior. The squares processes S could avoid doing the overlap calculations and instead offload this work to another process, for example, which would continually do the math for some or all squares and drop proteins describing an overlap condition into the coordination pool Coo. The squares processes S would simply wait for these proteins:
  descrips:
  tsquare
  square-overlap
  ingests:
  tids: [0x45878912, 0x45878916].

This flexibility to slice and dice the application workloads is very useful. Compute-intensive jobs can move to processors or machines that have spare power. Producers of data can instantiate helper processes as needed (and terminate them when they are no longer needed). Greater computational and rendering resources can be applied to application areas that a user is interacting directly with, or where a user is immediately able to perceive greater granularity, detail or refresh rates.

All of this is possible because the multi-process interactive system described herein externalizes application state and allows multi-process access to that state. In contrast, with contemporary programming models runtime state is almost entirely "locked up" inside an individual process.

The multi-process interactive system encourages programmers to expose all interactive functionality as protein-drivable state. The Application Programming Interface (API) is defined by the proteins that each process recognizes, rather than by traditional function calls. For example, a protein is defined that changes the color of any (or all) of the squares:

descrips:
tsquare
color-change-command
ingests:
tids: [0x0]
normal-color: [1.0, 0.0, 0.0, 0.65]
overlap-color: [1.0, 0.0, 0.0, 1.0]

When any squares process S sees this protein in the coordination pool Coo, it checks the tids list to see whether either its own unique object id or the general address 0x0 is present. If so, the process begins to render its square using the two new colors specified (one for the normal case and one for the overlap case).

Using this mechanism and this "expose all interactive functions as proteins" approach, a new utility to control the color of squares can be written after all the other code for the Squares application is already finished, deployed and running. No recompilation or relinking is necessary to add new functionality into the running application.

Interactive debuggers for graphical applications are another program type that benefit from this approach. Traditional debuggers generally need to pause a program before they can display very much about a programs internal state. If all of the manipulable state of a program is exposed via a pool as described herein, however, a debugger can both monitor and manipulate program state while the program is running.

Both the pointer processes P and square processes S push graphics data to the frames pools in order for any display output to become visible to users. The embodiments described herein include multiple ways for outputting graphics, some of which are described here in detail. Other embodiments can operate under different combinations of the processes described below for pushing graphics data to the frames pools and outputting graphics.

In an embodiment, processes may use a direct rendering framework, such as OpenGL, to draw directly to a system graphics layer. Under this approach, a pool is used for coordination, but not for graphics commands or pixel data.

Another embodiment outputs graphics data via processes that deliver rendering commands to a pool. Another process (or processes) is then responsible for interpreting the rendering commands and driving the system graphics layer. These commands can be very low-level, such as bare OpenGL calls, for example. Conversely, these rendering commands can be very high-level, for example, like the tsquare proteins described above that comprise sufficient information that a dedicated rendering process could draw the squares frame by frame.

Yet another embodiment outputs graphics data via processes that render to in-memory pixel buffers, then transfer or place the resulting raw frame data into a pool. Another process (or processes) combines the raw frame data. The volume of data that the pool handles is generally much larger with this approach than for the graphics output approaches described above. Local rendering and network frame transport provides a great deal of flexibility, however, so if a high-bandwidth network and a fast pools implementation is available, this is often used.

The example system 100 described above with reference to FIG. 1C generally outputs graphics data via processes that render to in-memory pixel buffers, then transfers the resulting raw frame data into a pool. Another process (or processes) combines the raw frame data. The volume of data that the pool handles is generally much larger with this approach than for the graphics output approaches described above. Local rendering and network frame transport provides a great deal of flexibility, however, so if a high-bandwidth network and a fast pools implementation is available, this is often used.

Therefore, the pointer processes P and square processes S each render their own individual graphical elements. Each process chooses a number of color components and a number of pixels to render. A process can render a full display's worth of pixels (2560×1600, for example) using components of the RGBA (red, green, blue, alpha) color space or the RGB color model with alpha blending and alpha compositing. To save compute cycles, rendering overhead and pools bandwidth, though, a process may produce only as many pixels as are necessary to capture the projected bounding box of a particular graphical object, and may use only two components if a luminance (with transparency) rendering is sufficient.

Rendered pixel data is transferred or delivered into the frames pool along with a variety of metadata (e.g., geometric extent, layering information, frame-rate indications, extra color information, etc). As the Squares application is running in the context of a spatial operating environment, each process has access to real-world geometry data and is able to deliver appropriate output to each of the frames pools. This may involve rendering more than one frame for each output cycle.

Protein deposit into a local frames pool occurs at a rate that generally makes unnecessary compression of pixel data. To achieve relatively low latency for interactive applications, however, network deposits can reduce the amount of data sent for each frame. An embodiment uses hardware compression to reduce the number of bytes required to represent each array of pixels, but the embodiment is not so limited.

With reference to FIG. 1C, an embodiment of the system 100 uses a dedicated compositing process COM that combines these frame layers into a single frame of output for each display, many times each second. The overall display frame-rate is generally set by a system-level configuration choice, but each of the individual processes that make up the squares application is enabled to use a different frame-rate. The compositing process com takes care of matching up the frame layers appropriately.

As described above with reference to FIGS. 1A-1C, the multi-process interactive system of an embodiment includes processes, pools, and proteins. The solid rectangles in the system represent processes, while the ovals represent pools, a mechanism for structured data exchange. The data messages that pass through the pools are generically described as "proteins." Each of the processes generates proteins and deposits the proteins into one or more pools, and retrieves proteins from the one or more pools.

The pools and proteins are components of methods and systems described herein for encapsulating data that is to be shared between or across processes. These mechanisms also include slawx (plural of "slaw") in addition to the proteins and pools. Generally, slawx provide the lowest-level of data definition for inter-process exchange, proteins provide mid-level structure and hooks for querying and filtering, and pools provide for high-level organization and access semantics. Slawx include a mechanism for efficient, platform-independent data representation and access. Proteins provide a data encapsulation and transport scheme using slawx as the payload. Pools provide structured and flexible aggregation, ordering, filtering, and distribution of proteins within a process, among local processes, across a network between remote or distributed processes, and via longer term (e.g. on-disk, etc.) storage.

The configuration and implementation of embodiments of the multi-process interactive system include several constructs that together enable numerous capabilities. For example, the embodiments described herein provide efficient exchange of data between large numbers of processes as described above. The embodiments described herein also provide flexible data "typing" and structure, so that widely varying kinds and uses of data are supported. Furthermore, embodiments described herein include flexible mechanisms for data exchange (e.g., local memory, disk, network, etc.), all driven by substantially similar application programming interfaces (APIs). Moreover, embodiments described enable data exchange between processes written in different programming languages. Additionally, embodiments described herein enable automatic maintenance of data caching and aggregate state.

Figure 3:
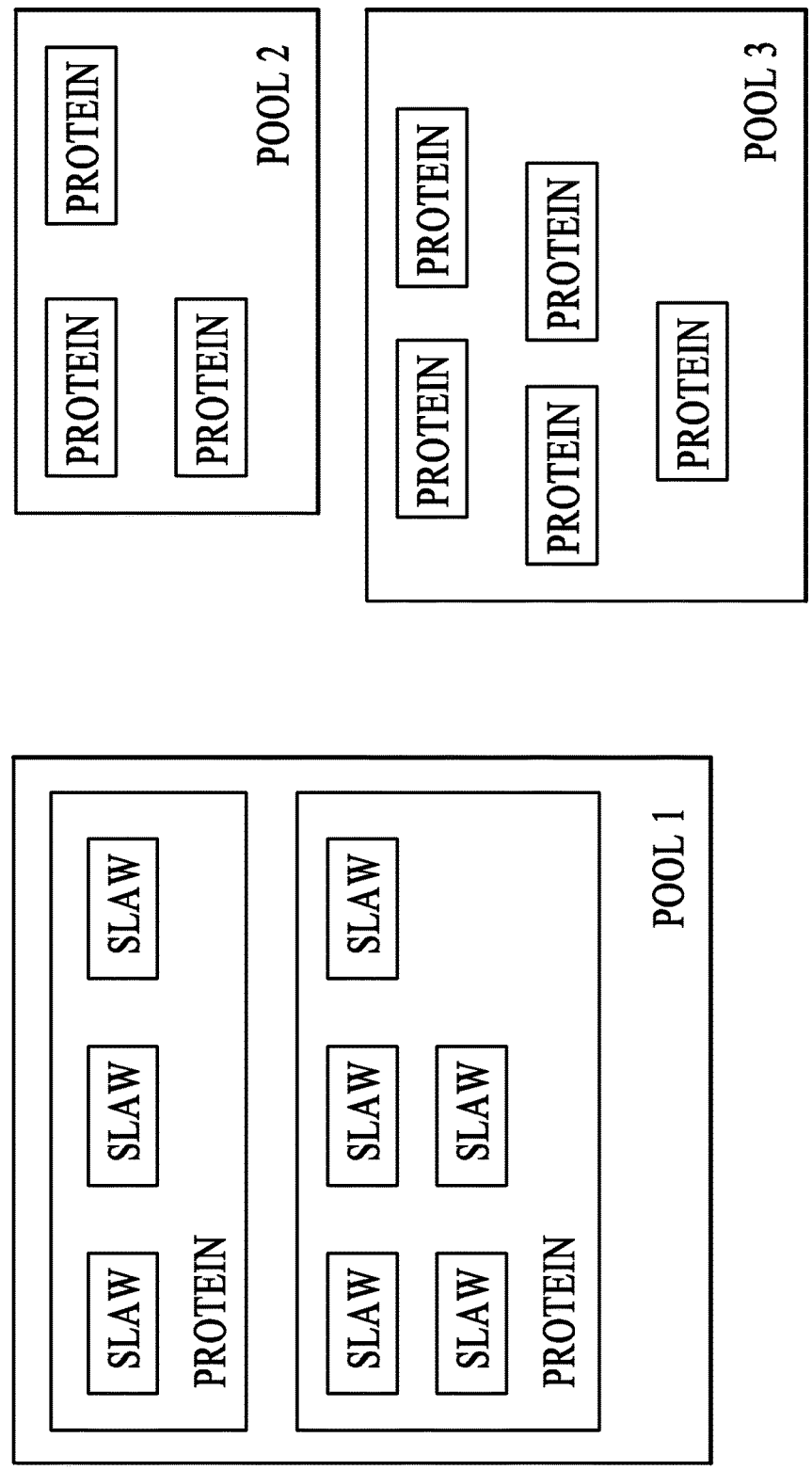
FIG. 3 is a block diagram of a processing environment including data representations using slawx, proteins, and pools, under an embodiment.

FIG. 3 is a block diagram of a processing environment including data representations using slawx, proteins, and pools, under an embodiment. The principal constructs of the embodiments presented herein include slawx (plural of "slaw"), proteins, and pools. Slawx as described herein includes a mechanism for efficient, platform-independent data representation and access. Proteins, as described in detail herein, provide a data encapsulation and transport scheme, and the payload of a protein of an embodiment includes slawx. Pools, as described herein, provide structured yet flexible aggregation, ordering, filtering, and distribution of proteins. The pools provide access to data, by virtue of proteins, within a process, among local processes, across a network between remote or distributed processes, and via 'longer term' (e.g. on-disk) storage.

FIG. 4 is a block diagram of a protein, under an embodiment. The protein includes a length header, a descrip, and an ingest. Each of the descrip and ingest includes slaw or slawx, as described in detail below.

FIG. 5 is a block diagram of a descrip, under an embodiment. The descrip includes an offset, a length, and slawx, as described in detail below.

Figure 6:
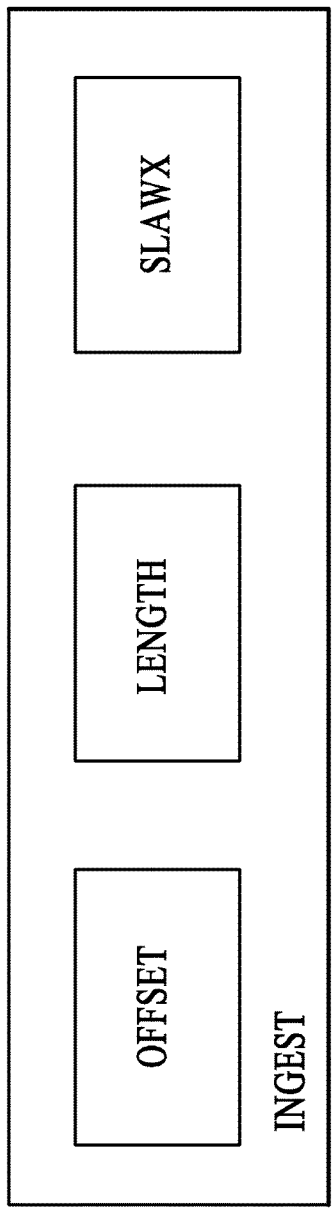
FIG. 6 is a block diagram of an ingest, under an embodiment.

FIG. 6 is a block diagram of an ingest, under an embodiment. The ingest includes an offset, a length, and slawx, as described in detail below.

Figure 7:
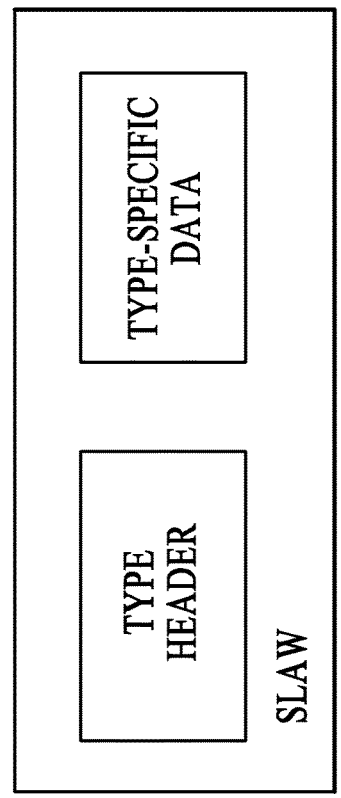
FIG. 7 is a block diagram of a slaw, under an embodiment.

FIG. 7 is a block diagram of a slaw, under an embodiment. The slaw includes a type header and type-specific data, as described in detail below.

Figure 8A:
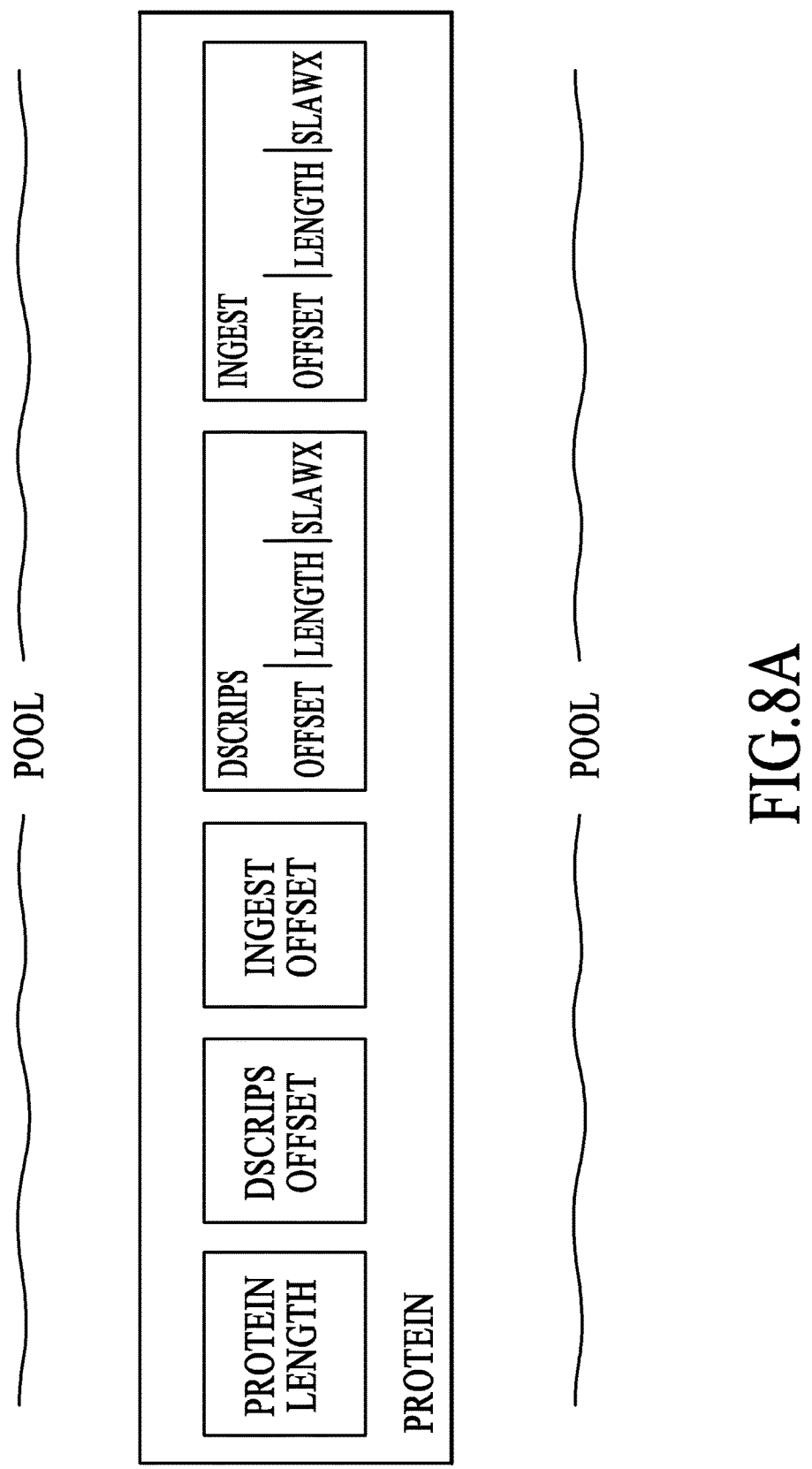
FIG. 8A is a block diagram of a protein in a pool, under an embodiment.

FIG. 8A is a block diagram of a protein in a pool, under an embodiment. The protein includes a length header ("protein length"), a descrips offset, an ingests offset, a descrip, and an ingest. The descrips includes an offset, a length, and a slaw. The ingest includes an offset, a length, and a slaw.

The protein as described herein is a mechanism for encapsulating data that needs to be shared between processes, or moved across a bus or network or other processing structure. As an example, proteins provide an improved mechanism for transport and manipulation of data including data corresponding to or associated with user interface events; in particular, the user interface events of an embodiment include those of the gestural interface described in U.S. Pat. No. 7,598,942, and herein incorporated by reference in its entirety. As a further example, proteins provide an improved mechanism for transport and manipulation of data including, but not limited to, graphics data or events, and state information, to name a few. A protein is a structured record format and an associated set of methods for manipulating records. Manipulation of records as used herein includes putting data into a structure, taking data out of a structure, and querying the format and existence of data. Proteins are configured to be used via code written in a variety of computer languages. Proteins are also configured to be the basic building block for pools, as described herein. Furthermore, proteins are configured to be natively able to move between processors and across networks while maintaining intact the data they include.

In contrast to conventional data transport mechanisms, proteins are untyped. While being untyped, the proteins provide a powerful and flexible pattern-matching facility, on top of which "type-like" functionality is implemented. Proteins configured as described herein are also inherently multi-point (although point-to-point forms are easily implemented as a subset of multi-point transmission). Additionally, proteins define a "universal" record format that does not differ (or differs only in the types of optional optimizations that are performed) between in-memory, on-disk, and on-the-wire (network) formats, for example.

Figure 8C:
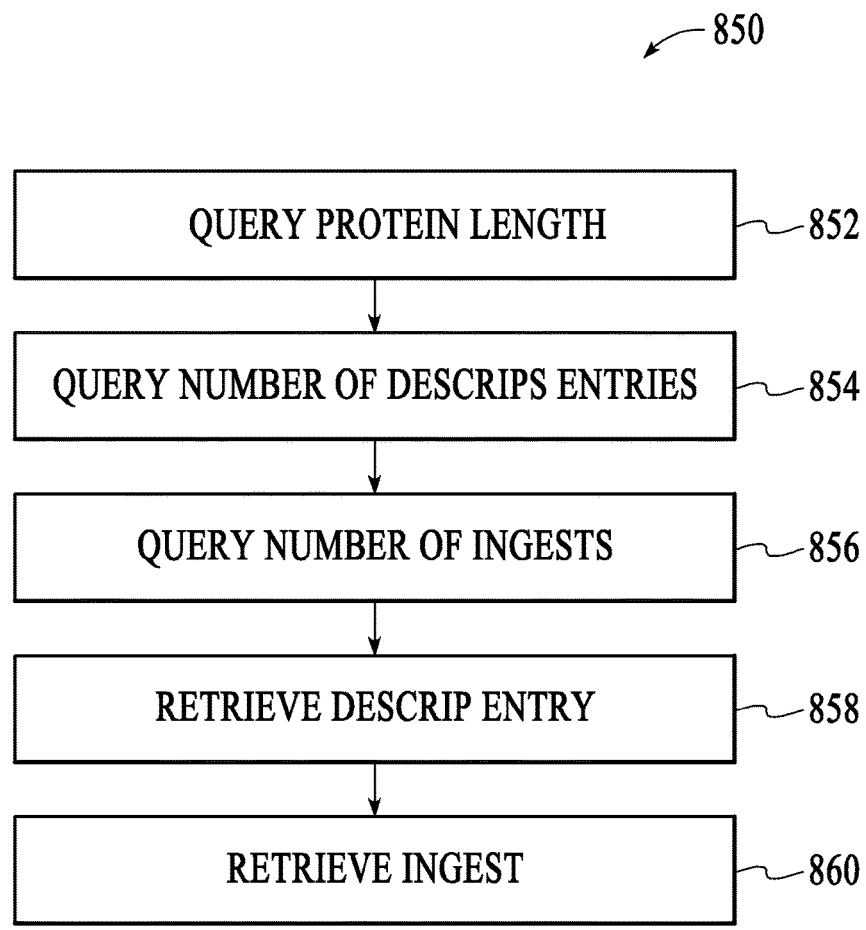
FIG. 8C is a flow diagram for using proteins, under an embodiment.
Figure 8D:
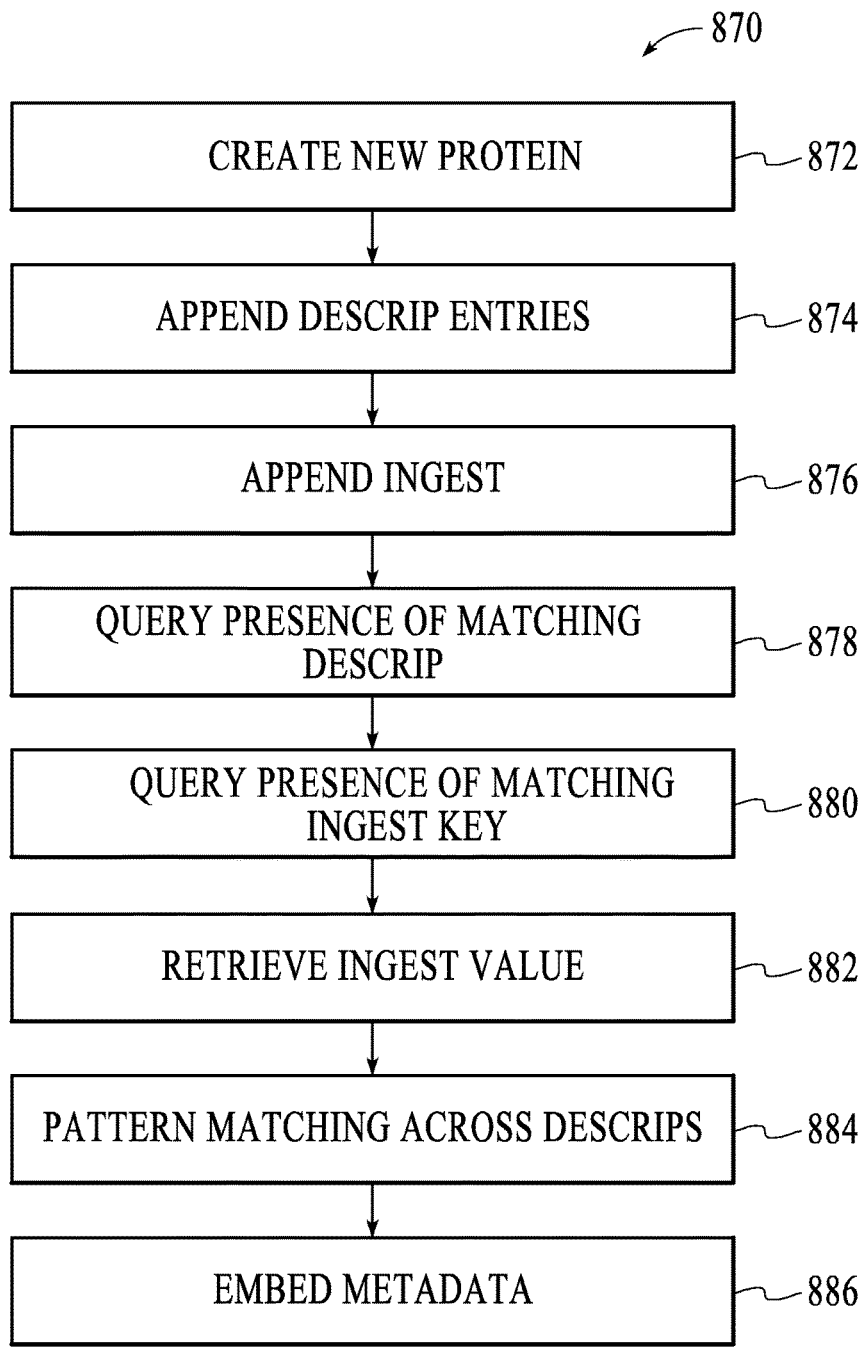
FIG. 8D is a flow diagram for constructing or generating proteins, under an embodiment.

Referring to FIGS. 4 and 8, a protein of an embodiment is a linear sequence of bytes. Within these bytes are encapsulated a descrips list and a set of key-value pairs called ingests. The descrips list includes an arbitrarily elaborate but efficiently filterable per-protein event description. The ingests include a set of key-value pairs that comprise the actual contents of the protein.

Proteins' concern with key-value pairs, as well as some core ideas about network-friendly and multi-point data interchange, is shared with earlier systems that privilege the concept of "tuples" (e.g., Linda, Jini). Proteins differ from tuple-oriented systems in several major ways, including the use of the descrips list to provide a standard, optimizable pattern matching substrate. Proteins also differ from tuple-oriented systems in the rigorous specification of a record format appropriate for a variety of storage and language constructs, along with several particular implementations of "interfaces" to that record format.

Turning to a description of proteins, the first four or eight bytes of a protein specify the protein's length, which must be a multiple of 16 bytes in an embodiment. This 16-byte granularity ensures that byte-alignment and bus-alignment efficiencies are achievable on contemporary hardware. A protein that is not naturally "quad-word aligned" is padded with arbitrary bytes so that its length is a multiple of 16 bytes.

The length portion of a protein has the following format: 32 bits specifying length, in big-endian format, with the four lowest-order bits serving as flags to indicate macro-level protein structure characteristics; followed by 32 further bits if the protein's length is greater than $2^{32}$ bytes.

The 16-byte-alignment proviso of an embodiment means that the lowest order bits of the first four bytes are available as flags. And so the first three low-order bit flags indicate whether the protein's length can be expressed in the first four bytes or requires eight, whether the protein uses big-endian or little-endian byte ordering, and whether the protein employs standard or non-standard structure, respectively, but the protein is not so limited. The fourth flag bit is reserved for future use.

If the eight-byte length flag bit is set, the length of the protein is calculated by reading the next four bytes and using them as the high-order bytes of a big-endian, eight-byte integer (with the four bytes already read supplying the low-order portion). If the little-endian flag is set, all binary numerical data in the protein is to be interpreted as little-endian (otherwise, big-endian). If the non-standard flag bit is set, the remainder of the protein does not conform to the standard structure to be described below.

Non-standard protein structures will not be discussed further herein, except to say that there are various methods for describing and synchronizing on non-standard protein formats available to a systems programmer using proteins and pools, and that these methods can be useful when space or compute cycles are constrained. For example, the shortest protein of an embodiment is sixteen bytes. A standard-format protein cannot fit any actual payload data into those sixteen bytes (the lion's share of which is already relegated to describing the location of the protein's component parts). But a non-standard format protein could conceivably use 12 of its 16 bytes for data. Two applications exchanging proteins could mutually decide that any 16-byte-long proteins that they emit always include 12 bytes representing, for example, 12 8-bit sensor values from a real-time analog-to-digital converter.

Immediately following the length header, in the standard structure of a protein, two more variable-length integer numbers appear. These numbers specify offsets to, respectively, the first element in the descrips list and the first key-value pair (ingest). These offsets are also referred to herein as the descrips offset and the ingests offset, respectively. The byte order of each quad of these numbers is specified by the protein endianness flag bit. For each, the most significant bit of the first four bytes determines whether the number is four or eight bytes wide. If the most significant bit (msb) is set, the first four bytes are the most significant bytes of a double-word (eight byte) number. This is referred to herein as "offset form". Use of separate offsets pointing to descrips and pairs allows descrips and pairs to be handled by different code paths, making possible particular optimizations relating to, for example, descrips pattern-matching and protein assembly. The presence of these two offsets at the beginning of a protein also allows for several useful optimizations.

Most proteins will not be so large as to require eight-byte lengths or pointers, so in general the length (with flags) and two offset numbers will occupy only the first three bytes of a protein. On many hardware or system architectures, a fetch or read of a certain number of bytes beyond the first is "free" (e.g., 16 bytes take exactly the same number of clock cycles to pull across the Cell processor's main bus as a single byte).

In many instances it is useful to allow implementation-specific or context-specific caching or metadata inside a protein. The use of offsets allows for a "hole" of arbitrary size to be created near the beginning of the protein, into which such metadata may be slotted. An implementation that can make use of eight bytes of metadata gets those bytes for free on many system architectures with every fetch of the length header for a protein.

The descrips offset specifies the number of bytes between the beginning of the protein and the first descrip entry. Each descrip entry comprises an offset (in offset form, of course) to the next descrip entry, followed by a variable-width length field (again in offset format), followed by a slaw. If there are no further descrips, the offset is, by rule, four bytes of zeros. Otherwise, the offset specifies the number of bytes between the beginning of this descrip entry and the next one. The length field specifies the length of the slaw, in bytes.

In most proteins, each descrip is a string, formatted in the slaw string fashion: a four-byte length/type header with the most significant bit set and only the lower 30 bits used to specify length, followed by the header's indicated number of data bytes. As usual, the length header takes its endianness from the protein. Bytes are assumed to encode UTF-8 characters (and thus—nota bene—the number of characters is not necessarily the same as the number of bytes).

The ingests offset specifies the number of bytes between the beginning of the protein and the first ingest entry. Each ingest entry comprises an offset (in offset form) to the next ingest entry, followed again by a length field and a slaw. The ingests offset is functionally identical to the descrips offset, except that it points to the next ingest entry rather than to the next descrip entry.

In most proteins, every ingest is of the slaw cons type comprising a two-value list, generally used as a key/value pair. The slaw cons record comprises a four-byte length/type header with the second most significant bit set and only the lower 30 bits used to specify length; a four-byte offset to the start of the value (second) element; the four-byte length of the key element; the slaw record for the key element; the four-byte length of the value element; and finally the slaw record for the value element.

Generally, the cons key is a slaw string. The duplication of data across the several protein and slaw cons length and offsets field provides yet more opportunity for refinement and optimization.

The construct used under an embodiment to embed typed data inside proteins, as described above, is a tagged byte-sequence specification and abstraction called a "slaw" (the plural is "slawx"). A slaw is a linear sequence of bytes representing a piece of (possibly aggregate) typed data, and is associated with programming-language-specific APIs that allow slawx to be created, modified and moved around between memory spaces, storage media, and machines. The slaw type scheme is intended to be extensible and as lightweight as possible, and to be a common substrate that can be used from any programming language.

The desire to build an efficient, large-scale inter-process communication mechanism is the driver of the slaw configuration. Conventional programming languages provide sophisticated data structures and type facilities that work well in process-specific memory layouts, but these data representations invariably break down when data needs to be moved between processes or stored on disk. The slaw architecture is, first, a substantially efficient, multi-platform friendly, low-level data model for inter-process communication.

But even more importantly, slawx are configured to influence, together with proteins, and enable the development of future computing hardware (microprocessors, memory controllers, disk controllers). A few specific additions to, say, the instruction sets of commonly available microprocessors make it possible for slawx to become as efficient even for single-process, in-memory data layout as the schema used in most programming languages.

Each slaw comprises a variable-length type header followed by a type-specific data layout. In an example embodiment, which supports full slaw functionality in C, C++ and Ruby for example, types are indicated by a universal integer defined in system header files accessible from each language. More sophisticated and flexible type resolution functionality is also enabled: for example, indirect typing via universal object IDs and network lookup.

The slaw configuration of an embodiment allows slaw records to be used as objects in language-friendly fashion from both Ruby and C++, for example. A suite of utilities external to the C++ compiler sanity-check slaw byte layout, create header files and macros specific to individual slaw types, and auto-generate bindings for Ruby. As a result, well-configured slaw types are quite efficient even when used from within a single process. Any slaw anywhere in a process's accessible memory can be addressed without a copy or "deserialization" step.

Slaw functionality of an embodiment includes API facilities to perform one or more of the following: create a new slaw of a specific type; create or build a language-specific reference to a slaw from bytes on disk or in memory; embed data within a slaw in type-specific fashion; query the size of a slaw; retrieve data from within a slaw; clone a slaw; and translate the endianness and other format attributes of all data within a slaw. Every species of slaw implements the above behaviors.

FIG. 8B shows a slaw header format, under an embodiment. A detailed description of the slaw follows.

The internal structure of each slaw optimizes each of type resolution, access to encapsulated data, and size information for that slaw instance. In an embodiment, the full set of slaw types is by design minimally complete, and includes: the slaw string; the slaw cons (i.e. dyad); the slaw list; and the slaw numerical object, which itself represents a broad set of individual numerical types understood as permutations of a half-dozen or so basic attributes. The other basic property of any slaw is its size. In an embodiment, slawx have byte-lengths quantized to multiples of four; these four-byte words are referred to herein as 'quads'. In general, such quad-based sizing aligns slawx well with the configurations of modern computer hardware architectures.

The first four bytes of every slaw in an embodiment comprise a header structure that encodes type-description and other metainformation, and that ascribes specific type meanings to particular bit patterns. For example, the first (most significant) bit of a slaw header is used to specify whether the size (length in quad-words) of that slaw follows the initial four-byte type header. When this bit is set, it is understood that the size of the slaw is explicitly recorded in the next four bytes of the slaw (e.g., bytes five through eight); if the size of the slaw is such that it cannot be represented in four bytes (i.e. if the size is or is larger than two to the thirty-second power) then the next-most-significant bit of the slaw's initial four bytes is also set, which means that the slaw has an eight-byte (rather than four byte) length. In that case, an inspecting process will find the slaw's length stored in ordinal bytes five through twelve. On the other hand, the small number of slaw types means that in many cases a fully specified typal bit-pattern "leaves unused" many bits in the four byte slaw header; and in such cases these bits may be employed to encode the slaw's length, saving the bytes (five through eight) that would otherwise be required.

For example, an embodiment leaves the most significant bit of the slaw header (the "length follows" flag) unset and sets the next bit to indicate that the slaw is a "wee cons", and in this case the length of the slaw (in quads) is encoded in the remaining thirty bits. Similarly, a "wee string" is marked by the pattern 001 in the header, which leaves twenty-nine bits for representation of the slaw-string's length; and a leading 0001 in the header describes a "wee list", which by virtue of the twenty-eight available length-representing bits can be a slaw list of up to two-to-the-twenty-eight quads in size. A "full string" (or cons or list) has a different bit signature in the header, with the most significant header bit necessarily set because the slaw length is encoded separately in bytes five through eight (or twelve, in extreme cases). Note that the Plasma implementation "decides" at the instant of slaw construction whether to employ the "wee" or the "full" version of these constructs (the decision is based on whether the resulting size will "fit" in the available wee bits or not), but the full-vs.-wee detail is hidden from the user of the Plasma implementation, who knows and cares only that she is using a slaw string, or a slaw cons, or a slaw list.

Numeric slawx are, in an embodiment, indicated by the leading header pattern 00001. Subsequent header bits are used to represent a set of orthogonal properties that may be combined in arbitrary permutation. An embodiment employs, but is not limited to, five such character bits to indicate whether or not the number is: (1) floating point; (2) complex; (3) unsigned; (4) "wide"; (5) "stumpy" ((4) "wide" and (5) "stumpy" are permuted to indicate eight, sixteen, thirty-two, and sixty-four bit number representations). Two additional bits (e.g., (7) and (8)) indicate that the encapsulated numeric data is a two-, three-, or four-element vector (with both bits being zero suggesting that the numeric is a "one-element vector" (i.e. a scalar)). In this embodiment the eight bits of the fourth header byte are used to encode the size (in bytes, not quads) of the encapsulated numeric data. This size encoding is offset by one, so that it can represent any size between and including one and two hundred fifty-six bytes. Finally, two character bits (e.g., (9) and (10)) are used to indicate that the numeric data encodes an array of individual numeric entities, each of which is of the type described by character bits (1) through (8). In the case of an array, the individual numeric entities are not each tagged with additional headers, but are packed as continuous data following the single header and, possibly, explicit slaw size information.

This embodiment affords simple and efficient slaw duplication (which can be implemented as a byte-for-byte copy) and extremely straightforward and efficient slaw comparison (two slawx are the same in this embodiment if and only if there is a one-to-one match of each of their component bytes considered in sequence). This latter property is important, for example, to an efficient implementation of the protein architecture, one of whose critical and pervasive features is the ability to search through or 'match on' a protein's descrips list.

Further, the embodiments herein allow aggregate slaw forms (e.g., the slaw cons and the slaw list) to be constructed simply and efficiently. For example, an embodiment builds a slaw cons from two component slawx, which may be of any type, including themselves aggregates, by: (a) querying each component slaw's size; (b) allocating memory of size equal to the sum of the sizes of the two component slawx and the one, two, or three quads needed for the header-plus-size structure; (c) recording the slaw header (plus size information) in the first four, eight, or twelve bytes; and then (d) copying the component slawx's bytes in turn into the immediately succeeding memory. Significantly, such a construction routine need know nothing about the types of the two component slawx; only their sizes (and accessibility as a sequence of bytes) matters. The same process pertains to the construction of slaw lists, which are ordered encapsulations of arbitrarily many sub-slawx of (possibly) heterogeneous type.

A further consequence of the slaw system's fundamental format as sequential bytes in memory obtains in connection with "traversal" activities—a recurring use pattern uses, for example, sequential access to the individual slawx stored in a slaw list. The individual slawx that represent the descrips and ingests within a protein structure must similarly be traversed. Such maneuvers are accomplished in a stunningly straightforward and efficient manner: to "get to" the next slaw in a slaw list, one adds the length of the current slaw to its location in memory, and the resulting memory location is identically the header of the next slaw. Such simplicity is possible because the slaw and protein design eschews "indirection"; there are no pointers; rather, the data simply exists, in its totality, in situ.

To the point of slaw comparison, a complete implementation of the Plasma system must acknowledge the existence of differing and incompatible data representation schemes across and among different operating systems, CPUs, and hardware architectures. Major such differences include byte-ordering policies (e.g., little- vs. big-endianness) and floating-point representations; other differences exist. The Plasma specification requires that the data encapsulated by slawx be guaranteed interprable (i.e., must appear in the native format of the architecture or platform from which the slaw is being inspected. This requirement means in turn that the Plasma system is itself responsible for data format conversion. However, the specification stipulates only that the conversion take place before a slaw becomes "at all visible" to an executing process that might inspect it. It is therefore up to the individual implementation at which point it chooses to perform such format c conversion; two appropriate approaches are that slaw data payloads are conformed to the local architecture's data format (1) as an individual slaw is "pulled out" of a protein in which it had been packed, or (2) for all slaw in a protein simultaneously, as that protein is extracted from the pool in which it was resident. Note that the conversion stipulation considers the possibility of hardware-assisted implementations. For example, networking chipsets built with explicit Plasma capability may choose to perform format conversion intelligently and at the "instant of transmission", based on the known characteristics of the receiving system. Alternately, the process of transmission may convert data payloads into a canonical format, with the receiving process symmetrically converting from canonical to "local" format. Another embodiment performs format conversion "at the metal", meaning that data is always stored in canonical format, even in local memory, and that the memory controller hardware itself performs the conversion as data is retrieved from memory and placed in the registers of the proximal CPU.

A minimal (and read-only) protein implementation of an embodiment includes operation or behavior in one or more applications or programming languages making use of proteins. FIG. 8B is a flow diagram 850 for using proteins, under an embodiment. Operation begins by querying 852 the length in bytes of a protein. The number of descrips entries is queried 854. The number of ingests is queried 856. A descrip entry is retrieved 858 by index number. An ingest is retrieved 860 by index number.

The embodiments described herein also define basic methods allowing proteins to be constructed and filled with data, helper-methods that make common tasks easier for programmers, and hooks for creating optimizations. FIG. 8C is a flow diagram 870 for constructing or generating proteins, under an embodiment. Operation begins with creation 872 of a new protein. A series of descrips entries are appended 874. An ingest is also appended 876. The presence of a matching descrip is queried 878, and the presence of a matching ingest key is queried 880. Given an ingest key, an ingest value is retrieved 882. Pattern matching is performed 884 across descrips. Non-structured metadata is embedded 886 near the beginning of the protein.

As described above, slawx provide the lowest-level of data definition for inter-process exchange, proteins provide mid-level structure and hooks for querying and filtering, and pools provide for high-level organization and access semantics. The pool is a repository for proteins, providing linear sequencing and state caching. The pool also provides multi-process access by multiple programs or applications of numerous different types. Moreover, the pool provides a set of common, optimizable filtering and pattern-matching behaviors.

The pools of an embodiment, which can accommodate tens of thousands of proteins, function to maintain state, so that individual processes can offload much of the tedious bookkeeping common to multi-process program code. A pool maintains or keeps a large buffer of past proteins available—the Platonic pool is explicitly infinite—so that participating processes can scan both backwards and forwards in a pool at will. The size of the buffer is implementation dependent, of course, but in common usage it is often possible to keep proteins in a pool for hours or days.

The most common style of pool usage as described herein hews to a biological metaphor, in contrast to the mechanistic, point-to-point approach taken by existing inter-process communication frameworks. The name protein alludes to biological inspiration: data proteins in pools are available for flexible querying and pattern matching by a large number of computational processes, as chemical proteins in a living organism are available for pattern matching and filtering by large numbers of cellular agents.

Two additional abstractions lean on the biological metaphor, including use of "handlers", and the Golgi framework. A process that participates in a pool generally creates a number of handlers. Handlers are relatively small bundles of code that associate match conditions with handle behaviors. By tying one or more handlers to a pool, a process sets up flexible call-back triggers that encapsulate state and react to new proteins.

A process that participates in several pools generally inherits from an abstract Golgi class. The Golgi framework provides a number of useful routines for managing multiple pools and handlers. The Golgi class also encapsulates parent-child relationships, providing a mechanism for local protein exchange that does not use a pool.

A pools API provided under an embodiment is configured to allow pools to be implemented in a variety of ways, in order to account both for system-specific goals and for the available capabilities of given hardware and network architectures. The two fundamental system provisions upon which pools depend are a storage facility and a means of inter-process communication. The extant systems described herein use a flexible combination of shared memory, virtual memory, and disk for the storage facility, and IPC queues and TCP/IP sockets for inter-process communication.

Pool functionality of an embodiment includes, but is not limited to, the following: participating in a pool; placing a protein in a pool; retrieving the next unseen protein from a pool; rewinding or fast-forwarding through the contents (e.g., proteins) within a pool. Additionally, pool functionality can include, but is not limited to, the following: setting up a streaming pool call-back for a process; selectively retrieving proteins that match particular patterns of descrips or ingests keys; scanning backward and forwards for proteins that match particular patterns of descrips or ingests keys.

Figure 9:
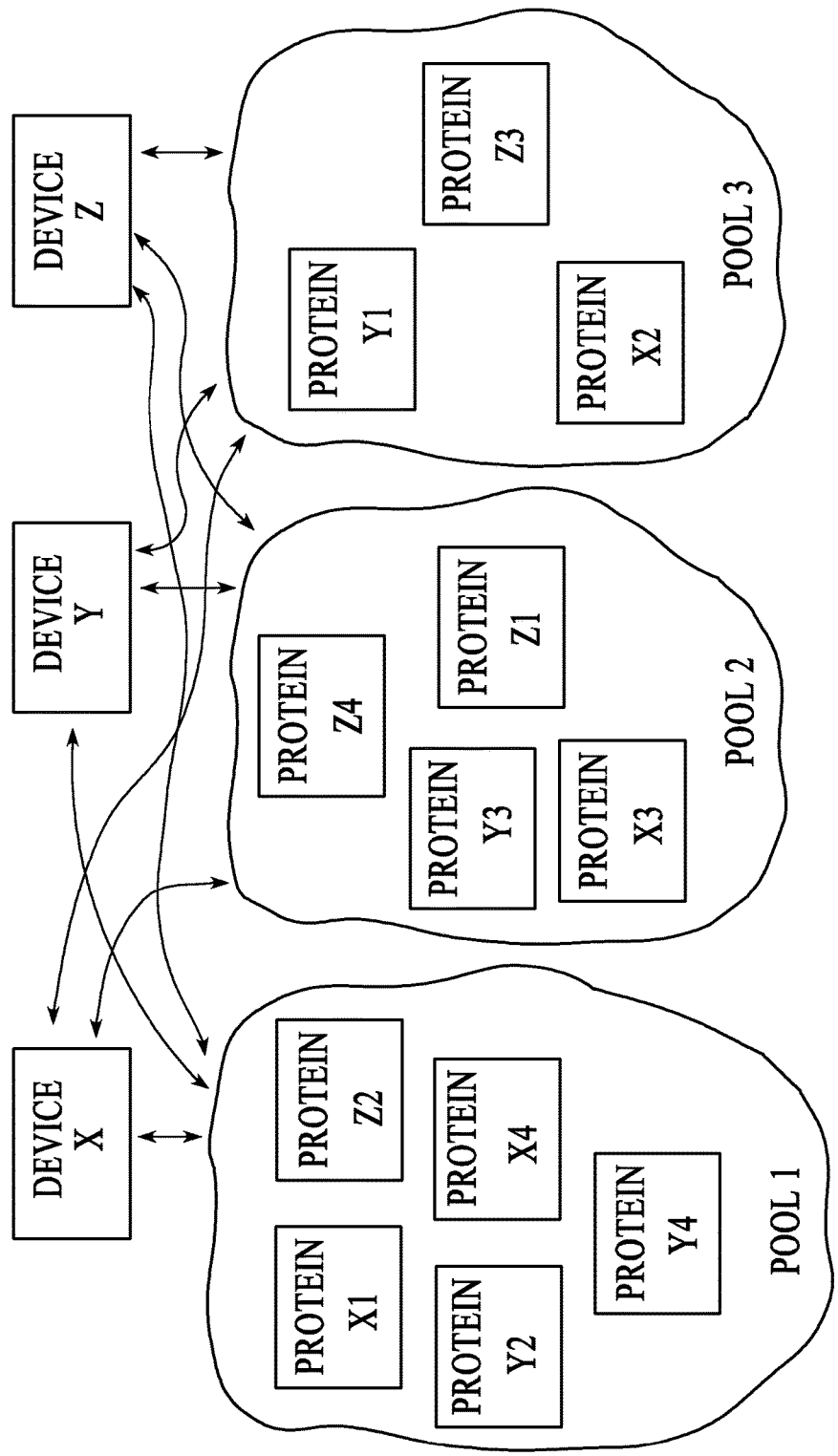
FIG. 9 is a block diagram of a processing environment including data exchange using slawx, proteins, and pools, under an embodiment.

The proteins described above are provided to pools as a way of sharing the protein data contents with other applications. FIG. 9 is a block diagram of a processing environment including data exchange using slawx, proteins, and pools, under an embodiment. This example environment includes three devices (e.g., Device X, Device Y, and Device Z, collectively referred to herein as the "devices") sharing data through the use of slawx, proteins and pools as described above. Each of the devices is coupled to the three pools (e.g., Pool 1, Pool 2, Pool 3). Pool 1 includes numerous proteins (e.g., Protein X1, Protein Z, Protein Y2, Protein X4, Protein Y4) contributed or transferred to the pool from the respective devices (e.g., protein Z2 is transferred or contributed to pool 1 by device Z, etc.). Pool 2 includes numerous proteins (e.g., Protein Z4, Protein Y3, Protein Z1, Protein X3) contributed or transferred to the pool from the respective devices (e.g., protein Y3 is transferred or contributed to pool 2 by device Y, etc.). Pool 3 includes numerous proteins (e.g., Protein Y1, Protein Z3, Protein X2) contributed or transferred to the pool from the respective devices (e.g., protein X2 is transferred or contributed to pool 3 by device X, etc.). While the example described above includes three devices coupled or connected among three pools, any number of devices can be coupled or connected in any manner or combination among any number of pools, and any pool can include any number of proteins contributed from any number or combination of devices. The proteins and pools of this example are as described above with reference to FIGS. 3-8.

Figure 10:
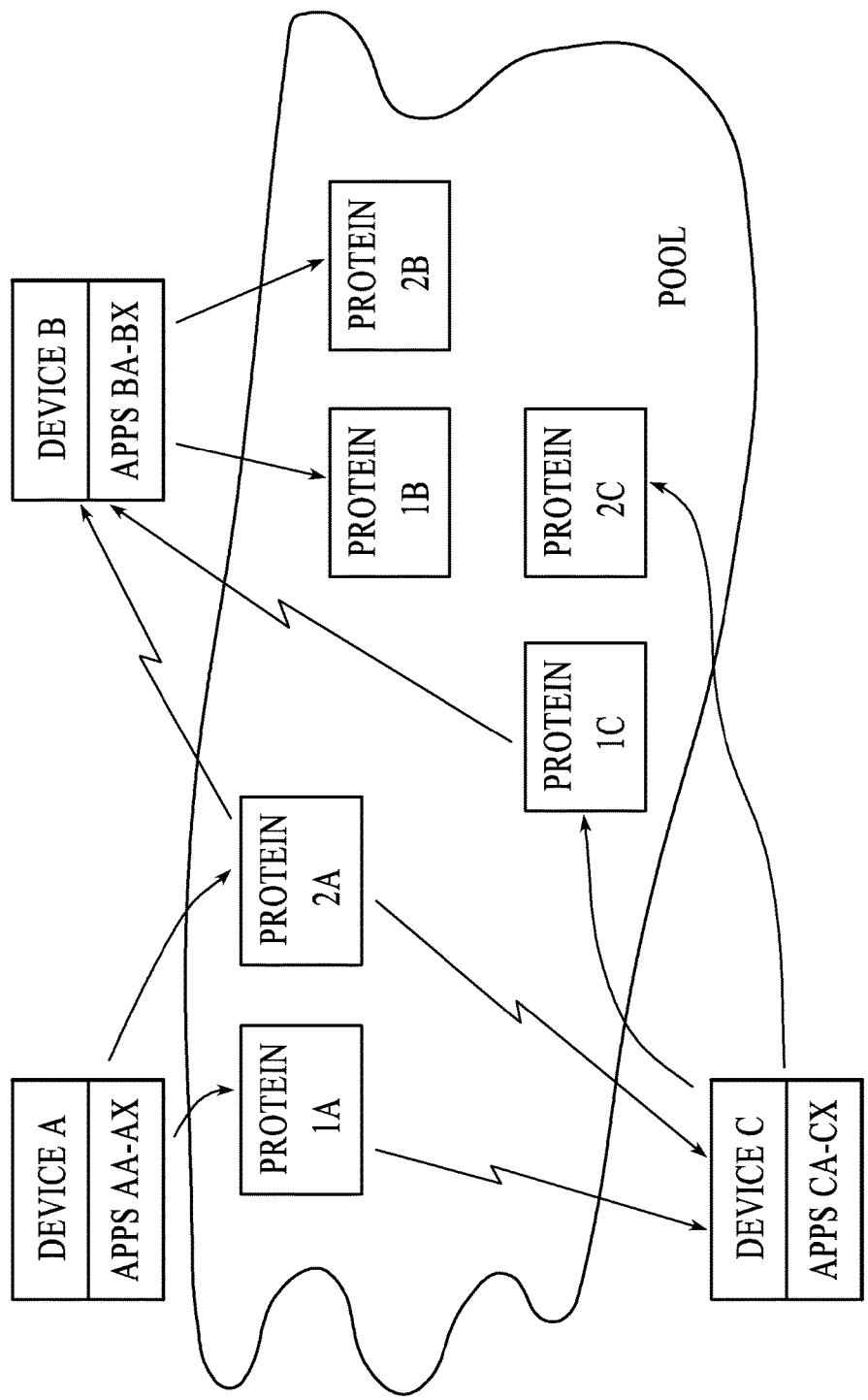
FIG. 10 is a block diagram of a processing environment including multiple devices and numerous programs running on one or more of the devices in which the Plasma constructs (e.g., pools, proteins, and slaw) are used to allow the numerous running programs to share and collectively respond to the events generated by the devices, under an embodiment.

FIG. 10 is a block diagram of a processing environment including multiple devices and numerous programs running on one or more of the devices in which the Plasma constructs (e.g., pools, proteins, and slaw) are used to allow the numerous running programs to share and collectively respond to the events generated by the devices, under an embodiment. This system is but one example of a multi-user, multi-device, multi-computer interactive control scenario or configuration. More particularly, in this example, an interactive system, comprising multiple devices (e.g., device A, B, etc.) and a number of programs (e.g., apps AA-AX, apps BA-BX, etc.) running on the devices uses the Plasma constructs (e.g., pools, proteins, and slaw) to allow the running programs to share and collectively respond to the events generated by these input devices.

In this example, each device (e.g., device A, B, etc.) translates discrete raw data generated by or output from the programs (e.g., apps AA-AX, apps BA-BX, etc.) running on that respective device into Plasma proteins and deposits those proteins into a Plasma pool. For example, program AX generates data or output and provides the output to device A which, in turn, translates the raw data into proteins (e.g., protein 1A, protein 2A, etc.) and deposits those proteins into the pool. As another example, program BC generates data and provides the data to device B which, in turn, translates the data into proteins (e.g., protein 1B, protein 2B, etc.) and deposits those proteins into the pool.

Each protein includes a descrip list that specifies the data or output registered by the application as well as identifying information for the program itself. Where possible, the protein descrips may also ascribe a general semantic meaning for the output event or action. The protein's data payload (e.g., ingests) carries the full set of useful state information for the program event.

The proteins, as described above, are available in the pool for use by any program or device coupled or connected to the pool, regardless of type of the program or device. Consequently, any number of programs running on any number of computers may extract event proteins from the input pool. These devices need only be able to participate in the pool via either the local memory bus or a network connection in order to extract proteins from the pool. An immediate consequence of this is the beneficial possibility of decoupling processes that are responsible for generating processing events from those that use or interpret the events. Another consequence is the multiplexing of sources and consumers of events so that devices may be controlled by one person or may be used simultaneously by several people (e.g., a Plasma-based input framework supports many concurrent users), while the resulting event streams are in turn visible to multiple event consumers.

As an example, device C can extract one or more proteins (e.g., protein 1A, protein 2A, etc.) from the pool. Following protein extraction, device C can use the data of the protein, retrieved or read from the slaw of the descrips and ingests of the protein, in processing events to which the protein data corresponds. As another example, device B can extract one or more proteins (e.g., protein 1C, protein 2A, etc.) from the pool. Following protein extraction, device B can use the data of the protein in processing events to which the protein data corresponds.

Devices and/or programs coupled or connected to a pool may skim backwards and forwards in the pool looking for particular sequences of proteins. It is often useful, for example, to set up a program to wait for the appearance of a protein matching a certain pattern, then skim backwards to determine whether this protein has appeared in conjunction with certain others. This facility for making use of the stored event history in the input pool often makes writing state management code unnecessary, or at least significantly reduces reliance on such undesirable coding patterns.

Figure 11:
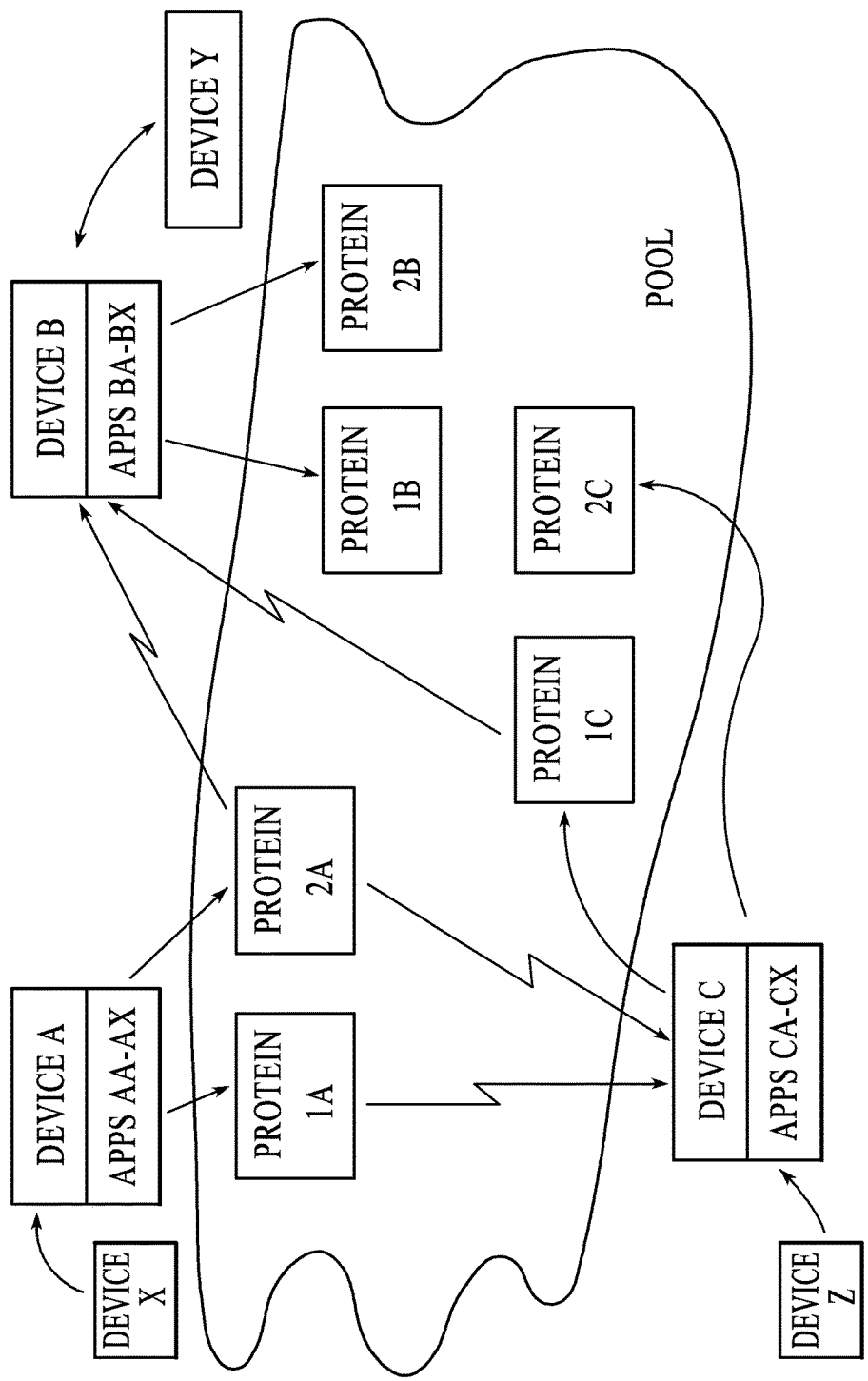
FIG. 11 is a block diagram of a processing environment including multiple devices and numerous programs running on one or more of the devices in which the Plasma constructs (e.g., pools, proteins, and slaw) are used to allow the numerous running programs to share and collectively respond to the events generated by the devices, under an alternative embodiment.

FIG. 11 is a block diagram of a processing environment including multiple devices and numerous programs running on one or more of the devices in which the Plasma constructs (e.g., pools, proteins, and slaw) are used to allow the numerous running programs to share and collectively respond to the events generated by the devices, under an alternative embodiment. This system is but one example of a multi-user, multi-device, multi-computer interactive control scenario or configuration. More particularly, in this example, an interactive system, comprising multiple devices (e.g., devices X and Y coupled to devices A and B, respectively) and a number of programs (e.g., apps AA-AX, apps BA-BX, etc.) running on one or more computers (e.g., device A, device B, etc.) uses the Plasma constructs (e.g., pools, proteins, and slaw) to allow the running programs to share and collectively respond to the events generated by these input devices.

In this example, each device (e.g., devices X and Y coupled to devices A and B, respectively) is managed and/or coupled to run under or in association with one or more programs hosted on the respective device (e.g., device A, device B, etc.) which translates the discrete raw data generated by the device (e.g., device X, device A, device Y, device B, etc.) hardware into Plasma proteins and deposits those proteins into a Plasma pool. For example, device X running in association with application AB hosted on device A generates raw data, translates the discrete raw data into proteins (e.g., protein 1A, protein 2A, etc.) and deposits those proteins into the pool. As another example, device X running in association with application AT hosted on device A generates raw data, translates the discrete raw data into proteins (e.g., protein 1A, protein 2A, etc.) and deposits those proteins into the pool. As yet another example, device Z running in association with application CD hosted on device C generates raw data, translates the discrete raw data into proteins (e.g., protein 1C, protein 2C, etc.) and deposits those proteins into the pool.

Each protein includes a descrip list that specifies the action registered by the input device as well as identifying information for the device itself. Where possible, the protein descrips may also ascribe a general semantic meaning for the device action. The protein's data payload (e.g., ingests) carries the full set of useful state information for the device event.

The proteins, as described above, are available in the pool for use by any program or device coupled or connected to the pool, regardless of type of the program or device.

Consequently, any number of programs running on any number of computers may extract event proteins from the input pool. These devices need only be able to participate in the pool via either the local memory bus or a network connection in order to extract proteins from the pool. An immediate consequence of this is the beneficial possibility of decoupling processes that are responsible for generating processing events from those that use or interpret the events. Another consequence is the multiplexing of sources and consumers of events so that input devices may be controlled by one person or may be used simultaneously by several people (e.g., a Plasma-based input framework supports many concurrent users), while the resulting event streams are in turn visible to multiple event consumers.

Devices and/or programs coupled or connected to a pool may skim backwards and forwards in the pool looking for particular sequences of proteins. It is often useful, for example, to set up a program to wait for the appearance of a protein matching a certain pattern, then skim backwards to determine whether this protein has appeared in conjunction with certain others. This facility for making use of the stored event history in the input pool often makes writing state management code unnecessary, or at least significantly reduces reliance on such undesirable coding patterns.

Figure 12:
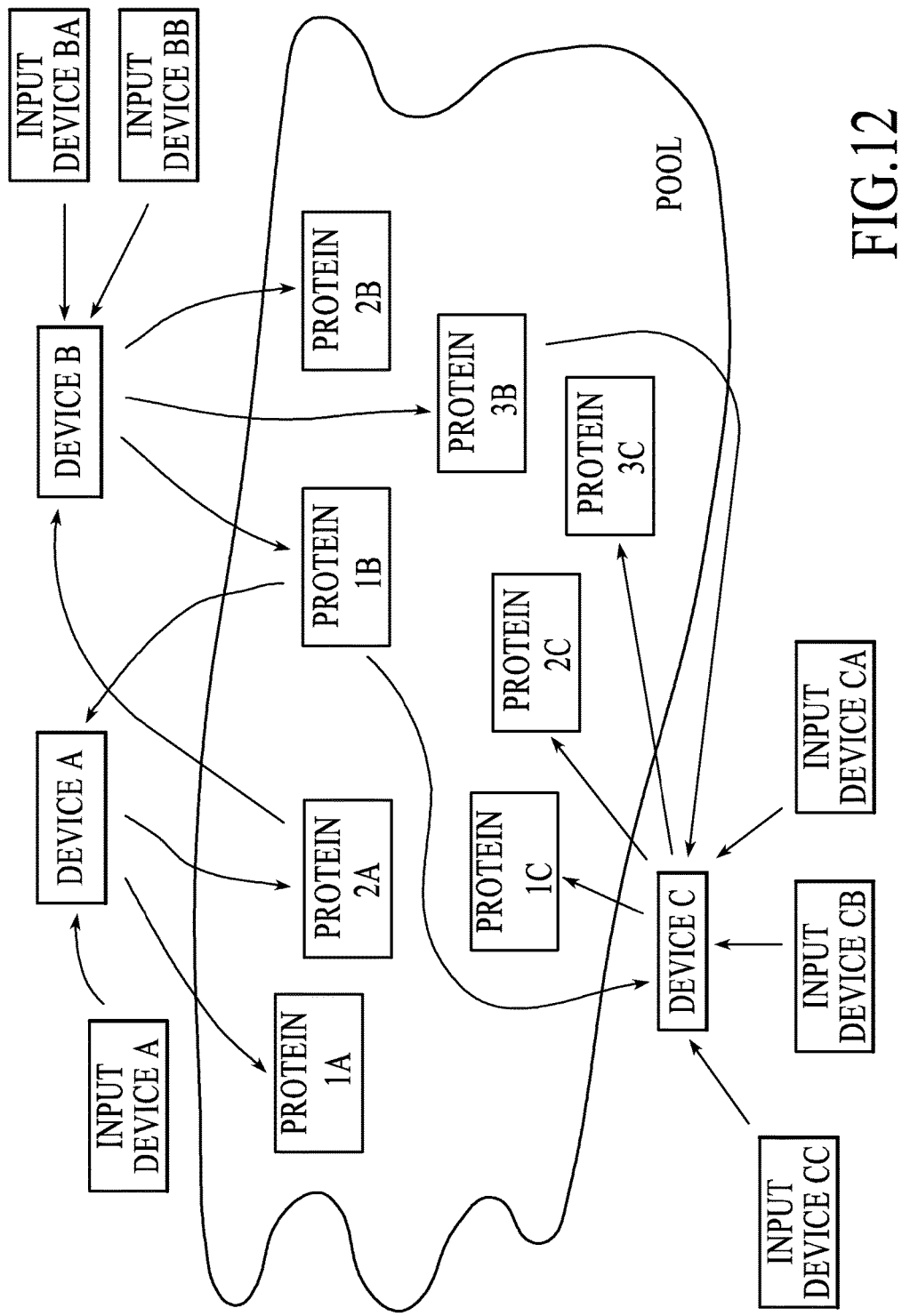
FIG. 12 is a block diagram of a processing environment including multiple input devices coupled among numerous programs running on one or more of the devices in which the Plasma constructs (e.g., pools, proteins, and slaw) are used to allow the numerous running programs to share and collectively respond to the events generated by the input devices, under another alternative embodiment.

FIG. 12 is a block diagram of a processing environment including multiple input devices coupled among numerous programs running on one or more of the devices in which the Plasma constructs (e.g., pools, proteins, and slaw) are used to allow the numerous running programs to share and collectively respond to the events generated by the input devices, under another alternative embodiment. This system is but one example of a multi-user, multi-device, multi-computer interactive control scenario or configuration. More particularly, in this example, an interactive system, comprising multiple input devices (e.g., input devices A, B, BA, and BB, etc.) and a number of programs (not shown) running on one or more computers (e.g., device A, device B, etc.) uses the Plasma constructs (e.g., pools, proteins, and slaw) to allow the running programs to share and collectively respond to the events generated by these input devices.

In this example, each input device (e.g., input devices A, B, BA, and BB, etc.) is managed by a software driver program hosted on the respective device (e.g., device A, device B, etc.) which translates the discrete raw data generated by the input device hardware into Plasma proteins and deposits those proteins into a Plasma pool. For example, input device A generates raw data and provides the raw data to device A which, in turn, translates the discrete raw data into proteins (e.g., protein 1A, protein 2A, etc.) and deposits those proteins into the pool. As another example, input device BB generates raw data and provides the raw data to device B which, in turn, translates the discrete raw data into proteins (e.g., protein 1B, protein 3B, etc.) and deposits those proteins into the pool.

Each protein includes a descrip list that specifies the action registered by the input device as well as identifying information for the device itself. Where possible, the protein descrips may also ascribe a general semantic meaning for the device action. The protein's data payload (e.g., ingests) carries the full set of useful state information for the device event.

To illustrate, here are example proteins for two typical events in such a system. Proteins are represented here as text however, in an actual implementation, the constituent parts of these proteins are typed data bundles (e.g., slaw). The protein describing a g-speak "one finger click" pose (described in the Related Applications) is as follows:

```
[ Descrips: { point, engage, one, one-finger-engage, hand,
    pilot-id-02, hand-id-23 }
  Ingests: { pilot-id   => 02,
    hand-id    => 23,
    pos        => [ 0.0, 0.0, 0.0 ]
    angle-axis => [ 0.0, 0.0, 0.0, 0.707 ]
    gripe      => .. ||:vx
    time       => 184437103.29}]
```

As a further example, the protein describing a mouse click is as follows:

```
[ Descrips: { point, click, one, mouse-click, button-one,
    mouse-id-02 }
  Ingests: { mouse-id => 23,
    pos        => [ 0.0, 0.0, 0.0 ]
    time       => 184437124.80}]
```

Either or both of the sample proteins foregoing might cause a participating program of a host device to run a particular portion of its code. These programs may be interested in the general semantic labels: the most general of all, "point", or the more specific pair, "engage, one". Or they may be looking for events that would plausibly be generated only by a precise device: "one-finger-engage", or even a single aggregate object, "hand-id-23".

The proteins, as described above, are available in the pool for use by any program or device coupled or connected to the pool, regardless of type of the program or device. Consequently, any number of programs running on any number of computers may extract event proteins from the input pool. These devices need only be able to participate in the pool via either the local memory bus or a network connection in order to extract proteins from the pool. An immediate consequence of this is the beneficial possibility of decoupling processes that are responsible for generating 'input events' from those that use or interpret the events. Another consequence is the multiplexing of sources and consumers of events so that input devices may be controlled by one person or may be used simultaneously by several people (e.g., a Plasma-based input framework supports many concurrent users), while the resulting event streams are in turn visible to multiple event consumers.

As an example or protein use, device C can extract one or more proteins (e.g., protein 1B, etc.) from the pool. Following protein extraction, device C can use the data of the protein, retrieved or read from the slaw of the descrips and ingests of the protein, in processing input events of input devices CA and CC to which the protein data corresponds. As another example, device A can extract one or more proteins (e.g., protein 1B, etc.) from the pool. Following protein extraction, device A can use the data of the protein in processing input events of input device A to which the protein data corresponds.

Devices and/or programs coupled or connected to a pool may skim backwards and forwards in the pool looking for particular sequences of proteins. It is often useful, for example, to set up a program to wait for the appearance of a protein matching a certain pattern, then skim backwards to determine whether this protein has appeared in conjunction with certain others. This facility for making use of the stored event history in the input pool often makes writing state management code unnecessary, or at least significantly reduces reliance on such undesirable coding patterns.

Examples of input devices that are used in the embodiments of the system described herein include gestural input sensors, keyboards, mice, infrared remote controls such as those used in consumer electronics, and task-oriented tangible media objects, to name a few.

Figure 13:
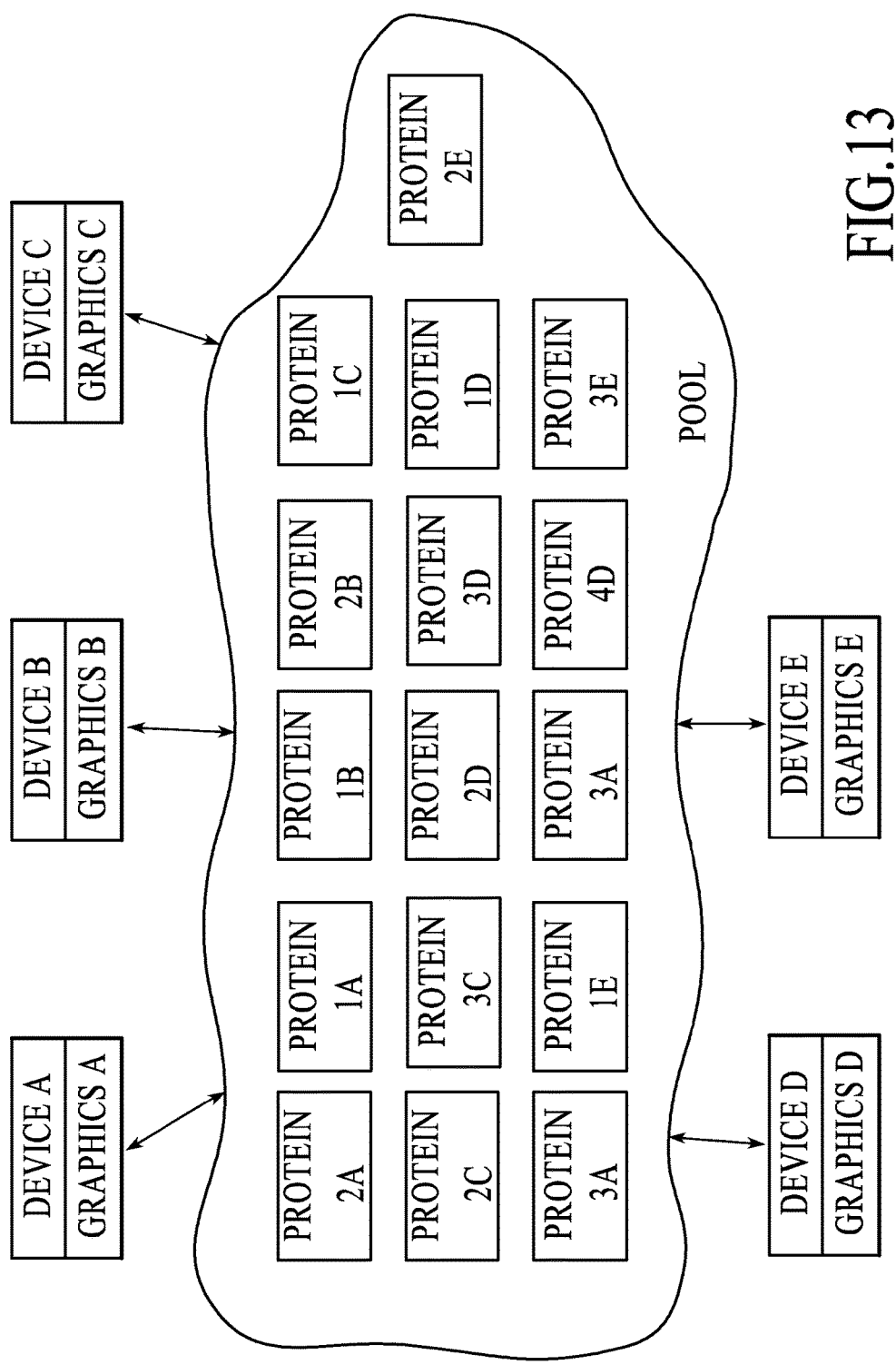
FIG. 13 is a block diagram of a processing environment including multiple devices coupled among numerous programs running on one or more of the devices in which the Plasma constructs (e.g., pools, proteins, and slaw) are used to allow the numerous running programs to share and collectively respond to the graphics events generated by the devices, under yet another alternative embodiment.

FIG. 13 is a block diagram of a processing environment including multiple devices coupled among numerous programs running on one or more of the devices in which the Plasma constructs (e.g., pools, proteins, and slaw) are used to allow the numerous running programs to share and collectively respond to the graphics events generated by the devices, under yet another alternative embodiment. This system is but one example of a system comprising multiple running programs (e.g. graphics A-E) and one or more display devices (not shown), in which the graphical output of some or all of the programs is made available to other programs in a coordinated manner using the Plasma constructs (e.g., pools, proteins, and slaw) to allow the running programs to share and collectively respond to the graphics events generated by the devices.

It is often useful for a computer program to display graphics generated by another program. Several common examples include video conferencing applications, network-based slideshow and demo programs, and window managers. Under this configuration, the pool is used as a Plasma library to implement a generalized framework which encapsulates video, network application sharing, and window management, and allows programmers to add in a number of features not commonly available in current versions of such programs.

Programs (e.g., graphics A-E) running in the Plasma compositing environment participate in a coordination pool through couplings and/or connections to the pool. Each program may deposit proteins in that pool to indicate the availability of graphical sources of various kinds. Programs that are available to display graphics also deposit proteins to indicate their displays' capabilities, security and user profiles, and physical and network locations.

Graphics data also may be transmitted through pools, or display programs may be pointed to network resources of other kinds (RTSP streams, for example). The phrase "graphics data" as used herein refers to a variety of different representations that lie along a broad continuum; examples of graphics data include but are not limited to literal examples (e.g., an 'image', or block of pixels), procedural examples (e.g., a sequence of 'drawing' directives, such as those that flow down a typical openGL pipeline), and descriptive examples (e.g., instructions that combine other graphical constructs by way of geometric transformation, clipping, and compositing operations).

On a local machine graphics data may be delivered through platform-specific display driver optimizations. Even when graphics are not transmitted via pools, often a periodic screen-capture will be stored in the coordination pool so that clients without direct access to the more esoteric sources may still display fall-back graphics.

The multi-process interactive system described herein, unlike most message passing frameworks and network protocols, includes pools that maintain a significant buffer of data. So programs can rewind backwards into a pool looking at access and usage patterns (in the case of the coordination pool) or extracting previous graphics frames (in the case of graphics pools).

Figure 14:
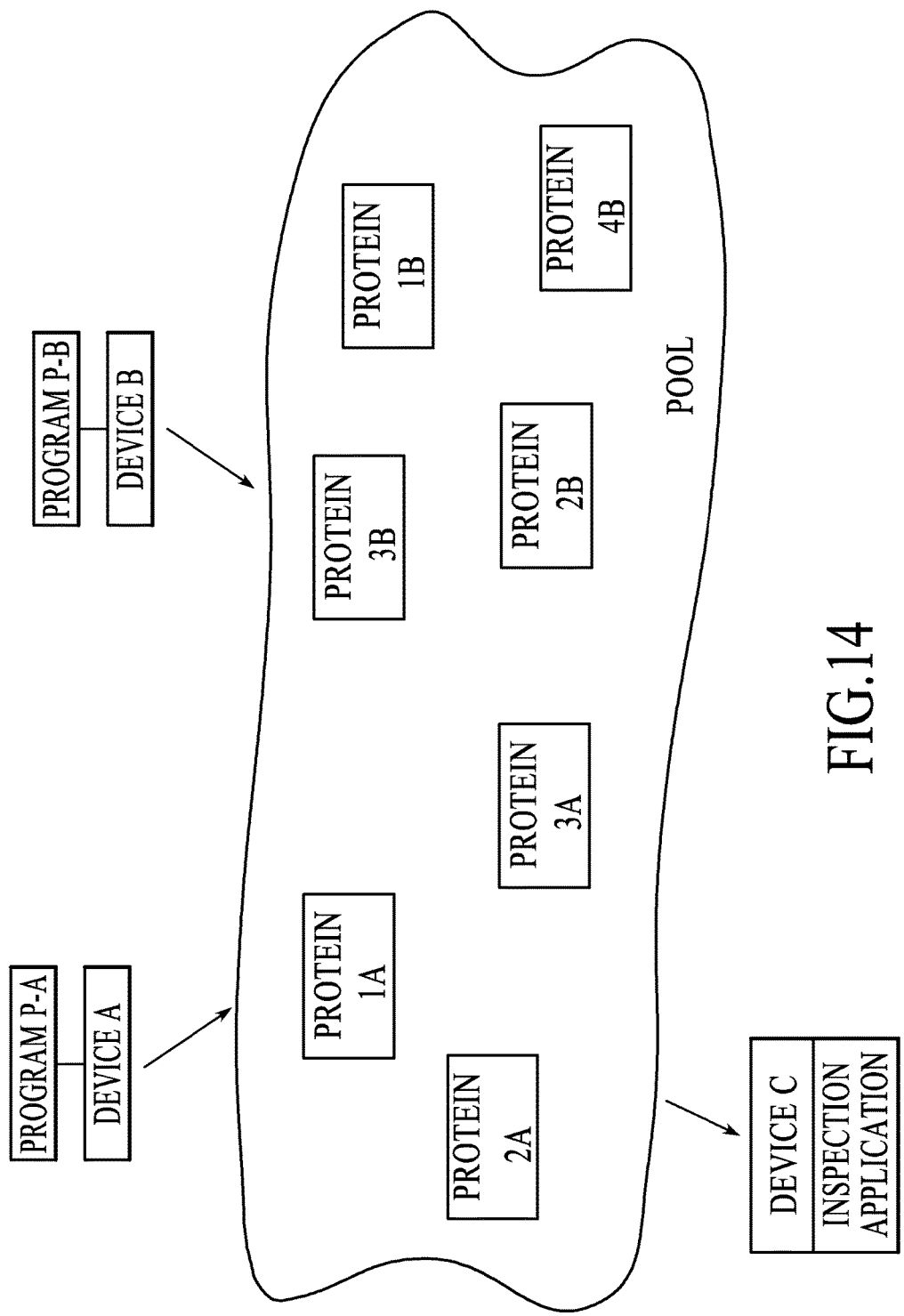
FIG. 14 is a block diagram of a processing environment including multiple devices coupled among numerous programs running on one or more of the devices in which the Plasma constructs (e.g., pools, proteins, and slaw) are used to allow stateful inspection, visualization, and debugging of the running programs, under still another alternative embodiment.

FIG. 14 is a block diagram of a processing environment including multiple devices coupled among numerous programs running on one or more of the devices in which the Plasma constructs (e.g., pools, proteins, and slaw) are used to allow stateful inspection, visualization, and debugging of the running programs, under still another alternative embodiment. This system is but one example of a system comprising multiple running programs (e.g. program P-A, program P-B, etc.) on multiple devices (e.g., device A, device B, etc.) in which some programs access the internal state of other programs using or via pools.

Most interactive computer systems comprise many programs running alongside one another, either on a single machine or on multiple machines and interacting across a network. Multi-program systems can be difficult to configure, analyze and debug because run-time data is hidden inside each process and difficult to access. The generalized framework and Plasma constructs of an embodiment described herein allow running programs to make much of their data available via pools so that other programs may inspect their state. This framework enables debugging tools that are more flexible than conventional debuggers, sophisticated system maintenance tools, and visualization harnesses configured to allow human operators to analyze in detail the sequence of states that a program or programs has passed through.

Referring to FIG. 14, a program (e.g., program P-A, program P-B, etc.) running in this framework generates or creates a process pool upon program start up. This pool is registered in the system almanac, and security and access controls are applied. More particularly, each device (e.g., device A, B, etc.) translates discrete raw data generated by or output from the programs (e.g., program P-A, program P-B, etc.) running on that respective device into Plasma proteins and deposits those proteins into a Plasma pool. For example, program P-A generates data or output and provides the output to device A which, in turn, translates the raw data into proteins (e.g., protein 1A, protein 2A, protein 3A, etc.) and deposits those proteins into the pool. As another example, program P-B generates data and provides the data to device B which, in turn, translates the data into proteins (e.g., proteins 1B-4B, etc.) and deposits those proteins into the pool.

For the duration of the program's lifetime, other programs with sufficient access permissions may attach to the pool and read the proteins that the program deposits; this represents the basic inspection modality, and is a conceptually "one-way" or "read-only" proposition: entities interested in a program P-A inspect the flow of status information deposited by P-A in its process pool. For example, an inspection program or application running under device C can extract one or more proteins (e.g., protein 1A, protein 2A, etc.) from the pool. Following protein extraction, device C can use the data of the protein, retrieved or read from the slaw of the descrips and ingests of the protein, to access, interpret and inspect the internal state of program P-A.

But, recalling that the Plasma system is not only an efficient stateful transmission scheme but also an omnidirectional messaging environment, several additional modes support program-to-program state inspection. An authorized inspection program may itself deposit proteins into program P's process pool to influence or control the characteristics of state information produced and placed in that process pool (which, after all, program P not only writes into but reads from).

Figure 15:
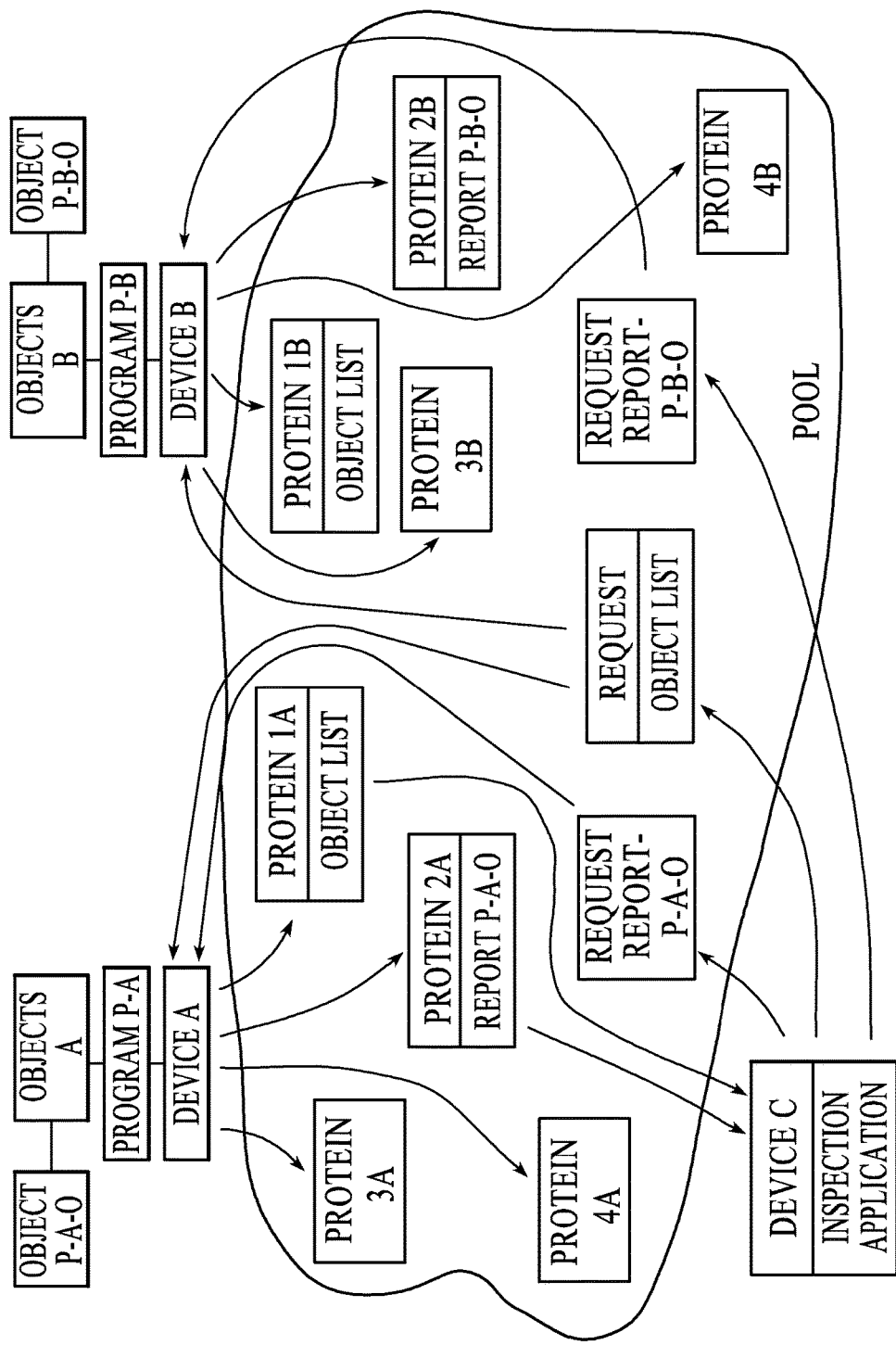
FIG. 15 is a block diagram of a processing environment including multiple devices coupled among numerous programs running on one or more of the devices in which the Plasma constructs (e.g., pools, proteins, and slaw) are used to allow influence or control the characteristics of state information produced and placed in that process pool, under an additional alternative embodiment.

FIG. 15 is a block diagram of a processing environment including multiple devices coupled among numerous programs running on one or more of the devices in which the Plasma constructs (e.g., pools, proteins, and slaw) are used to allow influence or control the characteristics of state information produced and placed in that process pool, under an additional alternative embodiment. In this system example, the inspection program of device C can for example request that programs (e.g., program P-A, program P-B, etc.) dump more state than normal into the pool, either for a single instant or for a particular duration. Or, prefiguring the next 'level' of debug communication, an interested program can request that programs (e.g., program P-A, program P-B, etc.) emit a protein listing the objects extant in its runtime environment that are individually capable of and available for interaction via the debug pool. Thus informed, the interested program can 'address' individuals among the objects in the programs runtime, placing proteins in the process pool that a particular object alone will take up and respond to. The interested program might, for example, request that an object emit a report protein describing the instantaneous values of all its component variables. Even more significantly, the interested program can, via other proteins, direct an object to change its behavior or its variables' values.

More specifically, in this example, inspection application of device C places into the pool a request (in the form of a protein) for an object list (e.g., "Request-Object List") that is then extracted by each device (e.g., device A, device B, etc.) coupled to the pool. In response to the request, each device (e.g., device A, device B, etc.) places into the pool a protein (e.g., protein 1A, protein 1B, etc.) listing the objects extant in its runtime environment that are individually capable of and available for interaction via the debug pool.

Thus informed via the listing from the devices, and in response to the listing of the objects, the inspection application of device C addresses individuals among the objects in the programs runtime, placing proteins in the process pool that a particular object alone will take up and respond to. The inspection application of device C can, for example, place a request protein (e.g., protein "Request Report P-A-O", "Request Report P-B-O") in the pool that an object (e.g., object P-A-O, object P-B-O, respectively) emit a report protein (e.g., protein 2A, protein 2B, etc.) describing the instantaneous values of all its component variables. Each object (e.g., object P-A-O, object P-B-O) extracts its request (e.g., protein "Request Report P-A-O", "Request Report P-B-O", respectively) and, in response, places a protein into the pool that includes the requested report (e.g., protein 2A, protein 2B, respectively). Device C then extracts the various report proteins (e.g., protein 2A, protein 2B, etc.) and takes subsequent processing action as appropriate to the contents of the reports.

In this way, use of Plasma as an interchange medium tends ultimately to erode the distinction between debugging, process control, and program-to-program communication and coordination.

To that last, the generalized Plasma framework allows visualization and analysis programs to be designed in a loosely-coupled fashion. A visualization tool that displays memory access patterns, for example, might be used in conjunction with any program that outputs its basic memory reads and writes to a pool. The programs undergoing analysis need not know of the existence or design of the visualization tool, and vice versa.

The use of pools in the manners described above does not unduly affect system performance. For example, embodiments have allowed for depositing of several hundred thousand proteins per second in a pool, so that enabling even relatively verbose data output does not noticeably inhibit the responsiveness or interactive character of most programs.
Spatial Operating Environment (SOE)

Figure 16:
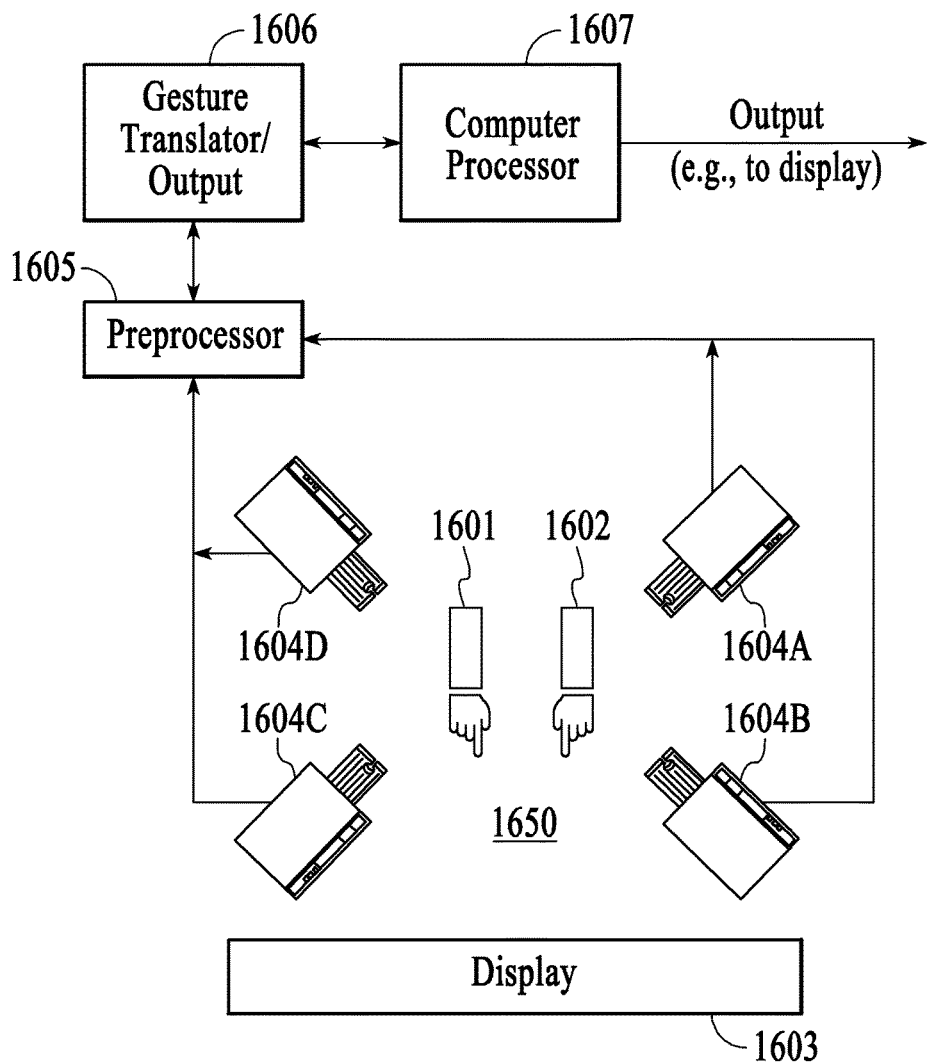
FIG. 16 is a block diagram of a gestural control system, under an embodiment.

The multi-process interactive system can be a component of or be coupled for use with a Spatial Operating Environment (SOE). The SOE, which includes a gestural control system, or gesture-based control system, can also be referred to as a Spatial User Interface (SUI) or a Spatial Interface (SI). As an example, FIG. 16 is a block diagram of a Spatial Operating Environment (SOE), under an embodiment. A user locates his hands 1601 and 1602 in the viewing area 1650 of an array of cameras 1604A-1604D. The cameras detect location, orientation, and movement of the fingers and hands 1601 and 1602 and generate output signals to pre-processor 1605. Pre-processor 1605 translates the camera output into a gesture signal that is provided to the computer processing unit 1607 of the system. The computer 1607 uses the input information to generate a command to control one or more on screen cursors and provides video output to display 1603.

Although the system is shown with a single user's hands as input, the SOE may be implemented using multiple users. In addition, instead of or in addition to hands, the system may track any part or parts of a user's body, including head, feet, legs, arms, elbows, knees, and the like.

In the embodiment shown, four cameras or sensors are used to detect the location, orientation, and movement of the user's hands 1601 and 1602 in the viewing area 1650. It should be understood that the SOE may include more (e.g., six cameras, eight cameras, etc.) or fewer (e.g., two cameras) cameras or sensors without departing from the scope or spirit of the SOE. In addition, although the cameras or sensors are disposed symmetrically in the example embodiment, there is no requirement of such symmetry in the SOE. Any number or positioning of cameras or sensors that permits the location, orientation, and movement of the user's hands may be used in the SOE.

In one embodiment, the cameras used are motion capture cameras capable of capturing grey-scale images. In one embodiment, the cameras used are those manufactured by Vicon, such as the Vicon MX40 camera. This camera includes on-camera processing and is capable of image capture at 1000 frames per second. A motion capture camera is capable of detecting and locating markers.

In the embodiment described, the cameras are sensors used for optical detection. In other embodiments, the cameras or other detectors may be used for electromagnetic, magnetostatic, RFID, or any other suitable type of detection.

Pre-processor 1605 generates three dimensional space point reconstruction and skeletal point labeling. The gesture translator 1606 converts the 3D spatial information and marker motion information into a command language that can be interpreted by a computer processor to update the location, shape, and action of a cursor on a display. In an alternate embodiment of the SOE, the pre-processor 1605 and gesture translator 1606 are integrated or combined into a single device.

Computer 1607 may be any general purpose computer such as manufactured by Apple, Dell, or any other suitable manufacturer. The computer 1607 runs applications and provides display output. Cursor information that would otherwise come from a mouse or other prior art input device now comes from the gesture system.

The SOE or an embodiment contemplates the use of marker tags on one or more fingers of the user so that the system can locate the hands of the user, identify whether it is viewing a left or right hand, and which fingers are visible. This permits the system to detect the location, orientation, and movement of the users hands. This information allows a number of gestures to be recognized by the system and used as commands by the user.

The marker tags in one embodiment are physical tags comprising a substrate (appropriate in the present embodiment for affixing to various locations on a human hand) and discrete markers arranged on the substrate's surface in unique identifying patterns.

The markers and the associated external sensing system may operate in any domain (optical, electromagnetic, magnetostatic, etc.) that allows the accurate, precise, and rapid and continuous acquisition of their three-space position. The markers themselves may operate either actively (e.g. by emitting structured electromagnetic pulses) or passively (e.g. by being optically retroreflective, as in the present embodiment).

At each frame of acquisition, the detection system receives the aggregate 'cloud' of recovered three-space locations comprising all markers from tags presently in the instrumented workspace volume (within the visible range of the cameras or other detectors). The markers on each tag are of sufficient multiplicity and are arranged in unique patterns such that the detection system can perform the following tasks: (1) segmentation, in which each recovered marker position is assigned to one and only one subcollection of points that form a single tag; (2) labelling, in which each segmented subcollection of points is identified as a particular tag; (3) location, in which the three-space position of the identified tag is recovered; and (4) orientation, in which the three-space orientation of the identified tag is recovered. Tasks (1) and (2) are made possible through the specific nature of the marker-patterns, as described below and as illustrated in one embodiment in FIG. 17.

The markers on the tags in one embodiment are affixed at a subset of regular grid locations. This underlying grid may, as in the present embodiment, be of the traditional Cartesian sort; or may instead be some other regular plane tessellation (a triangular/hexagonal tiling arrangement, for example). The scale and spacing of the grid is established with respect to the known spatial resolution of the marker-sensing system, so that adjacent grid locations are not likely to be confused. Selection of marker patterns for all tags should satisfy the following constraint: no tag's pattern shall coincide with that of any other tag's pattern through any combination of rotation, translation, or mirroring. The multiplicity and arrangement of markers may further be chosen so that loss (or occlusion) of some specified number of component markers is tolerated: After any arbitrary transformation, it should still be unlikely to confuse the compromised module with any other.

Figure 17:
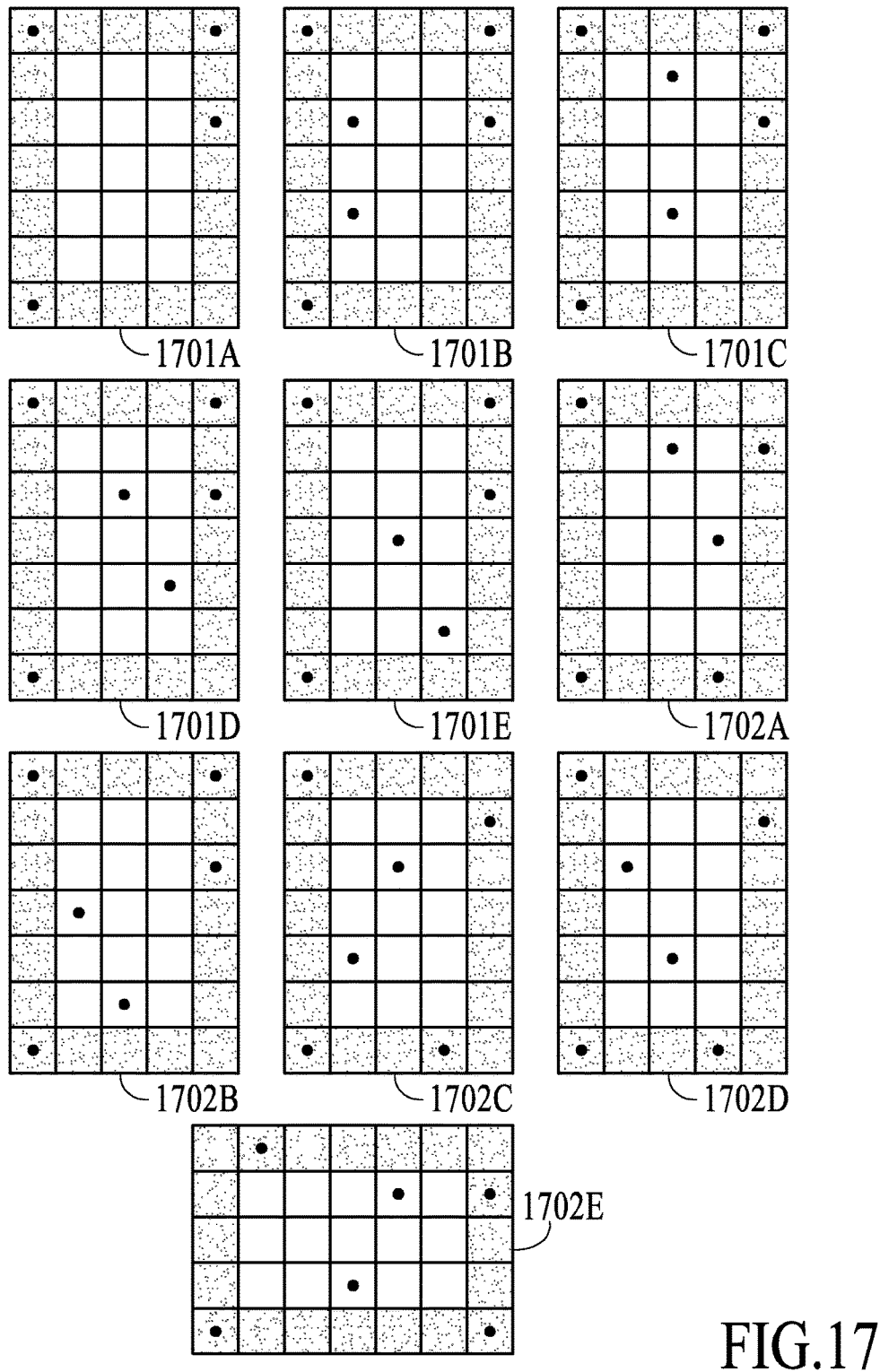
FIG. 17 is a diagram of marking tags, under an embodiment.

Referring now to FIG. 17, a number of tags 1701A-1701E (left hand) and 1702A-1702E (right hand) are shown. Each tag is rectangular and comprises in this embodiment of a 5×7 grid array. The rectangular shape is chosen as an aid in determining orientation of the tag and to reduce the likelihood of mirror duplicates. In the embodiment shown, there are tags for each finger on each hand. In some embodiments, it may be adequate to use one, two, three, or four tags per hand. Each tag has a border of a different grey-scale or color shade. Within this border is a 3×5 grid array. Markers (represented by the black dots of FIG. 17) are disposed at certain points in the grid array to provide information.

Qualifying information may be encoded in the tags' marker patterns through segmentation of each pattern into 'common' and 'unique' subpatterns. For example, the present embodiment specifies two possible 'border patterns', distributions of markers about a rectangular boundary. A 'family' of tags is thus established—the tags intended for the left hand might thus all use the same border pattern as shown in tags 1701A-1701E while those attached to the right hand's fingers could be assigned a different pattern as shown in tags 1702A-1702E. This subpattern is chosen so that in all orientations of the tags, the left pattern can be distinguished from the right pattern. In the example illustrated, the left hand pattern includes a marker in each corner and on marker in a second from corner grid location. The right hand pattern has markers in only two corners and two markers in non corner grid locations. An inspection of the pattern reveals that as long as any three of the four markers are visible, the left hand pattern can be positively distinguished from the left hand pattern. In one embodiment, the color or shade of the border can also be used as an indicator of handedness.

Each tag must of course still employ a unique interior pattern, the markers distributed within its family's common border. In the embodiment shown, it has been found that two markers in the interior grid array are sufficient to uniquely identify each of the ten fingers with no duplication due to rotation or orientation of the fingers. Even if one of the markers is occluded, the combination of the pattern and the handedness of the tag yields a unique identifier.

In the present embodiment, the grid locations are visually present on the rigid substrate as an aid to the (manual) task of affixing each retroreflective marker at its intended location. These grids and the intended marker locations are literally printed via color inkjet printer onto the substrate, which here is a sheet of (initially) flexible 'shrink-film'. Each module is cut from the sheet and then oven-baked, during which thermal treatment each module undergoes a precise and repeatable shrinkage. For a brief interval following this procedure, the cooling tag may be shaped slightly—to follow the longitudinal curve of a finger, for example; thereafter, the substrate is suitably rigid, and markers may be affixed at the indicated grid points.

In one embodiment, the markers themselves are three dimensional, such as small reflective spheres affixed to the substrate via adhesive or some other appropriate means. The three-dimensionality of the markers can be an aid in detection and location over two dimensional markers. However either can be used without departing from the spirit and scope of the SOE described herein.

At present, tags are affixed via Velcro or other appropriate means to a glove worn by the operator or are alternately affixed directly to the operator's fingers using a mild double-stick tape. In a third embodiment, it is possible to dispense altogether with the rigid substrate and affix—or 'paint'—individual markers directly onto the operator's fingers and hands.

The SOE of an embodiment contemplates a gesture vocabulary comprising hand poses, orientation, hand combinations, and orientation blends. A notation language is also implemented for designing and communicating poses and gestures in the gesture vocabulary of the SOE. The gesture vocabulary is a system for representing instantaneous 'pose states' of kinematic linkages in compact textual form. The linkages in question may be biological (a human hand, for example; or an entire human body; or a grasshopper leg; or the articulated spine of a lemur) or may instead be nonbiological (e.g. a robotic arm). In any case, the linkage may be simple (the spine) or branching (the hand). The gesture vocabulary system of the SOE establishes for any specific linkage a constant length string; the aggregate of the specific ASCII characters occupying the string's 'character locations' is then a unique description of the instantaneous state, or 'pose', of the linkage.

FIG. 18 illustrates hand poses in an embodiment of a gesture vocabulary of the SOE, under an embodiment. The SOE supposes that each of the five fingers on a hand is used. These fingers are codes as p-pinkie, r-ring finger, m-middle finger, i-index finger, and t-thumb. A number of poses for the fingers and thumbs are defined and illustrated in FIG. 18. A gesture vocabulary string establishes a single character position for each expressible degree of freedom in the of the linkage (in this case, a finger). Further, each such degree of freedom is understood to be discretized (or 'quantized'), so that its full range of motion can be expressed through assignment of one of a finite number of standard ASCII characters at that string position. These degrees of freedom are expressed with respect to a body-specific origin and coordinate system (the back of the hand, the center of the grasshopper's body; the base of the robotic arm; etc.). A small number of additional gesture vocabulary character positions are therefore used to express the position and orientation of the linkage 'as a whole' in the more global coordinate system.

Still referring to FIG. 18, a number of poses are defined and identified using ASCII characters. Some of the poses are divided between thumb and non-thumb. The SOE in this embodiment uses a coding such that the ASCII character itself is suggestive of the pose. However, any character may used to represent a pose, whether suggestive or not. In addition, there is no requirement in the invention to use ASCII characters for the notation strings. Any suitable symbol, numeral, or other representation maybe used without departing from the scope and spirit of the invention. For example, the notation may use two bits per finger if desired or some other number of bits as desired.

A curled finger is represented by the character "A" while a curled thumb by ">". A straight finger or thumb pointing up is indicated by "1" and at an angle by "\" or "/". "-" represents a thumb pointing straight sideways and "x" represents a thumb pointing into the plane.

Using these individual finger and thumb descriptions, a robust number of hand poses can be defined and written using the scheme of the invention. Each pose is represented by five characters with the order being p-r-m-i-t as described above. FIG. 18 illustrates a number of poses and a few are described here by way of illustration and example. The hand held flat and parallel to the ground is represented by "11111". A first is represented by "^^^^>". An "OK" sign is represented by "111^>".

The character strings provide the opportunity for straightforward 'human readability' when using suggestive characters. The set of possible characters that describe each degree of freedom may generally be chosen with an eye to quick recognition and evident analogy. For example, a vertical bar ('|') would likely mean that a linkage element is 'straight', an ell ('L') might mean a ninety-degree bend, and a circumflex ('^') could indicate a sharp bend. As noted above, any characters or coding may be used as desired.

Any system employing gesture vocabulary strings such as described herein enjoys the benefit of the high computational efficiency of string comparison—identification of or search for any specified pose literally becomes a 'string compare' (e.g. UNIX's 'strcmp( )' function) between the desired pose string and the instantaneous actual string. Furthermore, the use of 'wildcard characters' provides the programmer or system designer with additional familiar efficiency and efficacy: degrees of freedom whose instantaneous state is irrelevant for a match may be specified as an interrogation point ('?'); additional wildcard meanings may be assigned.

In addition to the pose of the fingers and thumb, the orientation of the hand can represent information. Characters describing global-space orientations can also be chosen transparently: the characters '<', '>', '^', and 'v' may be used to indicate, when encountered in an orientation character position, the ideas of left, right, up, and down. FIG. 19 illustrates hand orientation descriptors and examples of coding that combines pose and orientation. In an embodiment, two character positions specify first the direction of the palm and then the direction of the fingers (if they were straight, irrespective of the fingers' actual bends). The possible characters for these two positions express a 'body-centric' notion of orientation: '-', '+', 'x', '*', '^', and 'v' describe medial, lateral, anterior (forward, away from body), posterior (backward, away from body), cranial (upward), and caudal (downward).

In the notation scheme of and embodiment of the invention, the five finger pose indicating characters are followed by a colon and then two orientation characters to define a complete command pose. In one embodiment, a start position is referred to as an "xyz" pose where the thumb is pointing straight up, the index finger is pointing forward and the middle finger is perpendicular to the index finger, pointing to the left when the pose is made with the right hand. This is represented by the string "^^x1-:-x".

The 'XYZ-hand' is a technique for exploiting the geometry of the human hand to allow full six-degree-of-freedom navigation of a visually presented three-dimensional structure. Although the technique depends only on the bulk translation and rotation of the operator's hand—so that its fingers may in principal be held in any pose desired—the present embodiment prefers a static configuration in which the index finger points away from the body; the thumb points toward the ceiling; and the middle finger points left-right. The three fingers thus describe (roughly, but with clearly evident intent) the three mutually orthogonal axes of a three-space coordinate system: thus 'XYZ-hand'.

XYZ-hand navigation then proceeds with the hand, fingers in a pose as described above, held before the operator's body at a predetermined 'neutral location'. Access to the three translational and three rotational degrees of freedom of a three-space object (or camera) is effected in the following natural way: left-right movement of the hand (with respect to the body's natural coordinate system) results in movement along the computational context's x-axis; up-down movement of the hand results in movement along the controlled context's y-axis; and forward-back hand movement (toward/away from the operator's body) results in z-axis motion within the context. Similarly, rotation of the operator's hand about the index finger leads to a 'roll' change of the computational context's orientation; 'pitch' and 'yaw' changes are effected analogously, through rotation of the operator's hand about the middle finger and thumb, respectively.

Note that while 'computational context' is used here to refer to the entity being controlled by the XYZ-hand method—and seems to suggest either a synthetic three-space object or camera—it should be understood that the technique is equally useful for controlling the various degrees of freedom of real-world objects: the pan/tilt/roll controls of a video or motion picture camera equipped with appropriate rotational actuators, for example. Further, the physical degrees of freedom afforded by the XYZ-hand posture may be somewhat less literally mapped even in a virtual domain: In the present embodiment, the XYZ-hand is also used to provide navigational access to large panoramic display images, so that left-right and up-down motions of the operator's hand lead to the expected left-right or up-down 'panning' about the image, but forward-back motion of the operator's hand maps to 'zooming' control.

In every case, coupling between the motion of the hand and the induced computational translation/rotation may be either direct (i.e. a positional or rotational offset of the operator's hand maps one-to-one, via some linear or non-linear function, to a positional or rotational offset of the object or camera in the computational context) or indirect (i.e. positional or rotational offset of the operator's hand maps one-to-one, via some linear or nonlinear function, to a first or higher-degree derivative of position/orientation in the computational context; ongoing integration then effects a non-static change in the computational context's actual zero-order position/orientation). This latter means of control is analogous to use of a an automobile's 'gas pedal', in which a constant offset of the pedal leads, more or less, to a constant vehicle speed.

The 'neutral location' that serves as the real-world XYZ-hand's local six-degree-of-freedom coordinate origin may be established (1) as an absolute position and orientation in space (relative, say, to the enclosing room); (2) as a fixed position and orientation relative to the operator herself (e.g. eight inches in front of the body, ten inches below the chin, and laterally in line with the shoulder plane), irrespective of the overall position and 'heading' of the operator; or (3) interactively, through deliberate secondary action of the operator (using, for example, a gestural command enacted by the operator's 'other' hand, said command indicating that the XYZ-hand's present position and orientation should henceforth be used as the translational and rotational origin).

It is further convenient to provide a 'detent' region (or 'dead zone') about the XYZ-hand's neutral location, such that movements within this volume do not map to movements in the controlled context.

Other poses may included:

[||||:vx] is a flat hand (thumb parallel to fingers) with palm facing down and fingers forward.

[||||:x^] is a flat hand with palm facing forward and fingers toward ceiling.

[||||:-x] is a flat hand with palm facing toward the center of the body (right if left hand, left if right hand) and fingers forward.

[^^^-:-x] is a single-hand thumbs-up (with thumb pointing toward ceiling).

[^^|-:-x] is a mime gun pointing forward.

The SOE of an embodiment contemplates single hand commands and poses, as well as two-handed commands and poses. FIG. 20 illustrates examples of two hand combinations and associated notation in an embodiment of the SOE. Reviewing the notation of the first example, "full stop" reveals that it comprises two closed fists. The "snapshot" example has the thumb and index finger of each hand extended, thumbs pointing toward each other, defining a goal post shaped frame. The "rudder and throttle start position" is fingers and thumbs pointing up palms facing the screen.

Figures 21, 22:
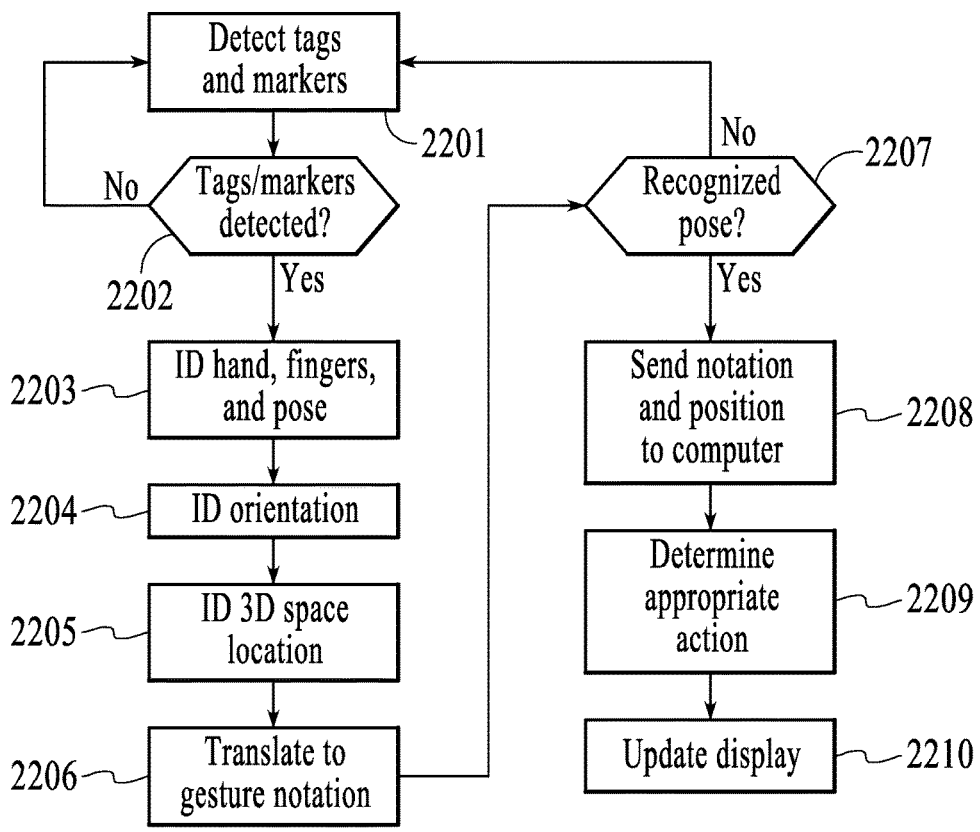
FIG. 21 is a diagram of orientation blends in a gesture vocabulary, under an embodiment.
FIG. 22 is a flow diagram of gestural control, under an embodiment.

FIG. 21 illustrates an example of an orientation blend in an embodiment of the SOE. In the example shown the blend is represented by enclosing pairs of orientation notations in parentheses after the finger pose string. For example, the first command shows finger positions of all pointing straight. The first pair of orientation commands would result in the palms being flat toward the display and the second pair has the hands rotating to a 45 degree pitch toward the screen. Although pairs of blends are shown in this example, any number of blends is contemplated in the SOE.

FIG. 23 illustrates a number of possible commands that may be used with the SOE. Although some of the discussion here has been about controlling a cursor on a display, the SOE is not limited to that activity. In fact, the SOE has great application in manipulating any and all data and portions of data on a screen, as well as the state of the display. For example, the commands may be used to take the place of video controls during play back of video media. The commands may be used to pause, fast forward, rewind, and the like. In addition, commands may be implemented to zoom in or zoom out of an image, to change the orientation of an image, to pan in any direction, and the like. The SOE may also be used in lieu of menu commands such as open, close, save, and the like. In other words, any commands or activity that can be imagined can be implemented with hand gestures.

FIG. 22 is a flow diagram of operation of the SOE, under an embodiment. At 2201 the detection system detects the markers and tags. At 2202 it is determined if the tags and markers are detected. If not, the system returns to 2201. If the tags and markers are detected at 2202, the system proceeds to 2203. At 2203 the system identifies the hand, fingers and pose from the detected tags and markers. At 2204 the system identifies the orientation of the pose. At 2205 the system identifies the three dimensional spatial location of the hand or hands that are detected. (Please note that any or all of 2203, 2204, and 2205 may be combined).

At 2206 the information is translated to the gesture notation described above. At 2207 it is determined if the pose is valid. This may be accomplished via a simple string comparison using the generated notation string. If the pose is not valid, the system returns to 2201. If the pose is valid, the system sends the notation and position information to the computer at 2208. At 2209 the computer determines the appropriate action to take in response to the gesture and updates the display accordingly at 2210.

In one embodiment of the SOE, operations 2201-2205 are accomplished by the on-camera processor. In other embodiments, the processing can be accomplished by the system computer if desired.

The system is able to "parse" and "translate" a stream of low-level gestures recovered by an underlying system, and turn those parsed and translated gestures into a stream of command or event data that can be used to control a broad range of computer applications and systems. These techniques and algorithms may be embodied in a system comprising computer code that provides both an engine implementing these techniques and a platform for building computer applications that make use of the engine's capabilities.

One embodiment is focused on enabling rich gestural use of human hands in computer interfaces, but is also able to recognize gestures made by other body parts (including, but not limited to, arms, torso, legs and the head), as well as non-hand physical tools of various kinds, both static and articulating, including but not limited to calipers, compasses, flexible curve approximators, and pointing devices of various shapes. The markers and tags may be applied to items and tools that may be carried and used by the operator as desired.

The system described here incorporates a number of innovations that make it possible to build gestural systems that are rich in the range of gestures that can be recognized and acted upon, while at the same time providing for easy integration into applications.

The gestural parsing and translation system in one embodiment comprises:

1) a compact and efficient way to specify (encode for use in computer programs) gestures at several different levels of aggregation:

a. a single hand's "pose" (the configuration and orientation of the parts of the hand relative to one another) a single hand's orientation and position in three-dimensional space.
b. two-handed combinations, for either hand taking into account pose, position or both.
c. multi-person combinations; the system can track more than two hands, and so more than one person can cooperatively (or competitively, in the case of game applications) control the target system.
d. sequential gestures in which poses are combined in a series; we call these "animating" gestures.
e. "grapheme" gestures, in which the operator traces shapes in space.

2) a programmatic technique for registering specific gestures from each category above that are relevant to a given application context.

3) algorithms for parsing the gesture stream so that registered gestures can be identified and events encapsulating those gestures can be delivered to relevant application contexts.

The specification system (1), with constituent elements (1a) to (1f), provides the basis for making use of the gestural parsing and translating capabilities of the system described here.

A single-hand "pose" is represented as a string of
i) relative orientations between the fingers and the back of the hand,
ii) quantized into a small number of discrete states.

Using relative joint orientations allows the system described here to avoid problems associated with differing hand sizes and geometries. No "operator calibration" is required with this system. In addition, specifying poses as a string or collection of relative orientations allows more complex gesture specifications to be easily created by combining pose representations with further filters and specifications.

Using a small number of discrete states for pose specification makes it possible to specify poses compactly as well as to ensure accurate pose recognition using a variety of underlying tracking technologies (for example, passive optical tracking using cameras, active optical tracking using lighted dots and cameras, electromagnetic field tracking, etc).

Gestures in every category (1a) to (1f) may be partially (or minimally) specified, so that non-critical data is ignored. For example, a gesture in which the position of two fingers is definitive, and other finger positions are unimportant, may be represented by a single specification in which the operative positions of the two relevant fingers is given and, within the same string, "wild cards" or generic "ignore these" indicators are listed for the other fingers.

All of the innovations described here for gesture recognition, including but not limited to the multi-layered specification technique, use of relative orientations, quantization of data, and allowance for partial or minimal specification at every level, generalize beyond specification of hand gestures to specification of gestures using other body parts and "manufactured" tools and objects.

The programmatic techniques for "registering gestures" (2), comprise a defined set of Application Programming Interface calls that allow a programmer to define which gestures the engine should make available to other parts of the running system.

These API routines may be used at application set-up time, creating a static interface definition that is used throughout the lifetime of the running application. They may also be used during the course of the run, allowing the interface characteristics to change on the fly. This real-time alteration of the interface makes it possible to,
i) build complex contextual and conditional control states,
ii) to dynamically add hysterisis to the control environment, and
iii) to create applications in which the user is able to alter or extend the interface vocabulary of the running system itself.

Algorithms for parsing the gesture stream (3) compare gestures specified as in (1) and registered as in (2) against incoming low-level gesture data. When a match for a registered gesture is recognized, event data representing the matched gesture is delivered up the stack to running applications.

Efficient real-time matching is desired in the design of this system, and specified gestures are treated as a tree of possibilities that are processed as quickly as possible.

In addition, the primitive comparison operators used internally to recognize specified gestures are also exposed for the applications programmer to use, so that further comparison (flexible state inspection in complex or compound gestures, for example) can happen even from within application contexts.

Recognition "locking" semantics are an innovation of the system described here. These semantics are implied by the registration API (2) (and, to a lesser extent, embedded within the specification vocabulary (1)). Registration API calls include,
i) "entry" state notifiers and "continuation" state notifiers, and
ii) gesture priority specifiers.

If a gesture has been recognized, its "continuation" conditions take precedence over all "entry" conditions for gestures of the same or lower priorities. This distinction between entry and continuation states adds significantly to perceived system usability.

The system described here includes algorithms for robust operation in the face of real-world data error and uncertainty. Data from low-level tracking systems may be incomplete (for a variety of reasons, including occlusion of markers in optical tracking, network drop-out or processing lag, etc).

Missing data is marked by the parsing system, and interpolated into either "last known" or "most likely" states, depending on the amount and context of the missing data.

If data about a particular gesture component (for example, the orientation of a particular joint) is missing, but the "last known" state of that particular component can be analyzed as physically possible, the system uses this last known state in its real-time matching.

Conversely, if the last known state is analyzed as physically impossible, the system falls back to a "best guess range" for the component, and uses this synthetic data in its real-time matching.

The specification and parsing systems described here have been carefully designed to support "handedness agnosticism," so that for multi-hand gestures either hand is permitted to satisfy pose requirements.

The system of an embodiment can provide an environment in which virtual space depicted on one or more display devices ("screens") is treated as coincident with the physical space inhabited by the operator or operators of the system. An embodiment of such an environment is described here. This current embodiment includes three projector-driven screens at fixed locations, is driven by a single desktop computer, and is controlled using the gestural vocabulary and interface system described herein. Note, however, that any number of screens are supported by the techniques being described; that those screens may be mobile (rather than fixed); that the screens may be driven by many independent computers simultaneously; and that the overall system can be controlled by any input device or technique.

The interface system described in this disclosure should have a means of determining the dimensions, orientations and positions of screens in physical space. Given this information, the system is able to dynamically map the physical space in which these screens are located (and which the operators of the system inhabit) as a projection into the virtual space of computer applications running on the system. As part of this automatic mapping, the system also translates the scale, angles, depth, dimensions and other spatial characteristics of the two spaces in a variety of ways, according to the needs of the applications that are hosted by the system.

This continuous translation between physical and virtual space makes possible the consistent and pervasive use of a number of interface techniques that are difficult to achieve on existing application platforms or that must be implemented piece-meal for each application running on existing platforms. These techniques include (but are not limited to):

1) Use of "literal pointing"—using the hands in a gestural interface environment, or using physical pointing tools or devices—as a pervasive and natural interface technique.

2) Automatic compensation for movement or repositioning of screens.

3) Graphics rendering that changes depending on operator position, for example simulating parallax shifts to enhance depth perception.

4) Inclusion of physical objects in on-screen display—taking into account real-world position, orientation, state, etc. For example, an operator standing in front of a large, opaque screen, could see both applications graphics and a representation of the true position of a scale model that is behind the screen (and is, perhaps, moving or changing orientation).

It is important to note that literal pointing is different from the abstract pointing used in mouse-based windowing interfaces and most other contemporary systems. In those systems, the operator must learn to manage a translation between a virtual pointer and a physical pointing device, and must map between the two cognitively.

By contrast, in the systems described in this disclosure, there is no difference between virtual and physical space (except that virtual space is more amenable to mathematical manipulation), either from an application or user perspective, so there is no cognitive translation required of the operator.

The closest analogy for the literal pointing provided by the embodiment described here is the touch-sensitive screen (as found, for example, on many ATM machines). A touch-sensitive screen provides a one to one mapping between the two-dimensional display space on the screen and the two-dimensional input space of the screen surface. In an analogous fashion, the systems described here provide a flexible mapping (possibly, but not necessarily, one to one) between a virtual space displayed on one or more screens and the physical space inhabited by the operator. Despite the usefulness of the analogy, it is worth understanding that the extension of this "mapping approach" to three dimensions, an arbitrarily large architectural environment, and multiple screens is non-trivial.

In addition to the components described herein, the system may also implement algorithms implementing a continuous, systems-level mapping (perhaps modified by rotation, translation, scaling or other geometrical transformations) between the physical space of the environment and the display space on each screen.

A rendering stack which takes the computational objects and the mapping and outputs a graphical representation of the virtual space.

An input events processing stack which takes event data from a control system (in the current embodiment both gestural and pointing data from the system and mouse input) and maps spatial data from input events to coordinates in virtual space. Translated events are then delivered to running applications.

A "glue layer" allowing the system to host applications running across several computers on a local area network.

Considering the description above of the SOE, the SOE can be used as a component of and/or coupled to a multi-process interactive system, as described above with reference to FIGS. 1A-1C and elsewhere herein. The SOE of an embodiment can be encapsulated as a gestural/spatial process G that delivers user input proteins into the user input pool Ui, as described above.

The embodiments herein include systems and methods that detect from gesture data a gesture made by a body. The gesture data is received via a detector. The systems and methods of an embodiment execute numerous processes on a processing device. The processes generate events that include a set of events representing the gesture. The systems and methods of an embodiment translate the events of each process into data capsules. The systems and methods of an embodiment transfer the data capsules into numerous pools or repositories. A set of processes of the numerous processes operate as recognizing processes. The recognizing processes recognize in the pools data capsules comprising content that corresponds to the gesture. The recognizing processes retrieve recognized data capsules from the pools and generate a gesture signal from the recognized data capsules by compositing contents of the recognized data capsules to form the gesture signal. The gesture signal represents the gesture.

Figure 24:
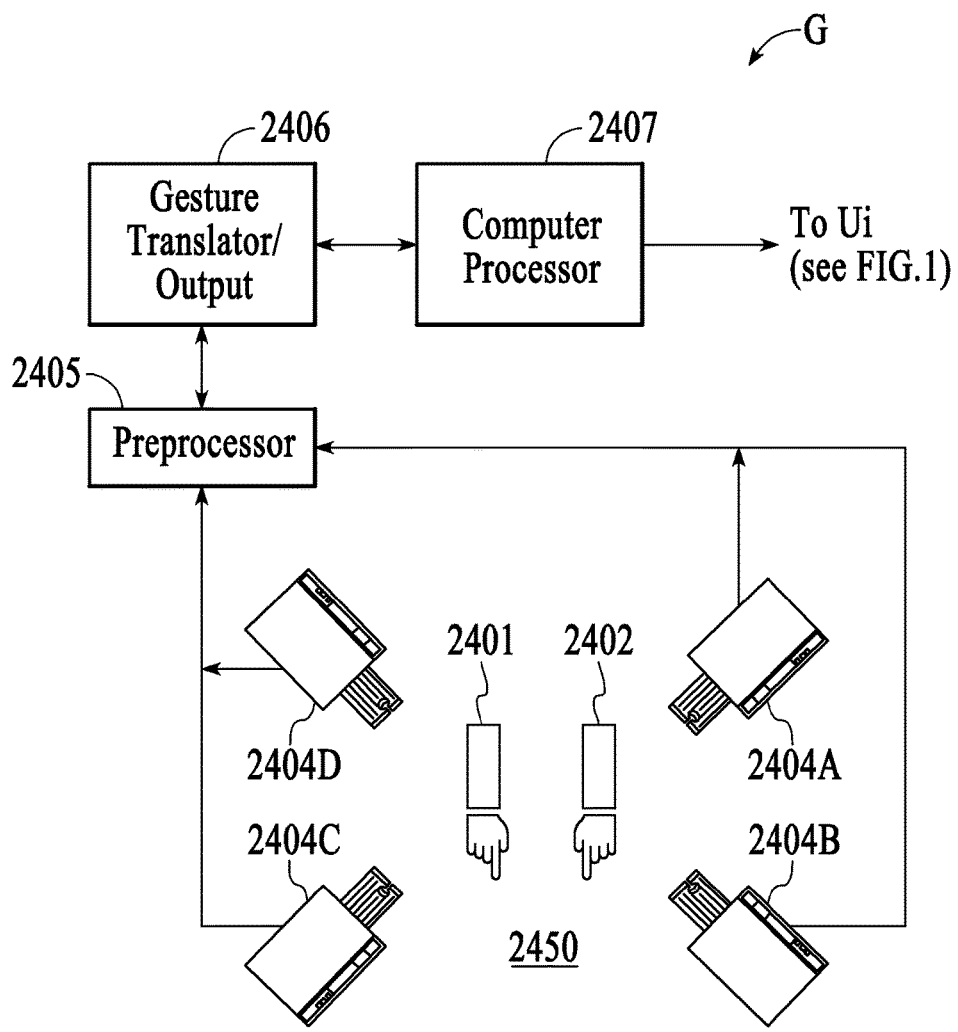
FIG. 24 is a block diagram of a Spatial Operating Environment (SOE) implemented with a multi-process interactive system, under an embodiment.

FIG. 24 is a block diagram of a Spatial Operating Environment (SOE) (see FIG. 1C, element G) implemented with or as a component of a multi-process interactive system, under an embodiment. A user locates his hands 2401 and 2402 in the viewing area 2450 of an array of cameras 2404A-2404D. The cameras detect location, orientation, and movement of the fingers and hands 2401 and 2402 and generate output signals to pre-processor 2405. Pre-processor 2405 translates the camera output into a gesture signal that is provided to a computer processor of the system. In this embodiment, the functions of the computer processor, performed by computer 2407 described above, can be performed by a processor of and/or coupled to the multi-process interactive system (FIG. 1C). The gesture signal can be provided or transferred to a pool of the multi-process interactive system (Pool Ui, FIG. 1C). Consequently, the multi-process interactive system uses the gesture signal to generate a command to control one or more components coupled to the multi-process interactive system (e.g., display cursor, etc.).

Although the system is shown with a single user's hands as input, the SOE may be implemented using multiple users. In addition, instead of or in addition to hands, the system may track any part or parts of a user's body, including head, feet, legs, arms, elbows, knees, and the like.

In the embodiment shown, four cameras or sensors are used to detect the location, orientation, and movement of the user's hands 2401 and 2402 in the viewing area 2450. It should be understood that the SOE may include more (e.g., six cameras, eight cameras, etc.) or fewer (e.g., two cameras) cameras or sensors without departing from the scope or spirit of the SOE. In addition, although the cameras or sensors are disposed symmetrically in the example embodiment, there is no requirement of such symmetry in the SOE. Any number or positioning of cameras or sensors that permits the location, orientation, and movement of the user's hands may be used in the SOE.

In one embodiment, the cameras used are motion capture cameras capable of capturing grey-scale images. In one embodiment, the cameras used are those manufactured by Vicon, such as the Vicon MX40 camera. This camera includes on-camera processing and is capable of image capture at 1000 frames per second. A motion capture camera is capable of detecting and locating markers.

In the embodiment described, the cameras are sensors used for optical detection. In other embodiments, the cameras or other detectors may be used for electromagnetic, magnetostatic, RFID, or any other suitable type of detection.

Pre-processor 2405 generates three dimensional space point reconstruction and skeletal point labeling. The gesture translator 2406 converts the 3D spatial information and marker motion information into a command language that can be interpreted by components of the multi-process interactive system that receive information from pool Ui (see FIG. 1). In an alternate embodiment of the SOE, the pre-processor 2405 and gesture translator 106 are integrated or combined into a single device.

Figure 25:
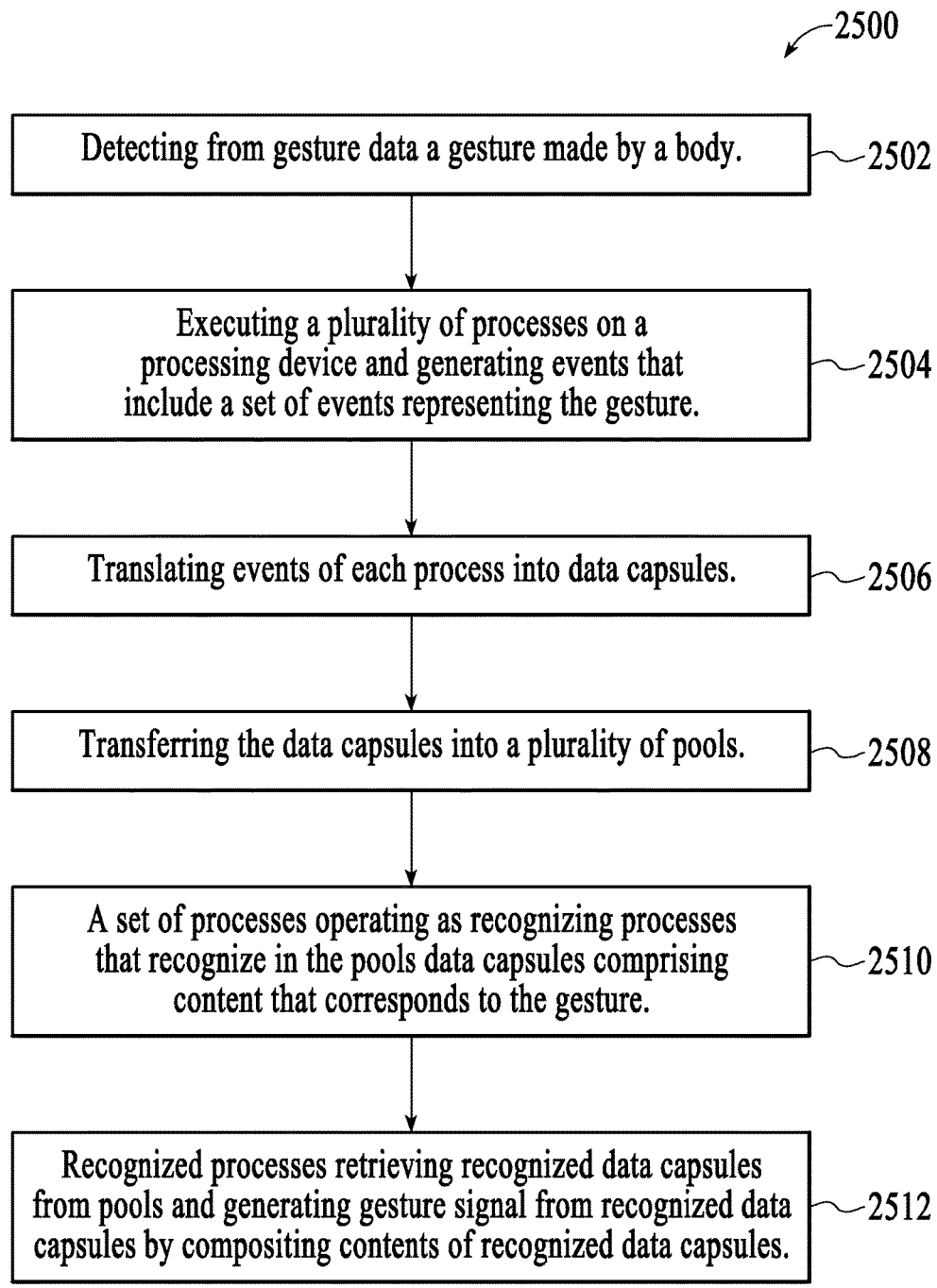
FIG. 25 is a flow diagram for operations of the multi-process interactive system using inputs from a gestural control system, under an embodiment.

FIG. 25 is a flow diagram 2500 for operations of the multi-process interactive system 100 (see FIG. 1) using inputs from a gestural control system, under an embodiment. The operations include detecting from gesture data a gesture made by a body 2502. The gesture data is received via a detector. The operations include executing a plurality of processes on a processing device 2504. The processes generate events that include a set of events representing the gesture. The processes include separable program execution contexts of a spatial operating application, but are not so limited. The events of each process are translated into data capsules 2506. A data capsule includes an application-independent representation of event data of an event and state information of the process originating the data capsule, but is not so limited. The data capsules are transferred into a plurality of pools 2508. A set of processes of the numerous processes operate as recognizing processes. The recognizing processes recognize in the pools data capsules comprising content that corresponds to the gesture 2510. The recognizing processes retrieve recognized data capsules from the pools and generate a gesture signal from the recognized data capsules by compositing contents of the recognized data capsules to form the gesture signal 2512. The gesture signal represents the gesture.

Embodiments described herein include a method comprising: executing a plurality of processes on at least one processing device; translating events of each process of the plurality of processes into data capsules; transferring the data capsules into a plurality of pools; each process operating as a recognizing process, the recognizing process recognizing in the plurality of pools data capsules comprising at least one of content that corresponds to an interactive function of the recognizing process and an identification of the recognizing process; and the recognizing process retrieving recognized data capsules from the plurality of pools and executing processing appropriate to contents of the recognized data capsules.

A data capsule of an embodiment includes an application-independent representation of event data of an event and state information of the process originating the data message.

The method of an embodiment comprises forming an interactive application from the plurality of processes by coordinating operations of each of the plurality of processes using the data capsules and the plurality of pools.

The method of an embodiment comprises coordinating operations of the plurality of processes using at least one of the data capsules and the plurality of pools.

The method of an embodiment comprises dividing an application program into a set of processes, wherein the plurality of processes includes the set of processes.

The method of an embodiment comprises a process generating an output by interactively processing a plurality of retrieved data capsules of at least one pool of the plurality of pools.

The plurality of processes of an embodiment includes separable program execution contexts of a plurality of application programs, wherein each application program comprises at least one process.

The method of an embodiment comprises executing the plurality of processes in parallel.

The method of an embodiment comprises executing a first set of processes in parallel, and executing a second set of processes in sequence, wherein the plurality of processes includes the first set of processes and the second set of processes.

The events of an embodiment represent process inputs.

The events of an embodiment represent process outputs.

The events of an embodiment comprise a user interface event.

The events of an embodiment comprise a graphics event.

The events of an embodiment represent process state.

The state of a process of an embodiment represents the interactive function of the process, wherein the interactive function of the process is exposed to the plurality of processes as contents of the data capsules.

The method of an embodiment comprises defining an application programming interface (API) of the plurality of processes by contents of the data capsules instead of defining the API by function calls.

The contents of the data capsules of an embodiment are application-independent and recognizable by the plurality of processes.

The at least one processing device of an embodiment comprises a plurality of processing devices.

At least one first set of processes of the plurality of processes of an embodiment are running under at least one first set of processing devices of the plurality of processing device and at least one second set of processes of the plurality of processes of an embodiment are running under at least one second set of processing devices of the plurality of processing devices.

The plurality of processes of an embodiment includes a first process.

The translating of an embodiment comprises transforming events of the first process into at least one data sequence comprising first process event data specifying the event and state information of the event.

The first process event data and state information of an embodiment are type-specific data having a type corresponding to an application of the first process.

The translating of an embodiment comprises forming the data capsule to include the at least one data sequence, the data capsule having a data structure comprising an application-independent representation of the at least one data sequence.

The plurality of processes of an embodiment includes a second process.

The translating of an embodiment comprises transforming state change events of the second process into at least one data sequence comprising second process event data specifying the event and state information of the event.

The second process event data and state information of an embodiment are type-specific data having a type corresponding to an application of the second process.

The translating of an embodiment comprises forming the data capsule to include the at least one data sequence, the data capsule having a data structure comprising an application-independent representation of the at least one data sequence.

The recognizing process of an embodiment is the second process, the retrieving comprising the second process retrieving the recognized data capsules from the plurality of pools and executing processing appropriate to contents of the recognized data capsules.

The contents of the recognized data capsules of an embodiment are data representing state information of the first process.

The translating of an embodiment comprises transforming the contents of the recognized data capsules into at least one new data sequence, the at least one new data sequence representing at least one of an event of the first process and an event of the second process.

The at least one new data sequence of an embodiment comprises event data specifying the event and state information of at least one of the first process and the second process.

The event data and state information of the at least one of the first process and the second process of an embodiment are type-specific data having a type corresponding to an application of the at least one of the first process and the second process.

The translating of an embodiment comprises forming the data capsule to include the at least one new data sequence, the data capsule having a data structure comprising an application-independent representation of the at least one new data sequence.

The plurality of processes of an embodiment uses the at least one new data sequence.

The processing appropriate to contents of the recognized data capsules of an embodiment comprises rendering a graphical object, wherein the graphical object is rendered on a display of the at least one processing device.

The rendering of an embodiment comprises direct rendering in which the plurality of processes draw directly to a graphics layer of the at least one processing device, wherein the plurality of pools is used for coordination among the plurality of processes as appropriate to the rendering.

The rendering of an embodiment comprises the plurality of processes transferring data capsules comprising rendering commands into the plurality of pools. The rendering of an embodiment comprises the plurality of processes retrieving the rendering commands from the plurality of pools, interpreting the rendering commands, and driving a graphics layer of the at least one processing device in response to the rendering commands.

The rendering of an embodiment comprises the plurality of processes rendering to pixel buffers. The rendering of an embodiment comprises the plurality of processes transferring raw frame data into the plurality of pools, the raw frame data resulting from the rendering to the pixel buffers. The rendering of an embodiment comprises the plurality of processes retrieving the raw frame data from the plurality of pools and combining the raw frame data for use in driving a graphics layer of the at least one processing device.

The method of an embodiment comprises detecting an event of the plurality of processes. The method of an embodiment comprises generating at least one data sequence comprising event data specifying the event and state information of the event, wherein the event data and state information are type-specific data having a type corresponding to an application of the at least one processing device. The method of an embodiment comprises forming a data capsule to include the at least one data sequence, the data capsule having a data structure comprising an application-independent representation of the at least one data sequence.

The generating of the at least one data sequence of an embodiment comprises generating a first respective data set that includes first respective event data. The generating of the at least one data sequence of an embodiment comprises generating a second respective data set that includes second respective state information. The generating of the at least one data sequence of an embodiment comprises forming a first data sequence to include the first respective data set and the second respective data set.

The generating of the first respective data set of an embodiment includes forming the first respective data set to include identification data of the at least one processing device, the identification data including data identifying the at least one processing device.

The generating of the at least one data sequence of an embodiment comprises generating a first respective data set that includes first respective event data. The generating of the at least one data sequence of an embodiment comprises generating a second respective data set that includes second respective state information. The generating of the at least one data sequence of an embodiment comprises forming a second data sequence to include the first respective data set and the second respective data set.

The generating of the first respective data set of an embodiment includes generating a first respective data set offset, wherein the first respective data set offset points to the first respective data set of the second data sequence.

The generating of the second respective data set of an embodiment includes generating a second respective data set offset, wherein the second respective data set offset points to the second respective data set of the second data sequence.

The first respective data set of an embodiment is a description list, the description list including a description of the data.

The event data of an embodiment is a tagged byte-sequence representing typed data.

The event data of an embodiment includes a type header and a type-specific data layout.

The state information of an embodiment is a tagged byte-sequence representing typed data.

The state information of an embodiment includes a type header and a type-specific data layout.

The method of an embodiment comprises generating at least one offset. The method of an embodiment comprises forming the data capsule to include the at least one offset.

The method of an embodiment comprises generating a first offset having a first variable length, wherein the first offset points to the event data of a first data sequence of the at least one data sequence.

The method of an embodiment comprises generating a second offset having a second variable length, wherein the second offset points to the state information of a first data sequence of the at least one data sequence.

The method of an embodiment comprises forming a first code path through the data capsule using a first offset of the at least one offset. The method of an embodiment comprises forming a second code path through the data capsule using a second offset of the at least one offset, wherein the first code path and the second code path are different paths.

At least one of the first offset and the second offset of an embodiment include metadata, the metadata comprising context-specific metadata corresponding to a context of the application.

The method of an embodiment comprises generating a header that includes a length of the data capsule. The method of an embodiment comprises forming the data capsule to include the header.

The method of an embodiment comprises transferring the data capsule to a pool of the plurality of pools.

The method of an embodiment comprises detecting a second event of the at least one processing device. The method of an embodiment comprises searching the plurality of pools for data capsules corresponding to the second event.

The method of an embodiment comprises identifying a correspondence between the data capsule and the second event. The method of an embodiment comprises extracting the data capsule from the pool in response to the identifying. The method of an embodiment comprises executing on behalf of the at least one processing device a processing operation corresponding to the second event in response to contents of the data capsule, wherein the at least one processing device corresponds to an application of a first type and a second application of a second type.

The plurality of pools of an embodiment is coupled to a plurality of applications, the plurality of pools including a plurality of data capsules corresponding to the plurality of applications, the plurality of pools providing access to the plurality of data capsules by the plurality of applications, wherein at least two applications of the plurality of applications are different applications.

The plurality of pools of an embodiment provides state caching of a plurality of data capsules.

The plurality of pools of an embodiment provides linear sequencing of a plurality of data capsules.

The data structure of an embodiment is untyped.

The data structure of the data capsule of an embodiment provides a platform-independent representation of the event data and the state information.

The data structure of the data capsule of an embodiment provides platform-independent access to the event data and the state information.

The transferring of an embodiment comprises transferring the data capsule from a first application having a first application type to at least one second application having at least one second application type, wherein the first application type is different than the second application type, wherein the generating of the at least one data sequence was executed by the first application, the method comprising maintaining intact the at least one data sequence of the data capsule during the transferring.

The method of an embodiment comprises using the at least one data sequence during operations of the second application.

The method of an embodiment comprises generating a first data set that includes event data and identification data of a source device of the at least one processing device, the device event data including data specifying an event registered by the source device, the identification data including data identifying the source device.

The method of an embodiment comprises generating a second data set that includes a full set of state information of the event, wherein each of the first data set and the second data set comprise typed data bundles in a type-specific data layout.

The translating of an embodiment comprises encapsulating the first data set and the second data set by forming a data capsule to include the first data set and the second data set, wherein the data capsule has a data structure comprising an application-independent representation of the at least one data sequence.

The method of an embodiment comprises detecting an event of a first processing device running under an application of a first type. The method of an embodiment comprises generating data sequences comprising event data of the first processing device, the event data specifying the event and state information of the event, wherein the event data and state information are type-specific data having a type corresponding to the application. The method of an embodiment comprises forming a data capsule to include the data sequences, the data capsule having a data structure comprising an application-independent representation of the data sequences. The method of an embodiment comprises detecting a second event of a second processing device running under at least one second application having at least one second type, wherein the second type is different from the first type, wherein the at least one processing device comprises the first processing device and the second processing device. The method of an embodiment comprises identifying a correspondence between the data capsule and the second event. The method of an embodiment comprises executing an operation in response to the second event using contents of the data sequences of the data capsule.

The generating of the data sequences of an embodiment comprises generating a first data set that includes the event data. The generating of the data sequences of an embodiment comprises generating a second data set that includes the state information. The generating of the data sequences of an embodiment comprises forming a first data sequence to include the first data set and the second data set.

The event data of an embodiment is a tagged byte-sequence representing typed data.

The event data of an embodiment includes a type header and a type-specific data layout.

The state information of an embodiment is a tagged byte-sequence representing typed data.

The state information of an embodiment includes a type header and a type-specific data layout.

The method of an embodiment comprises generating at least one offset. The method of an embodiment comprises forming the data capsule to include the at least one offset.

The method of an embodiment comprises generating a first offset having a first variable length, wherein the first offset points to the event data of a first data sequence of the at least one data sequence. The method of an embodiment comprises generating a second offset having a second variable length, wherein the second offset points to the state information of a first data sequence of the at least one data sequence.

The method of an embodiment comprises forming a first code path through the data capsule using a first offset of the at least one offset. The method of an embodiment comprises forming a second code path through the data capsule using a second offset of the at least one offset, wherein the first code path and the second code path are different paths.

At least one of the first offset and the second offset of an embodiment include metadata, the metadata comprising context-specific metadata corresponding to a context of the application.

The method of an embodiment comprises transferring the data capsule to a pool of the plurality of pools.

The method of an embodiment comprises searching the plurality of pools for data capsules corresponding to the second event. The method of an embodiment comprises extracting the data capsule from the pool in response to the identifying of the correspondence.

The plurality of pools of an embodiment is coupled to the application and the at least one second application, the plurality of pools including a plurality of data capsules corresponding to the application and the at least one second application, the plurality of pools providing access to the plurality of data capsules by the application and the at least one second application.

The plurality of pools of an embodiment provides state caching of a plurality of data capsules.

The plurality of pools of an embodiment provides linear sequencing of a plurality of data capsules.

The data structure of an embodiment is untyped.

The data structure of the data capsule of an embodiment provides a platform-independent representation of the event data and the state information.

The data structure of the data capsule of an embodiment provides platform-independent access to the event data and the state information.

Embodiments described herein include a method comprising: executing a plurality of processes on a processing device, the plurality of processes including separable program execution contexts of a plurality of application programs, wherein each application program comprises at least one process; translating events of each process of the plurality of processes into data messages, wherein a data message includes an application-independent representation of event data of an event and state information of the process originating the data message; transferring the data messages into at least one pool of a plurality of pools; coordinating among the processes, the coordinating including each process of the plurality of processes coordinating with peer processes of the plurality of processes by retrieving from the plurality of pools the state information of the peer processes; and generating an output of the plurality of processes by interactively combining a set of data messages of at least one pool of the plurality of pools.

Embodiments described herein include a system comprising: at least one processing device, the processing device executing a plurality of processes; and a plurality of pools coupled to the at least one processing device; the at least one processing device translating events of each process of the plurality of processes into data capsules and transferring the data capsules into the plurality of pools; each process of the plurality of processes operating as a recognizing process, the recognizing process recognizing in the plurality of pools data capsules comprising at least one of content that corresponds to an interactive function of the recognizing process and an identification of the recognizing process; the recognizing process retrieving recognized data capsules from the plurality of pools and executing processing appropriate to contents of the recognized data capsules.

Embodiments described herein include a method comprising: executing a plurality of processes on at least one processing device, the plurality of processes including separable program execution contexts of a plurality of application programs, wherein each application program comprises at least one process; translating events of each process of the plurality of processes into data capsules, wherein a data capsule includes an application-independent representation of event data of an event and state information of the process originating the data capsule; transferring the data capsules into a plurality of pools; each process operating as a recognizing process, the recognizing process recognizing in the plurality of pools data capsules comprising at least one of content that corresponds to an interactive function of the recognizing process and an identification of the recognizing process; and the recognizing process retrieving recognized data capsules from the plurality of pools and executing processing appropriate to contents of the recognized data capsules.

The method of an embodiment comprises forming an interactive application from the plurality of processes by coordinating operations of each of the plurality of processes using the data capsules and the plurality of pools.

The method of an embodiment comprises coordinating operations of the plurality of processes using at least one of the data capsules and the plurality of pools.

The method of an embodiment comprises dividing an application program into a set of processes, wherein the plurality of processes includes the set of processes.

The method of an embodiment comprises a process generating an output by interactively processing a plurality of retrieved data capsules of at least one pool of the plurality of pools.

The method of an embodiment comprises executing the plurality of processes in parallel.

The method of an embodiment comprises executing a first set of processes in parallel, and executing a second set of processes in sequence, wherein the plurality of processes includes the first set of processes and the second set of processes.

The events of an embodiment represent process inputs.

The events of an embodiment represent process outputs.

The events of an embodiment comprise a user interface event.

The events of an embodiment comprise a graphics event.

The events of an embodiment represent process state.

The state of a process of an embodiment represents the interactive function of the process, wherein the interactive function of the process is exposed to the plurality of processes as contents of the data capsules.

The method of an embodiment comprises defining an application programming interface (API) of the plurality of processes by contents of the data capsules instead of defining the API by function calls.

The contents of the data capsules of an embodiment are application-independent and recognizable by the plurality of processes.

The at least one processing device of an embodiment comprises a plurality of processing devices.

At least one first set of processes of the plurality of processes of an embodiment are running under at least one first set of processing devices of the plurality of processing device and at least one second set of processes of the plurality of processes of an embodiment are running under at least one second set of processing devices of the plurality of processing devices.

The plurality of processes of an embodiment includes a first process.

The translating of an embodiment comprises transforming events of the first process into at least one data sequence comprising first process event data specifying the event and state information of the event.

The first process event data and state information of an embodiment are type-specific data having a type corresponding to an application of the first process.

The translating of an embodiment comprises forming the data capsule to include the at least one data sequence, the data capsule having a data structure comprising an application-independent representation of the at least one data sequence.

The plurality of processes of an embodiment includes a second process.

The translating of an embodiment comprises transforming state change events of the second process into at least one data sequence comprising second process event data specifying the event and state information of the event.

The second process event data and state information of an embodiment are type-specific data having a type corresponding to an application of the second process.

The translating of an embodiment comprises forming the data capsule to include the at least one data sequence, the data capsule having a data structure comprising an application-independent representation of the at least one data sequence.

The recognizing process of an embodiment is the second process, the retrieving comprising the second process retrieving the recognized data capsules from the plurality of pools and executing processing appropriate to contents of the recognized data capsules.

The contents of the recognized data capsules of an embodiment are data representing state information of the first process.

The translating of an embodiment comprises transforming the contents of the recognized data capsules into at least one new data sequence, the at least one new data sequence representing at least one of an event of the first process and an event of the second process.

The at least one new data sequence of an embodiment comprises event data specifying the event and state information of at least one of the first process and the second process.

The event data and state information of the at least one of the first process and the second process of an embodiment are type-specific data having a type corresponding to an application of the at least one of the first process and the second process.

The translating of an embodiment comprises forming the data capsule to include the at least one new data sequence, the data capsule having a data structure comprising an application-independent representation of the at least one new data sequence.

The plurality of processes of an embodiment uses the at least one new data sequence.

The plurality of processes of an embodiment includes an input process, the input process receiving input events from an input device.

The translating of an embodiment comprises transforming the input events of the input device into at least one data sequence comprising input device event data specifying the event and state information of the event.

The input device event data and state information of an embodiment are type-specific data having a type corresponding to an application of the source device.

The translating of an embodiment comprises forming the data capsule to include the at least one data sequence, the data capsule having a data structure comprising an application-independent representation of the at least one data sequence.

The plurality of processes of an embodiment includes a pointer process.

The recognizing process of an embodiment is the pointer process, the retrieving comprising the pointer process retrieving the recognized data capsules from the plurality of pools and executing processing appropriate to contents of the recognized data capsules.

The contents of the recognized data capsules of an embodiment are data representing input events from an input process.

The contents of the recognized data capsules of an embodiment are data representing a position on a display where a user of the at least one processing device is directing a pointer object.

The translating of an embodiment comprises transforming the contents of the recognized data capsules into at least one new data sequence, the at least one new data sequence defining a position of the pointer object with respect to a display.

The at least one new data sequence of an embodiment comprises pointer process event data specifying the event and state information of the pointer process event.

The pointer process event data and state information of an embodiment are type-specific data having a type corresponding to an application of the pointer process.

The translating of an embodiment comprises forming the data capsule to include the at least one new data sequence, the data capsule having a data structure comprising an application-independent representation of the at least one new data sequence.

The plurality of processes of an embodiment uses the at least one new data sequence in rendering the pointer object on the display.

The plurality of processes of an embodiment includes a graphical process.

The translating of an embodiment comprises transforming state change events of the graphical process into at least one data sequence comprising graphical process event data specifying the event and state information of the event.

The graphical process event data and state information of an embodiment are type-specific data having a type corresponding to an application of the graphical process.

The translating of an embodiment comprises forming the data capsule to include the at least one data sequence, the data capsule having a data structure comprising an application-independent representation of the at least one data sequence.

The recognizing process of an embodiment is the graphical process, the retrieving comprising the graphical process retrieving the recognized data capsules from the plurality of pools and executing processing appropriate to contents of the recognized data capsules.

The contents of the recognized data capsules of an embodiment are data representing state information of another process of the plurality of processes.

The state information of an embodiment includes information of at least one of spatial state and modal state.

The contents of the recognized data capsules of an embodiment are data representing a position on a display where a user of the at least one processing device is directing a pointer object.

The position of the pointer object of an embodiment is within a boundary of a graphical object, wherein the graphical object is rendered by the graphical process.

The translating of an embodiment comprises transforming the contents of the recognized data capsules into at least one new data sequence, the at least one new data sequence representing at least one of the graphical object, the pointer object, and an overlap of the pointer object and the boundary.

The at least one new data sequence of an embodiment comprises graphical process event data specifying the event and state information of the graphical process event.

The graphical process event data and state information of an embodiment are type-specific data having a type corresponding to an application of the graphical process.

The translating of an embodiment comprises forming the data capsule to include the at least one new data sequence, the data capsule having a data structure comprising an application-independent representation of the at least one new data sequence.

The plurality of processes of an embodiment uses the at least one new data sequence in rendering at least one of the graphical object and the pointer object on the display.

The processing appropriate to contents of the recognized data capsules of an embodiment comprises rendering a graphical object, wherein the graphical object is rendered on a display of the at least one processing device.

The rendering of an embodiment comprises direct rendering in which the plurality of processes draw directly to a graphics layer of the at least one processing device, wherein the plurality of pools is used for coordination among the plurality of processes as appropriate to the rendering.

The rendering of an embodiment comprises the plurality of processes transferring data capsules comprising rendering commands into the plurality of pools. The rendering of an embodiment comprises the plurality of processes retrieving the rendering commands from the plurality of pools, interpreting the rendering commands, and driving a graphics layer of the at least one processing device in response to the rendering commands.

The rendering of an embodiment comprises the plurality of processes rendering to pixel buffers. The rendering of an embodiment comprises the plurality of processes transferring raw frame data into the plurality of pools, the raw frame data resulting from the rendering to the pixel buffers. The rendering of an embodiment comprises the plurality of processes retrieving the raw frame data from the plurality of pools and combining the raw frame data for use in driving a graphics layer of the at least one processing device.

The method of an embodiment comprises detecting an event of the plurality of processes. The method of an embodiment comprises generating at least one data sequence comprising event data specifying the event and state information of the event, wherein the event data and state information are type-specific data having a type corresponding to an application of the at least one processing device. The method of an embodiment comprises forming a data capsule to include the at least one data sequence, the data capsule having a data structure comprising an application-independent representation of the at least one data sequence.

The generating of the at least one data sequence of an embodiment comprises generating a first respective data set that includes first respective event data. The generating of the at least one data sequence of an embodiment comprises generating a second respective data set that includes second respective state information. The generating of the at least one data sequence of an embodiment comprises forming a first data sequence to include the first respective data set and the second respective data set.

The generating of the first respective data set of an embodiment includes forming the first respective data set to include identification data of the at least one processing device, the identification data including data identifying the at least one processing device.

The generating of the at least one data sequence of an embodiment comprises generating a first respective data set that includes first respective event data. The generating of the at least one data sequence of an embodiment comprises generating a second respective data set that includes second respective state information. The generating of the at least one data sequence of an embodiment comprises forming a second data sequence to include the first respective data set and the second respective data set.

The generating of the first respective data set of an embodiment includes generating a first respective data set offset, wherein the first respective data set offset points to the first respective data set of the second data sequence.

The generating of the second respective data set of an embodiment includes generating a second respective data set offset, wherein the second respective data set offset points to the second respective data set of the second data sequence.

The first respective data set of an embodiment is a description list, the description list including a description of the data.

The event data of an embodiment is a tagged byte-sequence representing typed data.

The event data of an embodiment includes a type header and a type-specific data layout.

The state information of an embodiment is a tagged byte-sequence representing typed data.

The state information of an embodiment includes a type header and a type-specific data layout.

The method of an embodiment comprises generating at least one offset. The method of an embodiment comprises forming the data capsule to include the at least one offset.

The method of an embodiment comprises generating a first offset having a first variable length, wherein the first offset points to the event data of a first data sequence of the at least one data sequence.

The method of an embodiment comprises generating a second offset having a second variable length, wherein the second offset points to the state information of a first data sequence of the at least one data sequence.

The method of an embodiment comprises forming a first code path through the data capsule using a first offset of the at least one offset. The method of an embodiment comprises forming a second code path through the data capsule using a second offset of the at least one offset, wherein the first code path and the second code path are different paths.

At least one of the first offset and the second offset of an embodiment include metadata, the metadata comprising context-specific metadata corresponding to a context of the application.

The method of an embodiment comprises generating a header that includes a length of the data capsule. The method of an embodiment comprises forming the data capsule to include the header.

The method of an embodiment comprises transferring the data capsule to a pool of the plurality of pools.

The method of an embodiment comprises detecting a second event of the at least one processing device. The method of an embodiment comprises searching the plurality of pools for data capsules corresponding to the second event.

The method of an embodiment comprises identifying a correspondence between the data capsule and the second event. The method of an embodiment comprises extracting the data capsule from the pool in response to the identifying. The method of an embodiment comprises executing on behalf of the at least one processing device a processing operation corresponding to the second event in response to contents of the data capsule, wherein the at least one processing device corresponds to an application of a first type and a second application of a second type.

The plurality of pools of an embodiment is coupled to a plurality of applications, the plurality of pools including a plurality of data capsules corresponding to the plurality of applications, the plurality of pools providing access to the plurality of data capsules by the plurality of applications, wherein at least two applications of the plurality of applications are different applications.

The plurality of pools of an embodiment provides state caching of a plurality of data capsules.

The plurality of pools of an embodiment provides linear sequencing of a plurality of data capsules.

The data structure of an embodiment is untyped.

The data structure of the data capsule of an embodiment provides a platform-independent representation of the event data and the state information.

The data structure of the data capsule of an embodiment provides platform-independent access to the event data and the state information.

The transferring comprises transferring the data capsule from a first application having a first application type to at least one second application having at least one second application type, wherein the first application type is different than the second application type, wherein the generating of the at least one data sequence was executed by the first application, the method comprising maintaining intact the at least one data sequence of the data capsule during the transferring.

The method of an embodiment comprises using the at least one data sequence during operations of the second application.

The method of an embodiment comprises generating a first data set that includes event data and identification data of a source device of the at least one processing device, the device event data including data specifying an event registered by the source device, the identification data including data identifying the source device.

The method of an embodiment comprises generating a second data set that includes a full set of state information of the event, wherein each of the first data set and the second data set comprise typed data bundles in a type-specific data layout.

The translating of an embodiment comprises encapsulating the first data set and the second data set by forming a data capsule to include the first data set and the second data set, wherein the data capsule has a data structure comprising an application-independent representation of the at least one data sequence.

The method of an embodiment comprises: detecting an event of a first processing device running under an application of a first type; generating data sequences comprising event data of the first processing device, the event data specifying the event and state information of the event, wherein the event data and state information are type-specific data having a type corresponding to the application; forming a data capsule to include the data sequences, the data capsule having a data structure comprising an application-independent representation of the data sequences; detecting a second event of a second processing device running under at least one second application having at least one second type, wherein the second type is different from the first type, wherein the at least one processing device comprises the first processing device and the second processing device; identifying a correspondence between the data capsule and the second event; and executing an operation in response to the second event using contents of the data sequences of the data capsule.

The generating of the data sequences of an embodiment comprises generating a first data set that includes the event data. The generating of the data sequences of an embodiment comprises generating a second data set that includes the state information. The generating of the data sequences of an embodiment comprises forming a first data sequence to include the first data set and the second data set.

The event data of an embodiment is a tagged byte-sequence representing typed data.

The event data of an embodiment includes a type header and a type-specific data layout.

The state information of an embodiment is a tagged byte-sequence representing typed data.

The state information of an embodiment includes a type header and a type-specific data layout.

The method of an embodiment comprises generating at least one offset. The method of an embodiment comprises forming the data capsule to include the at least one offset.

The method of an embodiment comprises generating a first offset having a first variable length, wherein the first offset points to the event data of a first data sequence of the at least one data sequence. The method of an embodiment comprises generating a second offset having a second variable length, wherein the second offset points to the state information of a first data sequence of the at least one data sequence.

The method of an embodiment comprises forming a first code path through the data capsule using a first offset of the at least one offset. The method of an embodiment comprises forming a second code path through the data capsule using a second offset of the at least one offset, wherein the first code path and the second code path are different paths.

At least one of the first offset and the second offset of an embodiment include metadata, the metadata comprising context-specific metadata corresponding to a context of the application.

The method of an embodiment comprises transferring the data capsule to a pool of the plurality of pools.

The method of an embodiment comprises searching the plurality of pools for data capsules corresponding to the second event. The method of an embodiment comprises extracting the data capsule from the pool in response to the identifying of the correspondence.

The plurality of pools of an embodiment is coupled to the application and the at least one second application, the plurality of pools including a plurality of data capsules corresponding to the application and the at least one second application, the plurality of pools providing access to the plurality of data capsules by the application and the at least one second application.

The plurality of pools of an embodiment provides state caching of a plurality of data capsules.

The plurality of pools of an embodiment provides linear sequencing of a plurality of data capsules.

The data structure of an embodiment is untyped.

The data structure of the data capsule of an embodiment provides a platform-independent representation of the event data and the state information.

The data structure of the data capsule of an embodiment provides platform-independent access to the event data and the state information.

Embodiments described herein include a method comprising: dividing an application program into a plurality of processes; generating a portion of an output of the application program using a process of the plurality of processes; encapsulating the portion of the output in a first data capsule and transferring the first data capsule to at least one of a plurality of pools, wherein the plurality of pools comprise a plurality of data capsules received from the plurality of processes; accessing the plurality of pools and retrieving an input for a second process of the plurality of processes, wherein the input is in a second data capsule of the plurality of data capsules; and coordinating processing among the plurality of processes using the plurality of data capsules and the plurality of pools.

Embodiments described herein include a system comprising: at least one processing device, the processing device executing a plurality of processes, the plurality of processes including separable program execution contexts of a plurality of application programs, wherein each application program comprises at least one process; and a plurality of pools coupled to the at least one processing device; the at least one processing device translating events of each process of the plurality of processes into data capsules and transferring the data capsules into a plurality of pools, wherein a data capsule includes an application-independent representation of event data of an event and state information of the process originating the data capsule; each process operating as a recognizing process, the recognizing process recognizing in the plurality of pools data capsules comprising at least one of content that corresponds to an interactive function of the recognizing process and an identification of the recognizing process; the recognizing process retrieving recognized data capsules from the plurality of pools and executing processing appropriate to contents of the recognized data capsules.

Embodiments described herein include a method comprising: detecting from gesture data a gesture made by a body, wherein the gesture data is received via a detector; executing a plurality of processes on a processing device, the plurality of processes generating events, the events including a set of events representing the gesture; translating the events of each process of the plurality of processes into data capsules; transferring the data capsules into a plurality of pools; a set of processes of the plurality of processes operating as recognizing processes, the recognizing processes recognizing in the plurality of pools data capsules comprising content that corresponds to the gesture; and the recognizing processes retrieving recognized data capsules from the plurality of pools and generating a gesture signal from the recognized data capsules by compositing contents of the recognized data capsules to form the gesture signal, wherein the gesture signal represents the gesture.

The plurality of processes of an embodiment includes separable program execution contexts of a spatial operating application.

The gesture data of an embodiment is absolute three-space location data of an instantaneous state of a user at a point in time and space.

The method of an embodiment comprises identifying the gesture using only the gesture data.

The detecting of an embodiment includes at least one of detecting a location of the body, detecting an orientation of the body, and detecting motion of the body.

The method of an embodiment comprises identifying the gesture, wherein the identifying includes identifying a pose and an orientation of a portion of the body.

The detecting of an embodiment includes detecting at least one of a first set of appendages and a second set of appendages of the body.

The detecting of an embodiment includes dynamically detecting a position of at least one tag coupled to the body.

The detecting of an embodiment includes detecting position of a set of tags coupled to the body.

Each tag of the set of tags of an embodiment includes a pattern, wherein each pattern of each tag of the set of tags is different than any pattern of any remaining tag of the plurality of tags.

The detecting of an embodiment includes dynamically detecting and locating a marker on the body.

The detecting of an embodiment includes detecting position of a set of markers coupled to the body.

The set of markers of an embodiment form a plurality of patterns on the body.

The detecting of an embodiment includes detecting position of a plurality of appendages of the body using a set of markers coupled to each of the appendages.

The translating of an embodiment comprises translating information of the gesture to a gesture notation.

The gesture notation of an embodiment represents a gesture vocabulary, and the gesture signal comprises communications of the gesture vocabulary.

The gesture vocabulary of an embodiment represents in textual form instantaneous pose states of kinematic linkages of the body.

The gesture vocabulary of an embodiment represents in textual form an orientation of kinematic linkages of the body.

The gesture vocabulary of an embodiment represents in textual form a combination of orientations of kinematic linkages of the body.

The gesture vocabulary of an embodiment includes a string of characters that represent a state of kinematic linkages of the body.

The kinematic linkage of an embodiment is at least one first appendage of the body.

The method of an embodiment comprises assigning each position in the string to a second appendage, the second appendage connected to the first appendage.

The method of an embodiment comprises assigning characters of a plurality of characters to each of a plurality of positions of the second appendage.

The plurality of positions of an embodiment is established relative to a coordinate origin.

The method of an embodiment comprises establishing the coordinate origin using a position selected from a group consisting of an absolute position and orientation in space, a fixed position and orientation relative to the body irrespective of an overall position and heading of the body, and interactively in response to an action of the body.

The method of an embodiment comprises assigning characters of the plurality of characters to each of a plurality of orientations of the first appendage.

The detecting of an embodiment comprises detecting when an extrapolated position of the body intersects virtual space, wherein the virtual space comprises space depicted on a display device coupled to the at least one processing device.

The method of an embodiment comprises controlling a virtual object in the virtual space when the extrapolated position intersects the virtual object.

The controlling of an embodiment comprises controlling a position of the virtual object in the virtual space in response to the extrapolated position in the virtual space.

The controlling of an embodiment comprises controlling attitude of the virtual object in the virtual space in response to the gesture.

The method of an embodiment comprises controlling scaling of the detecting and controlling to generate coincidence between virtual space and the physical space, wherein the virtual space comprises space depicted on a display, wherein the physical space comprises space inhabited by the body.

The method of an embodiment comprises controlling at least one virtual object in the virtual space in response to movement of at least one physical object in the physical space.

The method of an embodiment comprises controlling a component using the gesture signal, the component coupled to the at least one processing device.

Controlling the component of an embodiment comprises controlling a three-space object in six degrees of freedom simultaneously by mapping the gesture to a three-space object.

Controlling the component of an embodiment comprises controlling a three-space object through three translational degrees of freedom and three rotational degrees of freedom.

The three-space object of an embodiment is presented on a display device coupled to the at least one processing device.

The three-space object of an embodiment is a remote system coupled to the computer.

The method of an embodiment comprises controlling movement of the three-space object by mapping the gesture to a plurality of object translations of the three-space object.

The mapping of an embodiment includes a direct mapping between the gesture and the plurality of object translations.

The mapping of an embodiment includes an indirect mapping between the gesture and the plurality of object translations.

A data capsule of an embodiment includes an application-independent representation of event data of an event and state information of the process originating the data message.

The method of an embodiment comprises forming an interactive application from the plurality of processes by coordinating operations of each of the plurality of processes using the data capsules and the plurality of pools.

The method of an embodiment comprises coordinating operations of the plurality of processes using at least one of the data capsules and the plurality of pools.

The method of an embodiment comprises dividing an application program into a set of processes, wherein the plurality of processes includes the set of processes.

The method of an embodiment comprises a process generating an output by interactively processing a plurality of retrieved data capsules of at least one pool of the plurality of pools.

The plurality of processes of an embodiment includes separable program execution contexts of a plurality of application programs, wherein each application program comprises at least one process.

The method of an embodiment comprises executing the plurality of processes in parallel.

The method of an embodiment comprises executing a first set of processes in parallel, and executing a second set of processes in sequence, wherein the plurality of processes includes the first set of processes and the second set of processes.

The events of an embodiment represent process inputs.
The events of an embodiment represent process outputs.
The events of an embodiment comprise a user interface event.
The events of an embodiment comprise a graphics event.
The events of an embodiment represent process state.

The state of a process of an embodiment represents the interactive function of the process, wherein the interactive function of the process is exposed to the plurality of processes as contents of the data capsules.

The method of an embodiment comprises defining an application programming interface (API) of the plurality of processes by contents of the data capsules instead of defining the API by function calls.

The contents of the data capsules of an embodiment are application-independent and recognizable by the plurality of processes.

The at least one processing device of an embodiment comprises a plurality of processing devices.

At least one first set of processes of the plurality of processes of an embodiment are running under at least one first set of processing devices of the plurality of processing devices and at least one second set of processes of the plurality of processes are running under at least one second set of processing devices of the plurality of processing devices.

The plurality of processes of an embodiment includes a first process.

The translating of an embodiment comprises transforming events of the first process into at least one data sequence comprising first process event data specifying the event and state information of the event.

The first process event data and state information of an embodiment are type-specific data having a type corresponding to an application of the first process.

The translating of an embodiment comprises forming the data capsule to include the at least one data sequence, the data capsule having a data structure comprising an application-independent representation of the at least one data sequence.

The plurality of processes of an embodiment includes a second process.

The translating of an embodiment comprises transforming state change events of the second process into at least one data sequence comprising second process event data specifying the event and state information of the event.

The second process event data and state information of an embodiment are type-specific data having a type corresponding to an application of the second process.

The translating of an embodiment comprises forming the data capsule to include the at least one data sequence, the data capsule having a data structure comprising an application-independent representation of the at least one data sequence.

The recognizing process of an embodiment is the second process, the retrieving comprising the second process retrieving the recognized data capsules from the plurality of pools and executing processing appropriate to contents of the recognized data capsules.

The contents of the recognized data capsules of an embodiment are data representing state information of the first process.

The translating of an embodiment comprises transforming the contents of the recognized data capsules into at least one new data sequence, the at least one new data sequence representing at least one of an event of the first process and an event of the second process.

The at least one new data sequence of an embodiment comprises event data specifying the event and state information of at least one of the first process and the second process.

The event data and state information of the at least one of the first process and the second process of an embodiment are type-specific data having a type corresponding to an application of the at least one of the first process and the second process.

The translating of an embodiment comprises forming the data capsule to include the at least one new data sequence, the data capsule having a data structure comprising an application-independent representation of the at least one new data sequence.

The plurality of processes of an embodiment uses the at least one new data sequence.

The processing appropriate to contents of the recognized data capsules of an embodiment comprises rendering a graphical object, wherein the graphical object is rendered on a display of the at least one processing device.

The rendering of an embodiment comprises direct rendering in which the plurality of processes draw directly to a graphics layer of the at least one processing device, wherein the plurality of pools is used for coordination among the plurality of processes as appropriate to the rendering.

The rendering of an embodiment comprises the plurality of processes transferring data capsules comprising rendering commands into the plurality of pools. The rendering of an embodiment comprises the plurality of processes retrieving the rendering commands from the plurality of pools, interpreting the rendering commands, and driving a graphics layer of the at least one processing device in response to the rendering commands.

The rendering of an embodiment comprises the plurality of processes rendering to pixel buffers. The rendering of an embodiment comprises the plurality of processes transferring raw frame data into the plurality of pools, the raw frame data resulting from the rendering to the pixel buffers. The rendering of an embodiment comprises the plurality of processes retrieving the raw frame data from the plurality of pools and combining the raw frame data for use in driving a graphics layer of the at least one processing device.

The method of an embodiment comprises detecting an event of the plurality of processes. The method of an embodiment comprises generating at least one data sequence comprising event data specifying the event and state information of the event, wherein the event data and state information are type-specific data having a type corresponding to an application of the at least one processing device. The method of an embodiment comprises forming a data capsule to include the at least one data sequence, the data capsule having a data structure comprising an application-independent representation of the at least one data sequence.

The generating of the at least one data sequence of an embodiment comprises generating a first respective data set that includes first respective event data. The generating of the at least one data sequence of an embodiment comprises generating a second respective data set that includes second respective state information. The generating of the at least one data sequence of an embodiment comprises forming a first data sequence to include the first respective data set and the second respective data set.

The generating of the first respective data set of an embodiment includes forming the first respective data set to include identification data of the at least one processing device, the identification data including data identifying the at least one processing device.

The generating of the at least one data sequence of an embodiment comprises generating a first respective data set that includes first respective event data. The generating of the at least one data sequence of an embodiment comprises generating a second respective data set that includes second respective state information. The generating of the at least one data sequence of an embodiment comprises forming a second data sequence to include the first respective data set and the second respective data set.

The generating of the first respective data set of an embodiment includes generating a first respective data set offset, wherein the first respective data set offset points to the first respective data set of the second data sequence.

The generating of the second respective data set of an embodiment includes generating a second respective data set offset, wherein the second respective data set offset points to the second respective data set of the second data sequence.

The first respective data set of an embodiment is a description list, the description list including a description of the data.

The event data of an embodiment is a tagged byte-sequence representing typed data.

The event data of an embodiment includes a type header and a type-specific data layout.

The state information of an embodiment is a tagged byte-sequence representing typed data.

The state information of an embodiment includes a type header and a type-specific data layout.

The method of an embodiment comprises generating at least one offset. The method of an embodiment comprises forming the data capsule to include the at least one offset.

The method of an embodiment comprises generating a first offset having a first variable length, wherein the first offset points to the event data of a first data sequence of the at least one data sequence.

The method of an embodiment comprises generating a second offset having a second variable length, wherein the second offset points to the state information of a first data sequence of the at least one data sequence.

The method of an embodiment comprises forming a first code path through the data capsule using a first offset of the at least one offset. The method of an embodiment comprises forming a second code path through the data capsule using a second offset of the at least one offset, wherein the first code path and the second code path are different paths.

At least one of the first offset and the second offset of an embodiment include metadata, the metadata comprising context-specific metadata corresponding to a context of the application.

The method of an embodiment comprises generating a header that includes a length of the data capsule. The method of an embodiment comprises forming the data capsule to include the header.

The method of an embodiment comprises transferring the data capsule to a pool of the plurality of pools.

The method of an embodiment comprises detecting a second event of the at least one processing device. The method of an embodiment comprises searching the plurality of pools for data capsules corresponding to the second event.

The method of an embodiment comprises identifying a correspondence between the data capsule and the second event. The method of an embodiment comprises extracting the data capsule from the pool in response to the identifying. The method of an embodiment comprises executing on behalf of the at least one processing device a processing operation corresponding to the second event in response to contents of the data capsule, wherein the at least one processing device corresponds to an application of a first type and a second application of a second type.

The plurality of pools of an embodiment is coupled to a plurality of applications, the plurality of pools including a plurality of data capsules corresponding to the plurality of applications, the plurality of pools providing access to the plurality of data capsules by the plurality of applications, wherein at least two applications of the plurality of applications are different applications.

The plurality of pools of an embodiment provides state caching of a plurality of data capsules.

The plurality of pools of an embodiment provides linear sequencing of a plurality of data capsules.

The data structure of an embodiment is untyped.

The data structure of the data capsule of an embodiment provides a platform-independent representation of the event data and the state information.

The data structure of the data capsule of an embodiment provides platform-independent access to the event data and the state information.

The transferring of an embodiment comprises transferring the data capsule from a first application having a first application type to at least one second application having at least one second application type, wherein the first application type is different than the second application type, wherein the generating of the at least one data sequence was executed by the first application, the method comprising maintaining intact the at least one data sequence of the data capsule during the transferring.

The method of an embodiment comprises using the at least one data sequence during operations of the second application.

The method of an embodiment comprises generating a first data set that includes event data and identification data of a source device of the at least one processing device, the device event data including data specifying an event registered by the source device, the identification data including data identifying the source device.

The method of an embodiment comprises generating a second data set that includes a full set of state information of the event, wherein each of the first data set and the second data set comprise typed data bundles in a type-specific data layout.

The translating of an embodiment comprises encapsulating the first data set and the second data set by forming a data capsule to include the first data set and the second data set, wherein the data capsule has a data structure comprising an application-independent representation of the at least one data sequence.

The method of an embodiment comprises detecting an event of a first processing device running under an application of a first type. The method of an embodiment comprises generating data sequences comprising event data of the first processing device, the event data specifying the event and state information of the event, wherein the event data and state information are type-specific data having a type corresponding to the application. The method of an embodiment comprises forming a data capsule to include the data sequences, the data capsule having a data structure comprising an application-independent representation of the data sequences. The method of an embodiment comprises detecting a second event of a second processing device running under at least one second application having at least one second type, wherein the second type is different from the first type, wherein the at least one processing device comprises the first processing device and the second processing device. The method of an embodiment comprises identifying a correspondence between the data capsule and the second event. The method of an embodiment comprises executing an operation in response to the second event using contents of the data sequences of the data capsule.

The generating of the data sequences of an embodiment comprises generating a first data set that includes the event data. The generating of the data sequences of an embodiment comprises generating a second data set that includes the state information. The generating of the data sequences of an embodiment comprises forming a first data sequence to include the first data set and the second data set.

The event data of an embodiment is a tagged byte-sequence representing typed data.

The event data of an embodiment includes a type header and a type-specific data layout.

The state information of an embodiment is a tagged byte-sequence representing typed data.

The state information of an embodiment includes a type header and a type-specific data layout.

The method of an embodiment comprises generating at least one offset. The method of an embodiment comprises forming the data capsule to include the at least one offset.

The method of an embodiment comprises generating a first offset having a first variable length, wherein the first offset points to the event data of a first data sequence of the at least one data sequence. The method of an embodiment comprises generating a second offset having a second variable length, wherein the second offset points to the state information of a first data sequence of the at least one data sequence.

The method of an embodiment comprises forming a first code path through the data capsule using a first offset of the at least one offset. The method of an embodiment comprises forming a second code path through the data capsule using a second offset of the at least one offset, wherein the first code path and the second code path are different paths.

At least one of the first offset and the second offset of an embodiment include metadata, the metadata comprising context-specific metadata corresponding to a context of the application.

The method of an embodiment comprises transferring the data capsule to a pool of the plurality of pools.

The method of an embodiment comprises searching the plurality of pools for data capsules corresponding to the second event. The method of an embodiment comprises extracting the data capsule from the pool in response to the identifying of the correspondence.

The plurality of pools of an embodiment is coupled to the application and the at least one second application, the plurality of pools including a plurality of data capsules corresponding to the application and the at least one second application, the plurality of pools providing access to the plurality of data capsules by the application and the at least one second application.

The plurality of pools of an embodiment provides state caching of a plurality of data capsules.

The plurality of pools of an embodiment provides linear sequencing of a plurality of data capsules.

The data structure of an embodiment is untyped.

The data structure of the data capsule of an embodiment provides a platform-independent representation of the event data and the state information.

The data structure of the data capsule of an embodiment provides platform-independent access to the event data and the state information.

Embodiments described herein include a method comprising: executing a plurality of processes on a processing device, the plurality of processes including separable program execution contexts of a plurality of application programs, wherein each application program comprises at least one process; translating events of each process of the plurality of processes into data messages, wherein a data message includes an application-independent representation of event data of an event and state information of the process originating the data message; transferring the data messages into at least one pool of a plurality of pools; coordinating among the processes, the coordinating including each process of the plurality of processes coordinating with peer processes of the plurality of processes by retrieving from the plurality of pools the state information of the peer processes; and generating an output of the plurality of processes by interactively combining a set of data messages of at least one pool of the plurality of pools.

Embodiments described herein include a system comprising: a detector for receiving gesture data that represents a gesture made by a body; and a processor coupled to the detector, the processor automatically detecting the gesture from the gesture data, the processor executing a plurality of processes, the plurality of processes generating events that include a set of events representing the gesture, the processor translating the events of each process of the plurality of processes into data capsules, the processor transferring the data capsules into a plurality of pools, wherein a set of processes of the plurality of processes function as recognizing processes, the recognizing processes recognizing in the plurality of pools data capsules comprising content that corresponds to the gesture, the recognizing processes retrieving recognized data capsules from the plurality of pools and generating a gesture signal from the recognized data capsules by compositing contents of the recognized data capsules to form the gesture signal, wherein the gesture signal represents the gesture.

The systems and methods described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of a host system, and/or provided by some combination of algorithms. The methods described herein can be implemented in one or more of software algorithm(s), programs, firmware, hardware, components, circuitry, in any combination.

System components embodying the systems and methods described herein can be located together or in separate locations. Consequently, system components embodying the systems and methods described herein can be components of a single system, multiple systems, and/or geographically separate systems. These components can also be subcomponents or subsystems of a single system, multiple systems, and/or geographically separate systems. These components can be coupled to one or more other components of a host system or a system coupled to the host system.

Communication paths couple the system components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments is not intended to be exhaustive or to limit the systems and methods described to the precise form disclosed. While specific embodiments and examples are described herein for illustrative purposes, various equivalent modifications are possible within the scope of other systems and methods, as those skilled in the relevant art will recognize. The teachings provided herein can be applied to other processing systems and methods, not only for the systems and methods described above.

The elements and acts of the various embodiments described above can be combined to provide further embodiments. These and other changes can be made to the embodiments in light of the above detailed description.

In general, in the following claims, the terms used should not be construed to limit the embodiments to the specific embodiments disclosed in the specification and the claims, but should be construed to include all systems that operate under the claims. Accordingly, the embodiments are not limited by the disclosure herein, but instead the scope of the embodiments is to be determined entirely by the claims.

While certain aspects of the embodiments are presented below in certain claim forms, the inventors contemplate the various aspects of the embodiments in any number of claim forms. Accordingly, the inventors reserve the right to add additional claims after filing the application to pursue such additional claim forms for other aspects of the embodiments.

What is claimed is:

1. A method comprising:
   detecting from gesture data a gesture made by a body, wherein the gesture data is received via a detector;
   executing a plurality of processes on a processing device, the plurality of processes generating events, the events including a set of events representing the gesture;
   translating the events of each process of the plurality of processes into data capsules;

transferring the data capsules into a plurality of pools;

a set of processes of the plurality of processes operating as recognizing processes, the recognizing processes recognizing in the plurality of pools data capsules comprising content that corresponds to the gesture; and the recognizing processes retrieving recognized data capsules from the plurality of pools and generating a gesture signal from the recognized data capsules by compositing contents of the recognized data capsules to form the gesture signal, wherein the gesture signal represents the gesture.

2. The method of claim 1, wherein the events represent process inputs.

3. The method of claim 1, wherein the events represent process outputs.

4. The method of claim 1, wherein the events comprise a user interface event.

5. The method of claim 1, wherein the events comprise a graphics event.

6. The method of claim 1, wherein the events represent process state.

7. The method of claim 6, wherein the state of a process represents the interactive function of the process, wherein the interactive function of the process is exposed to the plurality of processes as contents of the data capsules.

8. The method of claim 7, comprising defining an application programming interface (API) of the plurality of processes by contents of the data capsules instead of defining the API by function calls.

9. The method of claim 8, wherein the contents of the data capsules are application-independent and recognizable by the plurality of processes.

10. A system comprising:

a detector for receiving gesture data that represents a gesture made by a body; and a processor coupled to the detector, the processor automatically detecting the gesture from the gesture data, the processor executing a plurality of processes, the plurality of processes generating events that include a set of events representing the gesture, the processor translating the events of each process of the plurality of processes into data capsules, the processor transferring the data capsules into a plurality of pools, wherein a set of processes of the plurality of processes function as recognizing processes, the recognizing processes recognizing in the plurality of pools data capsules comprising content that corresponds to the gesture, the recognizing processes retrieving recognized data capsules from the plurality of pools and generating a gesture signal from the recognized data capsules by compositing contents of the recognized data capsules to form the gesture signal, wherein the gesture signal represents the gesture.

* * * * *